United States Patent
Arai et al.

(10) Patent No.: US 6,272,092 B1
(45) Date of Patent: *Aug. 7, 2001

(54) RECORDING AND REPRODUCING APPARATUS WITH LOCK AND RELEASE MECHANISM

(75) Inventors: Shizuo Arai; Yoshitaka Aoki; Takakiyo Kanazawa; Akio Matsuda; Kiyoshi Ohmori; Sunao Aoki, all of Kanagawa; Takatsugu Funawatari, Miyagi, all of (JP)

(73) Assignee: Sony Corporatin, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/066,005

(22) Filed: Apr. 24, 1998

Related U.S. Application Data

(62) Division of application No. 08/718,361, filed on Jan. 6, 1997.

(30) Foreign Application Priority Data

Feb. 6, 1995 (JP) .................................. P7-018294
Aug. 4, 1995 (JP) .................................. P7-199962

(51) Int. Cl.[7] .................................................. G11B 33/02
(52) U.S. Cl. .............................................................. 369/77.2
(58) Field of Search ............................. 369/75.2, 77.1, 369/77.2, 13; 360/96.5, 114

(56) References Cited

U.S. PATENT DOCUMENTS

| 4,570,196 | 2/1986 | Shimaoka et al. | 360/97 |
|---|---|---|---|
| 4,682,322 | 7/1987 | Ohta | 369/291 |
| 5,046,170 | 9/1991 | Oshima et al. | 360/133 |
| 5,056,078 | 10/1991 | Carey et al. | 369/77.2 |
| 5,063,554 | 11/1991 | Uehara | 369/77.2 |
| 5,123,004 | 6/1992 | Arai | 369/75.2 |

(List continued on next page.)

FOREIGN PATENT DOCUMENTS

| 0 301 793 A2 | 2/1989 | (EP) . |
|---|---|---|
| 0 297 649 A1 | 4/1989 | (EP) . |
| 0 506 054 A2 | 9/1992 | (EP) . |

(List continued on next page.)

OTHER PUBLICATIONS

U.S. application No. 08/718,361, filed Jan. 6, 1997.
U.S. application No. 09/066,191, filed Apr. 24, 1998.
U.S. application No. 09/066,885, filed Apr. 24, 1998.
U.S. application No. 09/066,034, filed Apr. 24, 1998.

Primary Examiner—George J. Letscher
(74) Attorney, Agent, or Firm—Limbach & Limbach L.L.P.; Seon-Kun Oh

(57) ABSTRACT

A recording and reproducing apparatus having a holder for holding an inserted cartridge with a recording medium stored therein in which a recording medium is loaded or unloaded at the recording and reproducing position for recording and/or reproducing information as the holder is elevated or lowered, including a driver on which the recording medium rests at the recording and reproducing position and driving the recording medium for recording and/or reproduction and an elevator having an elevating and lowering operation cam formed on its side portion and elevating or lowering the holder when it is slid in parallel to the direction in which the cartridge is inserted. The elevator includes first and second slide members each having cam grooves formed on its side surfaces and the first and second slide members are coupled together with a predetermined clearance such that they can be fine moved relatively, whereby the cartridge with the recording medium stored therein can be loaded and unloaded stably and reliably.

56 Claims, 26 Drawing Sheets

U.S. PATENT DOCUMENTS

| | | | |
|---|---|---|---|
| 5,163,037 | 11/1992 | Ohmori et al. | 369/77.2 |
| 5,182,742 | 1/1993 | Ohmori et al. | 369/116 |
| 5,196,978 | 3/1993 | Washo et al. | 360/133 |
| 5,204,853 | 4/1993 | Kamoshita | 369/289 |
| 5,229,987 | 7/1993 | Aoki | 369/77.1 |
| 5,297,133 | 3/1994 | Otsuka et al. | 369/291 |
| 5,329,503 | 7/1994 | Ohmori et al. | 369/13 |
| 5,381,393 | 1/1995 | Ohtani | 369/77.2 |
| 5,384,757 | 1/1995 | Ohmori et al. | 369/13 |
| 5,414,687 | 5/1995 | Ohmori et al. | 369/50 |
| 5,416,762 | 5/1995 | Ohmori et al. | 369/75.2 |
| 5,428,583 | 6/1995 | Ohmori et al. | 369/13 |
| 5,452,271 | 9/1995 | Ohmori et al. | 369/13 |
| 5,481,423 | 1/1996 | Aoki | 360/99.06 |
| 5,500,843 | 3/1996 | Ishii et al. | 369/77.2 |
| 5,502,704 | 3/1996 | Ohmori | 369/77.2 |
| 5,537,376 * | 7/1996 | Ikuma | 369/77.2 |
| 5,557,589 * | 9/1996 | Mukawa et al. | 369/77.2 |
| 5,623,457 | 4/1997 | Seto et al. | 369/13 |
| 5,627,810 | 5/1997 | Ohmori et al. | 369/47 |
| 5,640,280 | 6/1997 | Lee | 359/824 |
| 5,648,944 | 7/1997 | Ohmori et al. | 369/13 |
| 5,663,843 | 9/1997 | Ezawa et al. | 359/824 |
| 5,699,344 | 12/1997 | Ohmori et al. | 369/264 |
| 5,728,240 | 3/1998 | Yamamoto et al. | 148/563 |
| 5,815,344 | 9/1998 | Aoki | 360/99.06 |
| 5,815,470 | 9/1998 | Ohmori et al. | 369/13 |
| 5,841,752 | 11/1998 | Ohmori et al. | 369/75.2 |

FOREIGN PATENT DOCUMENTS

| | | |
|---|---|---|
| 0 571 227 A2 | 11/1993 | (EP) . |
| 0 579 172 A2 | 1/1994 | (EP) . |
| 0 606 911 A2 | 7/1994 | (EP) . |
| 59-60759 | 4/1984 | (JP) . |
| 62-31037 | 2/1987 | (JP) . |
| 62-55221 | 4/1987 | (JP) . |
| 63-29273 | 2/1988 | (JP) . |
| 63-224039 | 9/1988 | (JP) . |
| 2-16418 | 2/1990 | (JP) . |
| 2-94086 | 4/1990 | (JP) . |
| 4-102257 | 4/1992 | (JP) . |
| 4-321972 | 11/1992 | (JP) . |
| 4-355254 | 12/1992 | (JP) . |
| 5-67337 | 3/1993 | (JP) . |
| 5-166280 | 7/1993 | (JP) . |
| 5-298722 | 11/1993 | (JP) . |
| 6-223473 | 8/1994 | (JP) . |
| 6-290524 | 10/1994 | (JP) . |

* cited by examiner

F I G. 25
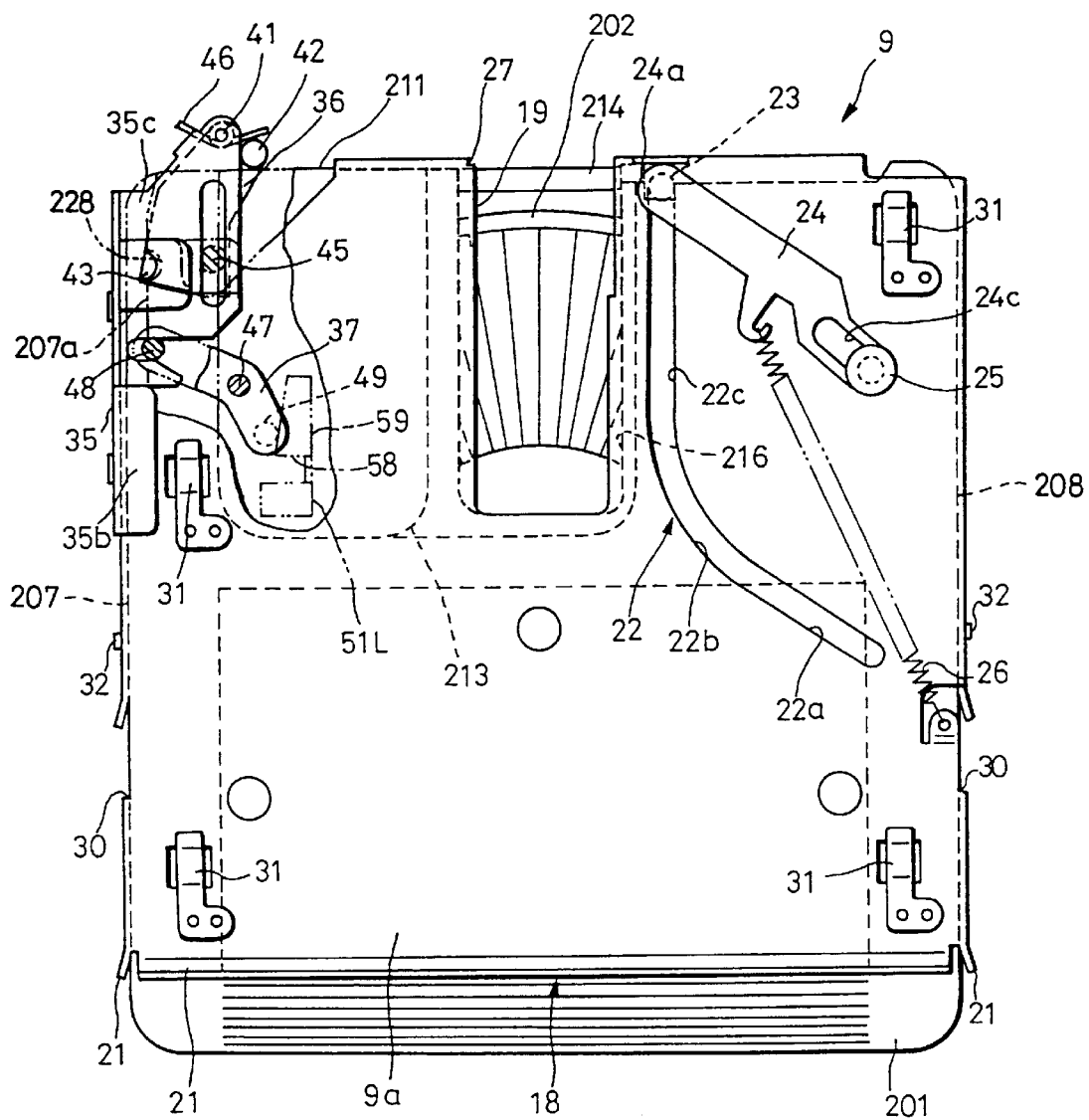
F I G. 26
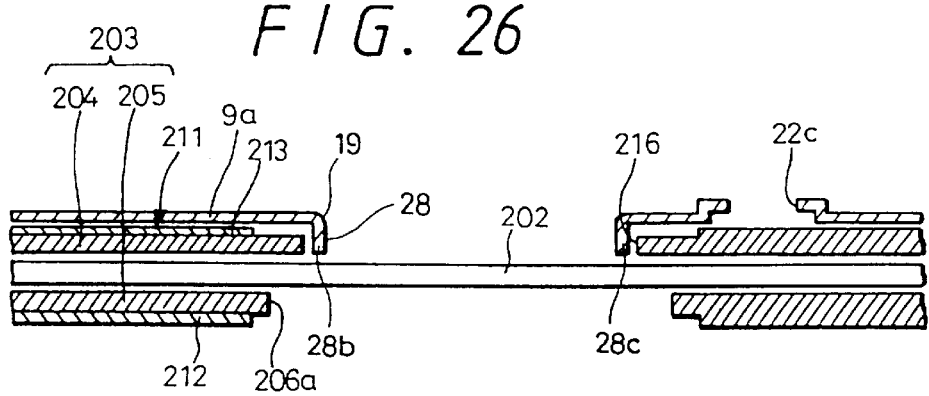

RECORDING AND REPRODUCING APPARATUS WITH LOCK AND RELEASE MECHANISM

This is a divisional of pending application Ser. No. 08/718,361, filed Jan. 6, 1997.

TECHNICAL FIELD

The present invention relates to a recording and reproducing apparatus for use in recording and/or reproducing and recording and reproducing information in and/or from and in and from a recording medium stored in a cartridge, in particular, a magneto-optical disk.

BACKGROUND ART

In general, a magneto-optical disk apparatus for recording and reproducing a magneto-optical disk is known as a disk apparatus capable of recording and reproducing or recording and/or reproducing an information signal in and from or in and/or from a magneto-optical disk rotatably stored within a cartridge of a disk cartridge.

The magneto-optical disk apparatus generally comprises a cartridge loading mechanism having a cartridge holder for holding a disk cartridge, a spindle motor disposed under the cartridge loading mechanism for rotating a magneto-optical disk, a rotation mechanism including a disk table for holding a magneto-optical disk, an optical pickup device located behind the rotation mechanism and having an objective lens, an external magnetic field generating apparatus disposed above the optical pickup device and having a magnetic head applying head, an elevation mechanism disposed ahead of the external magnetic field generating apparatus and the optical pickup device for elevating the rotation mechanism, etc.

In the thus arranged magneto-optical disk apparatus, after the disk cartridge is conveyed to a predetermined cartridge loading position, the magneto-optical disk is rotated at this cartridge loading position and an information signal is written in and read out from the magneto-optical disk.

In such a conventional magneto-optical disk apparatus, a slider apparatus for moving a cartridge holder with the disk cartridge held thereon between a loading position and an unloading position has cam portions formed on right and left portions thereof for supporting the cartridge holder. It is difficult to form the cam portions with a proper positioning relation therebetween. As a consequence, it is frequently observed that the cartridge holder cannot be moved smoothly. Moreover, the cartridge holder is skewed so that the disk cartridge cannot be inserted into and ejected from the cartridge holder satisfactorily.

DISCLOSURE OF THE INVENTION

In view of the aforesaid aspect, it is an object of the present invention to provide a recording and reproducing apparatus in which a cartridge holder can constantly be supported at a correct position and moved smoothly, a disk cartridge can be inserted into and extracted from the cartridge holder smoothly and information can be reliably recorded on or reproduced from and recorded and reproduced from a magneto-optical disk.

As shown in FIGS. 1 through 4, a recording and reproducing apparatus according to the present invention includes a holder in which a cartridge with a recording medium stored therein is inserted and held and the recording medium is loaded on or unloaded from the recording and reproducing apparatus for recording and/or reproducing information as the holder is elevated and lowered. The recording and reproducing apparatus includes drive means on which the recording medium rests and driving the recording medium for recording and/or reproducing operation and elevating means having cams for elevating operation formed at its side portions for elevating and lowering the holder relative to the recording and reproducing position when slid in parallel to the insertion direction of the cartridge. The elevating means includes first and second slide members each having cam grooves defined on it side surfaces, the first and second slide members being coupled with a predetermined clearance such that the first and second slide members can be relatively finely moved.

Further, the first slide member has a through-hole and the second slide member has a protrusion which is engaged with the through-hole with a clearance.

Further, the elevating means elevates and lowers the drive means relative to the recording medium, whereby the recording medium rests on the driving means.

Furthermore, the elevating means further includes a first elevating member with the driving means attached thereto and a second elevating member for rotatably supporting the first elevating member, the second member being elevated and lowered together with the first elevating member as the elevating means is slid.

The recording and reproducing apparatus according to the present invention includes a disk drive comprising a holder in which a disk cartridge is inserted and held, a slider engaged with the holder and slid so as to load and unload the disk cartridge at recording and/or reproducing position, a chucking member on which the disk stored within the disk cartridge loaded at the recording and/or reproducing position rests and a motor for rotating the disk resting on the chucking member, in which the slider includes first and second sliders each having cam grooves formed at its side surfaces and the first and second sliders are coupled with a predetermined clearance so as to be finely moved.

The recording and reproducing apparatus further includes elevating means for elevating and lowering the chucking member. This elevating means includes a first elevating member with a motor being attached thereto and a second elevating member for rotatably supporting the first elevating member and elevated and lowered together with the first elevating member in accordance with the movement of the slider.

Further, the recording and reproducing apparatus includes a supporting shaft for rotatably supporting the first elevating member relative to the second elevating member. This supporting shaft is engaged with an inclined portion provided on the slider.

Further, the recording and reproducing apparatus includes a positioning member for the chucking member fixed to a chassis and having a guide member for guiding movement of the first elevating member.

Further, the disk cartridge includes a circular hole into which the chucking member is inserted and a square hole into which a recording and/reproducing head is inserted when the disk cartridge is loaded on the recording and/or reproducing position, and a bridge portion provided between the circular hole and the square hole for partitioning both holes formed on the lower surface side, the positioning member including a first supporting protrusion member for supporting a surrounding portion of the circular hole and a second supporting protrusion member for supporting the bridge portion.

Further, the second supporting protrusion portion has a height larger that of the first supporting protrusion portion.

Further, the recording and reproducing apparatus includes a disk cartridge lock means provided in the holder for locking the disk cartridge within the holder when the disk cartridge lock means is engaged with the side surface portion of the inserted disk cartridge, the disk cartridge lock means for locking the holder when it is engaged with the slider at the unloading position of the holder.

The recording and reproducing apparatus according to the present invention includes a disk drive apparatus comprising a chucking member with a flat surface on which a disk rests, a motor for rotating this chucking member and a holding member for holding the motor, an elevating means with the holding member attached thereto for elevating and lowering the motor and a motor positioning means having a guide member for guiding elevating and lowering of the motor, the elevating means including a first elevating member with the holding member attached thereto and a second elevating member for rotatably supporting the first elevating member and being elevated and lowered together with the first elevating member.

Further, the recording and reproducing apparatus includes an operation means engaged with the first and second elevating member and which elevates and lowers the motor when it is slid.

Further, the recording and reproducing apparatus includes a support shaft for rotatably supporting the first elevating member relative to the second elevating member, the support shaft being engaged with the operation means.

Further, the disk is stored in the cartridge. The cartridge has on its lower surface a circular hole into which the chucking member is inserted and a square hole into which a recording and/or reproducing head is inserted and a bridge portion provided between the circular hole and the square hole for dividing both holes. The positioning means comprises a first supporting protrusion portion for supporting a surrounding portion of the circular hole and a second supporting protrusion portion for supporting the bridge portion.

Further, the second supporting protrusion portion has a height larger than that of the first supporting protrusion portion.

The present invention includes a head driving apparatus which comprises a magnetic head movable in unison with a carriage in which an optical pickup is attached to the radius direction of the disk loaded at the recording position and applying a magnetic field to the disk and a lifter means for elevating and lowering the magnetic head. The present invention includes a means engaged with said lifter means for locking the magnetic head from moving in the radial direction of the disk and means for releasing the magnetic head locked by the lock means in accordance with the loading operation for loading the disk in the recording position.

Further, the lifter means includes an arm member rotatably attached to the carriage and a holding member engaged with the arm member for holding the arm member at the upper and lower positions.

Further, the holding member is pivotally supported to the carriage by a camshaft with an eccentric cam portion formed at one end side thereof. When the camshaft is rotated, a rotational angle of the arm member is changed, whereby upper and lower positions of the magnetic head relative to the magnetic head is adjusted.

Further, the arm member includes an operation portion for rotating the arm member to float the magnetic head from the disk. The lock means locks the magnetic head from moving when engaged with the operation portion.

Further, the recording and reproducing apparatus includes a holder for holding the disk and a slider for loading and unloading the disk by elevating and lowering the holder. The lock releasing means releases the magnetic head from being locked in accordance with movement of the slider when the holder is lowered.

Further, the recording and reproducing apparatus includes a motor for unloading the disk by moving the slider and an unloading operation means operated from the outside for elevating the magnetic head and energizing the lock means for locking movement of the magnetic head when the motor is de-energized.

Furthermore, the unloading operation means is driven by moving the slider from the outside.

The present invention includes an optical pickup device comprising a fixed optical unit composing a laser light source and a detector for detecting laser beam reflected on a disk and a carriage having an objective lens for converging the laser beam emitted from the fixed optical unit on a signal recording surface of the disk, the carriage being moved in the radial direction of the disk. The optical pickup device further comprises a holder for holding the objective lens, the holder having a coil for driving the objective lens in the focusing direction and a base for attaching the holder to the carriage through a resilient member in such a manner that the holder can be displaced in the focusing direction. The base includes a fixed portion fixed to the fixed surface provided on the carriage. The fixed portion comprises first and second fixed portions bonded to the respective fixed portions by one of a plurality of kinds of adhesives each having a different property.

A plurality of kinds of adhesives contain an instant adhesive and an ultraviolet-curing adhesive.

Further, the first and second fixed portions are composed of through-holes defined on the base and engaged with a plurality of pins formed on the fixed surface of the carriage.

Further, the second fixed portion is provided on the surrounding portion of the first fixed portion. The base is temporarily fixed to the carriage by the instant adhesive and the base is finally fixed to the carriage by putting the ultraviolet-curing adhesive into the first fixed portion.

Further, a plurality of kinds of adhesives contain a first adhesive having adhesive force against force having durability and a second adhesive having adhesive force against instant impulse.

Further, the resilient member includes a pair of parallel leaf springs, and a tape-like member for suppressing vibration of leaf spring is attached to one of the leaf springs at its end portions on the holder side and the base side.

Further, one of the pair of leaf springs includes a flexible interconnection film formed along the leaf spring for supplying a drive current from the base side to the coil.

Further, the flexible interconnection film is attached to the leaf spring by the above-mentioned tape-like member.

Further, a part of the flexible interconnection film is fixed to the base and the flexible interconnection film on the base includes land portions for supplying a test focusing current to the coil.

The present invention relates to a disk cartridge for storing a recording disk in a space formed by fastening an upper half and a lower half. The upper half has a groove portion formed from the front end to the direction of the central portion so as to oppose a mis-insertion preventing protrusion portion formed on a disk drive. An engagement concave portion which is engaged and held by the holding member disposed within the disk drive when the disk cartridge is loaded onto the disk drive is provided on the inner surface of the groove portion.

Further, opening portions from exposing a part of the signal recording surface of the accommodated recording disk to the outside are formed on the front surface portions of the upper half and a lower half. A shutter member is slidably provided on the front surface portions so as to open and close these opening portions.

Further, the above-mentioned groove portion is formed on the left and right side surfaces of the upper half.

Furthermore, the bottom surface of the above-mentioned groove portion is formed from the upper half to the lower half.

Furthermore, the above-mentioned groove portion is substantially L-shape in cross section.

The present invention relates to a disk cartridge in which a recording disk is accommodated in a space formed by fastening an upper half and a lower half. At least either the upper half or the lower half includes a pair of groove portions defined on its right and left side surfaces from the front end to the central portion direction which are opposed to mis-insertion preventing protruded portions formed on the disk drive when the disk cartridge is inserted into the disk drive. Engagement concave portions which are engaged and held with the holding member disposed within the disk drive when the disk cartridge is loaded onto the disk drive are formed on the inner surfaces of the above groove portions. On the other hand, a width from the bottom surface of the groove portion to the bottom surface of the other groove portion is smaller than that of the 3.5-inch size microfloppy disk shell.

Further, the disk cartridge is substantially equal to or slightly larger than a width of a microfloppy disk shell of which the maximum width is 3.5 inches.

Further, the disk cartridge has a rib-shaped portion continued to the groove portion and a dimension from the top portion of one rib-shaped portion to the top of the other rib-shaped portion is substantially equal to a width of 3.5-inch size microfloppy disk shell.

Further, a thickness of rib-shaped portion is smaller than that of the 3.5-inch size microfloppy disk shell.

Further, the rib-shaped portions are formed on left and right side surfaces of the upper half.

Further, the diameter of the recording disk is 88 mm, the maximum size of the disk cartridge is 92 mm, and the width between the two groove portions is 87 mm.

Furthermore, the groove portion is formed adjacent to the storage space of the recording disk.

The present invention relates to a disk drive including a holder for holding a disk cartridge, a loading means for moving this holder from the insertion and eject position to the recording and reproducing position for recording and/or reproducing information, and a recording head for recording information on the disk stored within the disk cartridge at the recording and reproducing position. The holder includes an insertion mouth defined at the front side to receive the disk cartridge, left and right side portions opposing the left and right side surfaces of the inserted disk cartridge, guide portions elongated from these side surfaces for guiding the insertion of the disk cartridge and a mis-insertion preventing protrusion protruded from the inside of at least one side portion of the left and right side portions so as to oppose the groove portion defined on the side surface of the inserted disk cartridge. The protrusion is formed on the side portion of the holder with a predetermined width relative to the thickness direction of the inserted disk cartridge to inhibit the insertion of the 3.5-inch size microfloppy disk.

Further, the protrusion is formed in the side portion of the holder at the position displaced in the lower direction from the center position relative to the thickness direction of the inserted disk cartridge, and has a spacing portion smaller than the thickness of the shell of the 3.5-inch size microfloppy disk on the upper side of the protrusion.

Further, the spacing formed between the top of the protrusion formed on any one of the left and right side portions and the other side portion is smaller than the width of the shell of the 3.5-inch size microfloppy disk.

Further, the protrusion is formed on the left and right side surface portions of the holder.

Further, a spacing between two protrusions formed on the left and right side portions is made smaller than the width of the shell of the 3.5-inch size microfloppy disk.

Furthermore, the holder has on its upper surface opposite to the insertion mouth defined an opening portion into which the recording head is inserted at the recording and reproducing position, and the protrusion is protruded from the opening portion of the side portion to the inner surface of the insertion mouth side.

In the recording and reproducing apparatus according to the present invention, since the elevating means for elevating and lowering the cartridge holder comprises the first and second slide members which are coupled with a clearance, the two slide members can be adjusted so as to accurately oppose the cam members. Also, the loading and unloading of the disk cartridge can be carried out stably and smoothly and the chucking of the disk can be carried out accurately.

Moreover, the head means can be stably and reliably opposed to the disk chucked and rotated. Also, the head means can be satisfactorily held when the disk cartridge is loaded and unloaded. Furthermore, the objective lens of the head means can be reliably and stably held and the focusing can be adjusted with ease.

Furthermore, the mis-insertion of the 3.5-inch size microfloppy disk can be prevented and only a predetermined magneto-optical disk can be reliably recorded and reproduced.

BRIEF DESCRIPTION OF DRAWINGS

FIG. 25 is a plan view illustrating a partly cross-sectional fashion a manner in which the shutter member is fully released by the shutter releasing pin during the disk cartridge loading onto the cartridge holder.

FIG. 26 is a cross-sectional view illustrating a part of FIG. 25 in an enlarged scale.

BEST MODE FOR CARRYING OUT THE INVENTION

Figure 1:
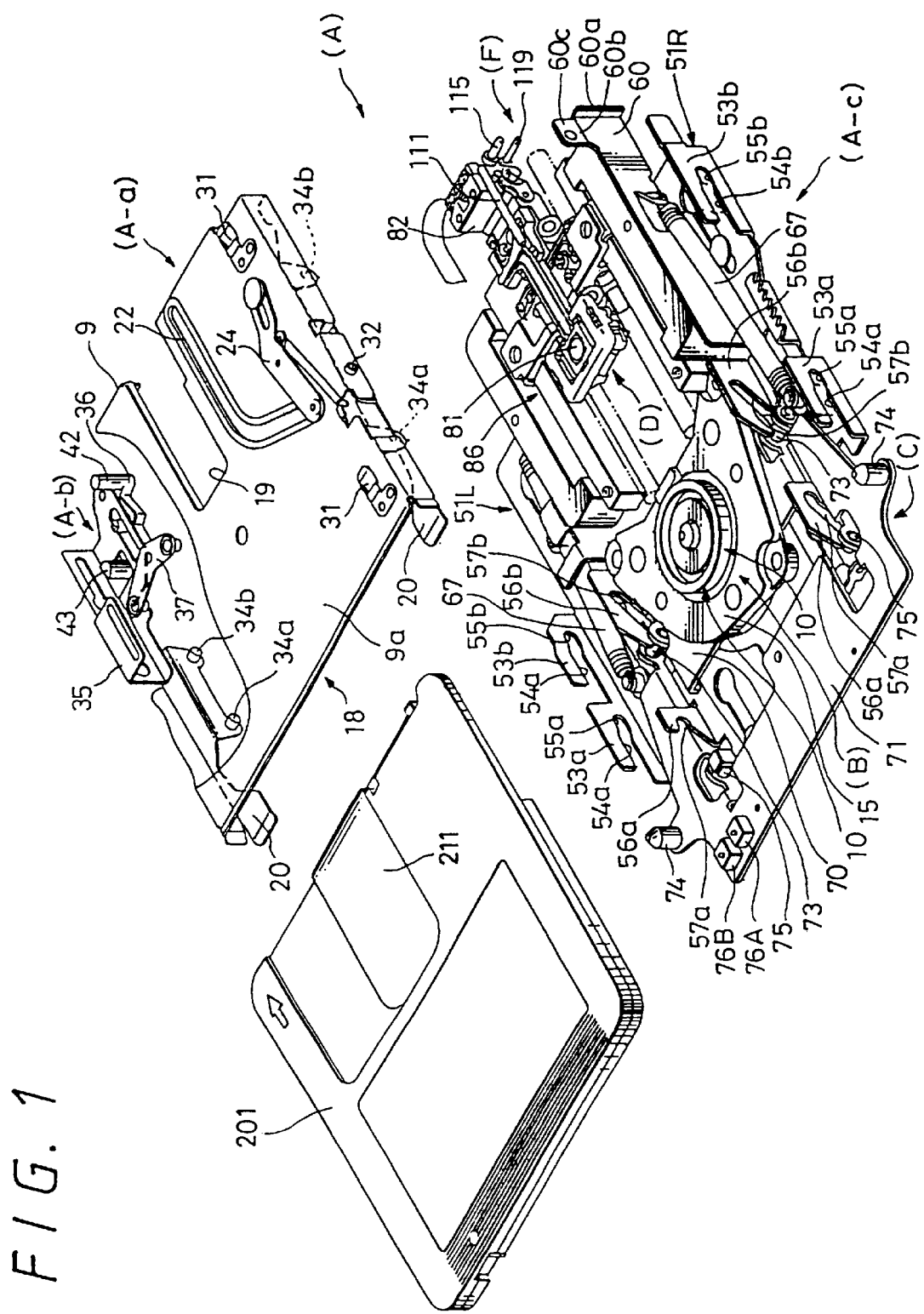
FIG. 1 is a perspective view illustrating a main portion of a recording and reproducing apparatus according to an embodiment of the present invention in a partly-exploded fashion.

A recording and reproducing apparatus applied to a magneto-optical disk apparatus according to the present invention will be described below with reference to the drawings.

Initially, a disk cartridge in which a magneto-optical disk loaded onto this magneto-optical disk apparatus is rotatably stored will be described with reference to FIGS. 20 and 21.

As illustrated, a disk cartridge 201 comprises a disk-shaped magneto-optical disk 202 and a cartridge 203 for rotatably storing therein the magneto-optical disk 202.

The magneto-optical disk 202 has a data recording area on which a magnetic recording layer is formed. An information signal is written in and read out from or written in and/or read out from the magnetic recording layer by a magneto-optical means. The magneto-optical disk 202 has a signal recording surface formed on one major surface portion thereof and a disk-like chucking hub 202a made of a metal material formed on a disk central portion.

On the other hand, the cartridge 203 comprises a pair of upper half 204 and a lower half 205 each of which is substantially box-shaped to have a space large enough to store therein the magneto-optical disk 202. The cartridge is formed by fastening the upper half 204 and the lower half 205. The cartridge 203 has a front surface portion 209 with a shutter releasing member fitting portion 224 formed therein. A shutter releasing pin (described later on) of a cartridge holder engages with the shutter releasing member fitting portion to close a cartridge opening portion. Mis-insertion preventing grooves 207a, 208a are defined in substantially first half portions of both side surface portions 207, 208 so as not to be located at a disk storage portion as shown in FIG. 20. Pin fitting holes 228, 229 are defined in the inner surfaces of the grooves 207a, 208a, i.e., on the front portions of the side surfaces of the lower half 205 in succession to the mis-insertion preventing grooves 207a, 208a. Cartridge hold pins (described later on) are fitted into the pin fitting holes 228, 229 when the cartridge is inserted into the cartridge holder. According to this embodiment, a spacing between the two mis-insertion preventing grooves 207a and 208a of the cartridge 203 is smaller than a minimum value of a width of a shell which is the case of 3.5-inch size microfloppy disk. Moreover, a thickness of rib-shaped portion, which are side surface portions of the upper half 204 corresponding to the mis-insertion preventing grooves 207a, 208a, is smaller than the thickness of the shell of the floppy disk.

Figure 20:
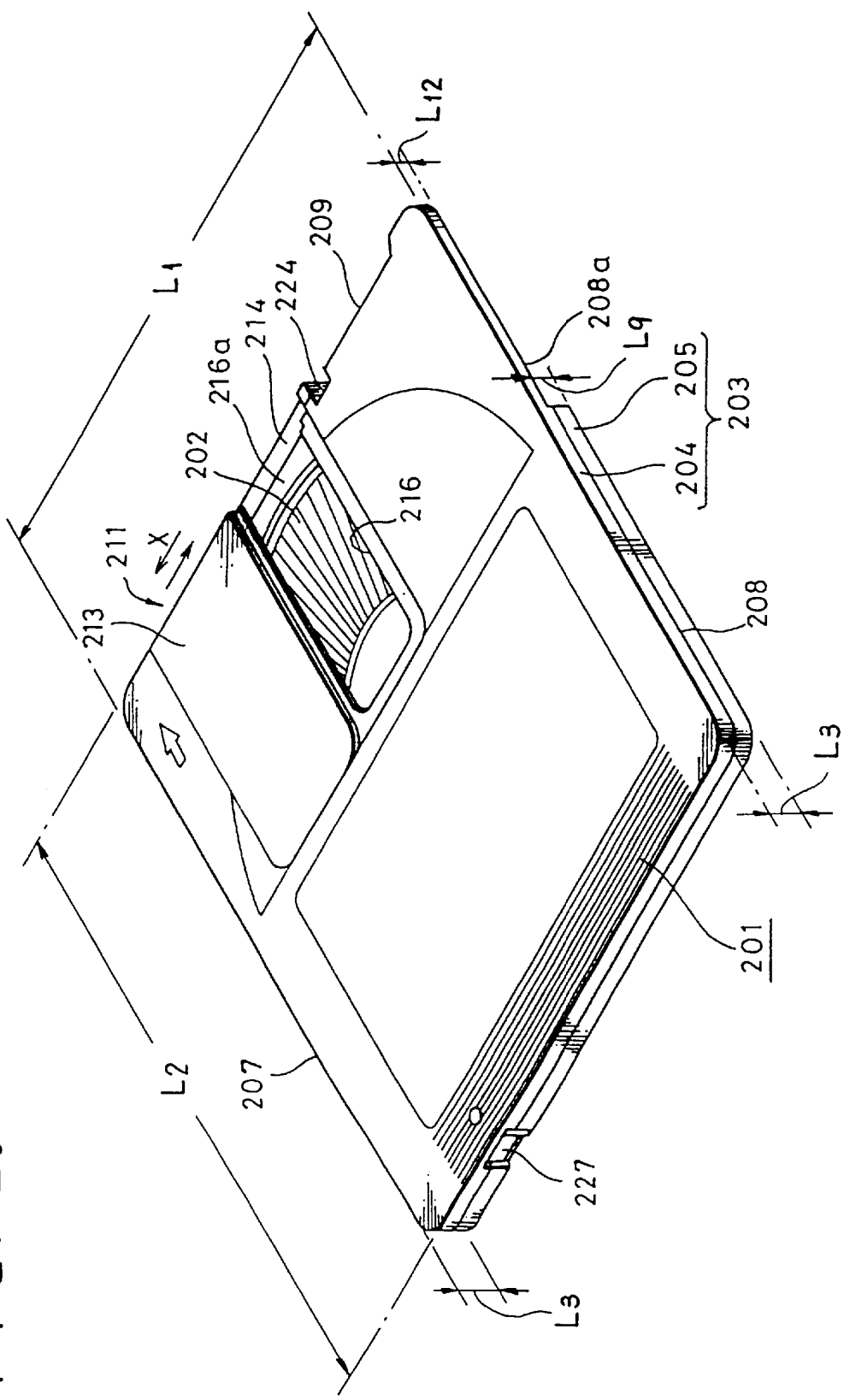
FIG. 20 is a perspective view illustrating the disk cartridge from the upper surface side.
Figure 21:
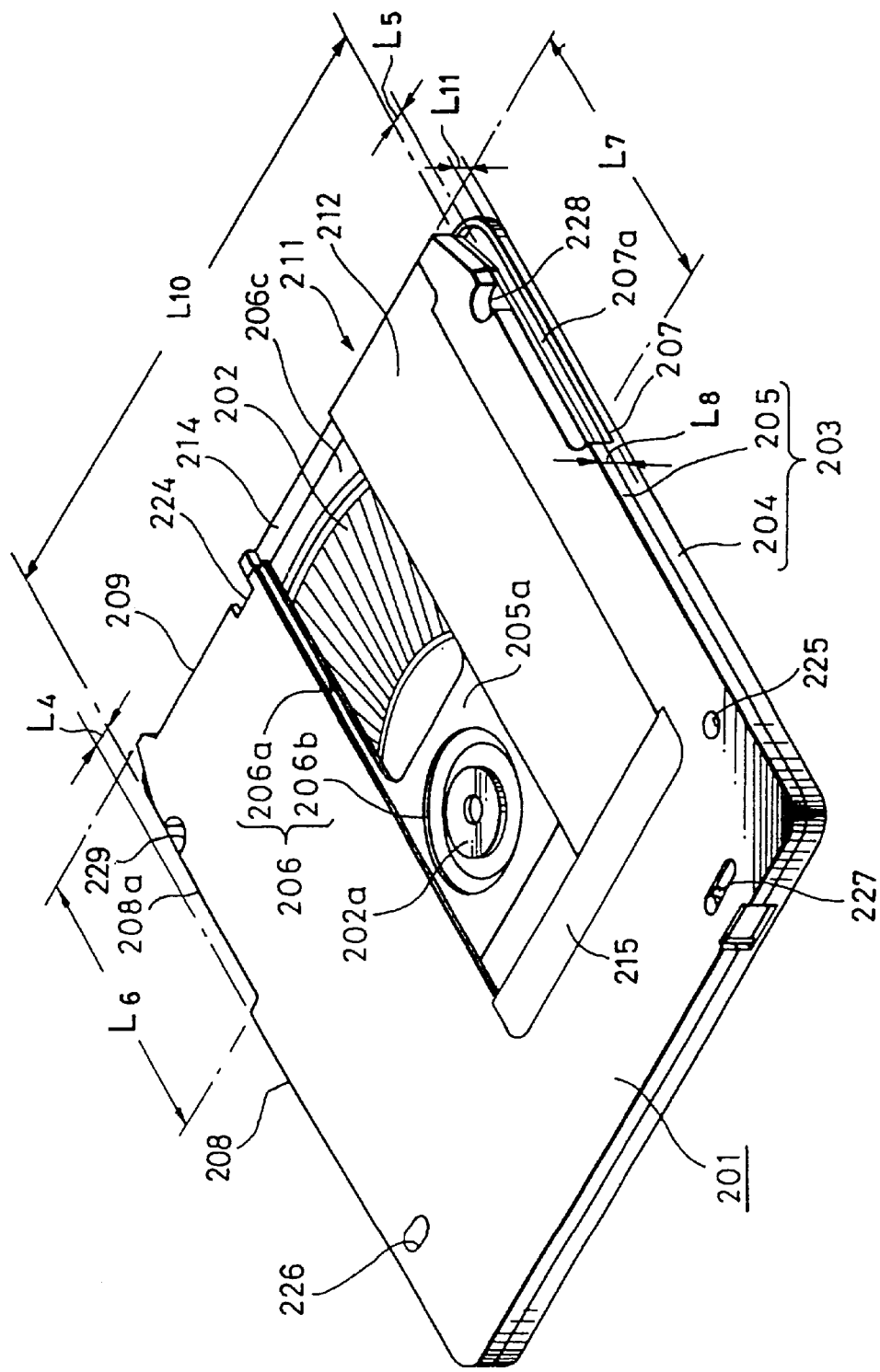
FIG. 21 is a perspective view illustrating the disk cartridge from the lower surface side.

Specifically, in FIGS. 20 and 21 showing the disk cartridge 201, a full width $L_1$ of the cartridge 203 is 92.0 mm (±0.2 mm), a full length $L_2$ is 97.0 mm (±0.3 mm), and a thickness $L_3$ of both side portions is 5.0 mm (±0.2 mm), respectively. Widths $L_4$, $L_5$ of both the mis-insertion preventing grooves 207a, 208a are 2.5 mm (+0.3 mm/−0.0 mm), lengths $L_6$, $L_7$ are 38.5 mm, and depths $L_8$, $L_9$ are 3.0 mm (±0.2 mm), respectively.

Therefore, in the cartridge 203 of the disk cartridge 201 according to this embodiment, a spacing between the two mis-insertion preventing grooves 207a and 208a becomes substantially 87.0 mm and thicknesses $L_{11}$, $L_{12}$ of the rib-shaped portions, which are both side surface portions of the upper half 204 corresponding to the mis-insertion preventing grooves 207a, 208a, are $L_3$–$L_8$ and $L_3$–$L_9$ and become substantially 2.0 mm, respectively. For the cartridge 203 of the disk cartridge 201 according to this embodiment, a full width of the shell of the 3.5-inch size microfloppy disk is 90.0 mm (+0.4 mm/−0.1 mm), a full length is 94.0 mm (±0.3 mm), and a thickness is 3.3 mm (±0.2 mm), respectively. Accordingly, a spacing $L_{10}$ between the two mis-insertion preventing grooves 207a and 208a of the cartridge 203 is smaller than the minimum value of the width of the shell of the 3.5-inch size microfloppy disk. Thicknesses $L_{11}$, $L_{12}$ of the rib-shaped portions which are both side surface portions opposing the mis-insertion preventing grooves 207a, 208a of the upper half 2 are smaller than the thickness of the shell of the floppy disk, respectively.

The cartridge 203 has on its rear surface of the lower half 205 defined cartridge positioning engagement holes 225, 226 with which there are engaged cartridge positioning pins (will be described later on) for positioning the disk cartridge 201 within the magneto-optical disk apparatus body in the horizontal direction. A mis-erase prevention member 227 for determining whether or not an information signal can be written in the magneto-optical disk 202 is formed near the cartridge positioning pin engagement hole 225. Further, the lower half 205 has on its surface defined a first opening portion 206 for exposing a part of the signal recording surface of the magneto-optical disk 202 and a chucking hub 202a to the outside of the cartridge 201.

The first opening portion 206 is divided by a narrow thin coupling surface 205a to provide a rectangular opening portion 206a and a circular opening portion 206b. The rectangular opening portion is defined at substantially the central portion in the left and right direction between one side surface 207 and the other side surface 208 of the cartridge 203, extending from the front surface portion 209 side of the cartridge 203 to substantially the central portion in the front and back direction of the cartridge so as to expose a part of the signal recording surface of the magneto-optical disk 202. The circular opening portion is defined so as to expose the chucking hub 202a. When the disk cartridge 201 is loaded into the magneto-optical disk apparatus body, the chucking hub 202a is opposed to a disk table of a disk rotation drive mechanism (will be described later on) from the circular opening portion 206b and the signal recording surface of the magneto-optical disk 202 is opposed to an objective lens of an optical pickup device (will be described later on) from the rectangular opening portion 206a.

As shown in FIG. 20, the upper surface 204 has at its position near the front surface portion 209 of the cartridge 203 defined a second opening portion 216 opposing the rectangular opening portion 206a of the first opening portion 206.

The second opening portion 216 is formed as a rectangular opening portion equivalent to the rectangular opening portion 206a of the first opening portion 206 and which is large enough to expose a part of the major surface portion of the other side of the magneto-optical disk 202 to the outside of the cartridge 203. When the disk cartridge 201 is loaded into the magneto-optical disk apparatus body, the major surface of the other side of the magneto-optical disk 202 is opposed to a magnetic field applying head (will be described later on) from the second opening portion. The front surface portion 209 of the cartridge 203 has at its positions corresponding to the opening portions 206, 216 formed recess concave portions 206c, 216a in order for the magnetic field applying head and the optical pickup device to easily enter in a closely opposing relation to the respective major surface portions of the magneto-optical disk 202. Specifically, a thickness of a central portion near the front surface portion 209 of the cartridge 203 is reduced at its portions corresponding to the first and second opening portions 206 and 216.

The cartridge 203 has a shutter member 211 slidably attached thereto for opening and closing the two opening portions 206, 216.

The shutter member 211 of a deformed U-shape comprises a first shutter plate portion 212 for closing the first opening portion 206 of the lower half 205 over the two opening portions 206a, 206b and a second shutter plate portion 213 provided in parallel to the first shutter plate portion 212 for closing the second opening portion 216 of the upper half 204. A slide guide member 214 is fixedly elongated from the base end coupling portion of the first shutter plate portion 212 and the second shutter plate portion 213 in the closing direction and slidably engaged to the front surface portion 209 of the cartridge 203.

The first shutter plate portion 212 is a rectangular member narrow enough to close the two opening portions 206a, 206b of the first opening portion 206. The first shutter plate portion 212 is pressed at its tip end portion by a shutter hold down plate 215 and thereby prevented from being floated from the cartridge 203.

On the other hand, the second shutter plate portion 213 is a rectangular member wide enough to close at least the second opening portion 216.

A thickness of the slide guide member 214 is substantially equal to the thickness of the thin central portion of the cartridge 203, i.e., the aforementioned thicknesses of the recess concave portions 206c and 216a. A torsion coil spring (not shown) is interposed between the slide guide member 214 and the cartridge 203 in order to constantly spring-bias the shutter member 21 in the direction in which the first opening portion 206 and the second opening portion 216 are closed.

In FIG. 20, arrows X denote directions in which the shutter member 211 is moved between the position at which the shutter member closes the two opening portions 206, 216 and the position at which the shutter member opens the two opening portions 206, 216.

A magneto-optical disk apparatus for recording and/or reproducing an information signal on and/or from the magneto-optical disk 202 stored in the thus arranged disk cartridge 201 will be described with reference to FIGS. 1 through 19.

Figure 2:
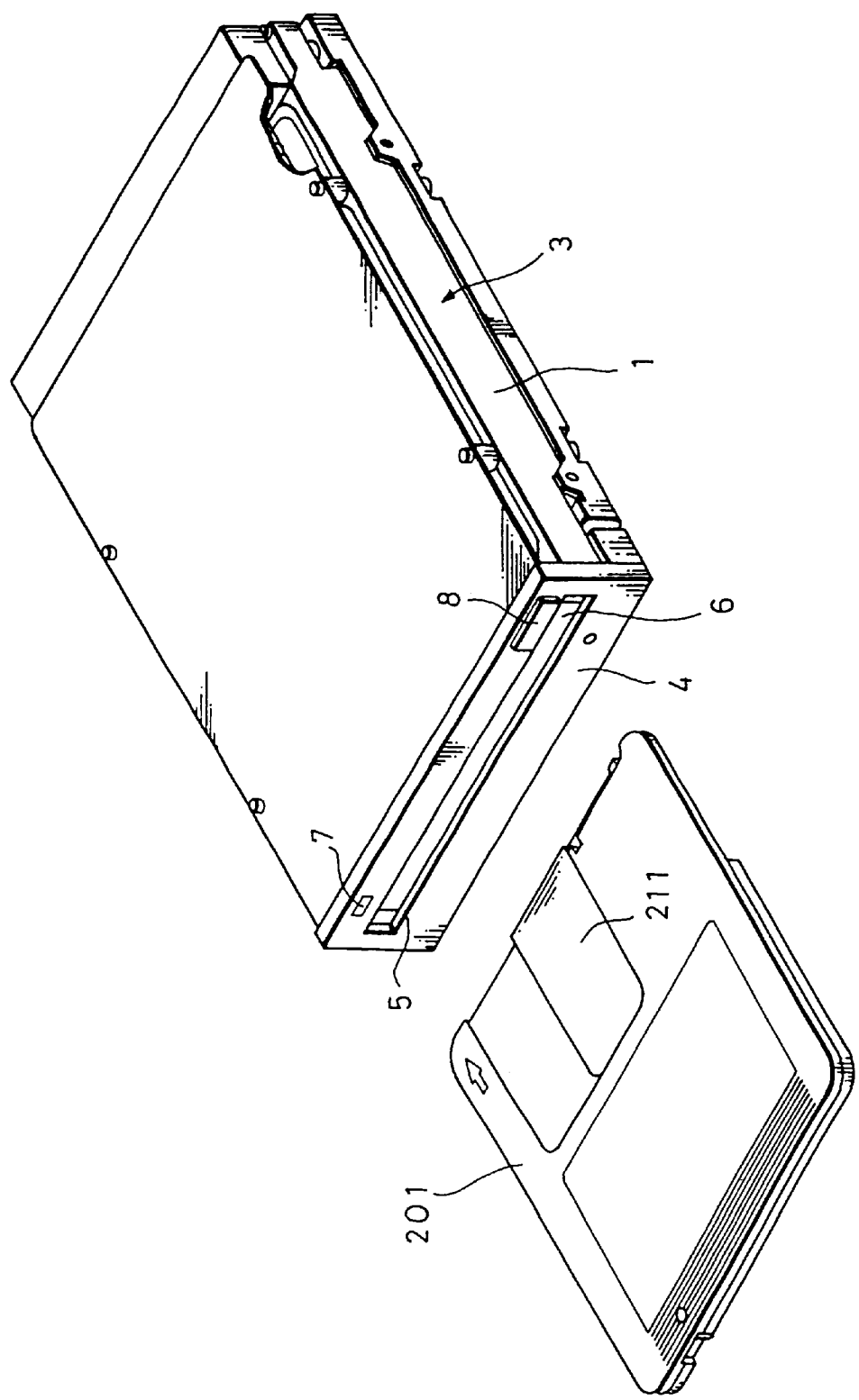
FIG. 2 is a perspective view illustrating an outer appearance of a recording and reproducing apparatus and a disk cartridge according to the embodiment of the present invention.

As shown in FIG. 2, a magneto-optical disk apparatus according to this embodiment comprises a chassis 1 of substantially U-shape in cross-section, a housing (disk apparatus body) 3 having incorporated therein a variety of mechanisms for recording and reproducing the magneto-optical disk 202 in the disk cartridge 201 and a front panel 4 provided at the front surface portion of the housing 3. The front panel is exposed to the outside when the magneto-optical disk apparatus is assembled into a computer body or sub-system, etc., for example.

The front panel 4 has a cartridge insert and eject mouth 5 for inserting and ejecting the disk cartridge 201 into and from the housing 3. A lid 6 is rotatably attached to the front surface portion of the housing 3 to open and close the cartridge insert and eject mouth 5, whereby the magneto-optical disk stored in the disk cartridge can be prevented from being smudged by dusts or the like. Further, the front panel 4 includes a light-emitting element 7 for displaying the manner in which the magneto-optical disk 202 is recorded and reproduced and an eject button 8 for ejecting the disk cartridge 201.

Figure 3:
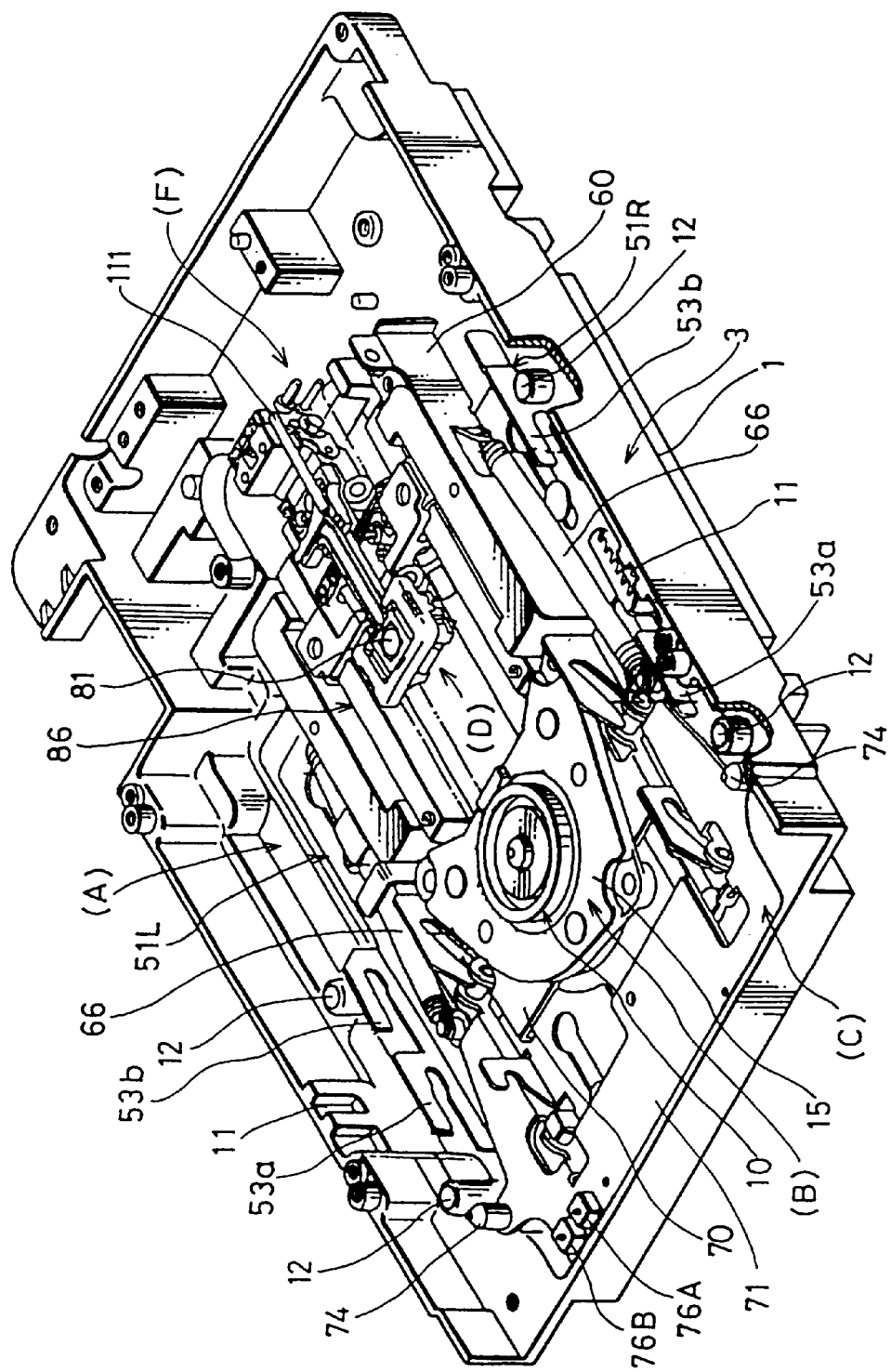
FIG. 3 is a perspective view illustrating an inside structure of the recording and reproducing apparatus according to the embodiment of the present invention.
Figure 4:
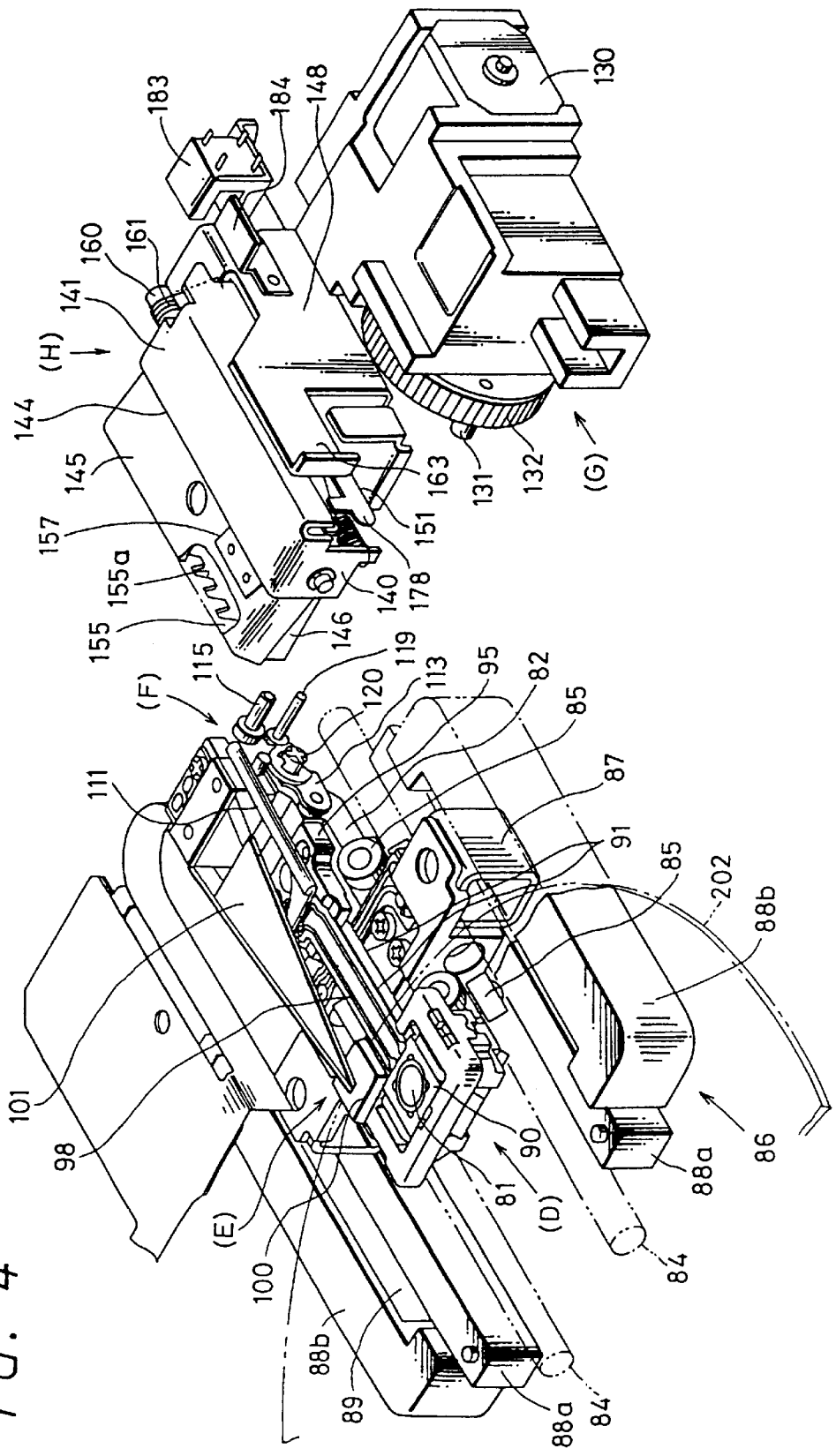
FIG. 4 is an exploded perspective view illustrating a part of the recording and reproducing apparatus according to the embodiment of the present invention.

As shown in FIGS. 1, 3 and 4, the housing 3 houses a cartridge loading/unloading mechanism (A) having a cartridge holder 9 for holding the disk cartridge 201 such that the disk cartridge can be freely inserted and ejected from the cartridge holder, a disk rotation mechanism (B) disposed under the cartridge loading/unloading mechanism (A) and having a spindle motor 10 for rotating the magneto-optical disk 202 and a disk table (spindle holding member which will be described later on) for holding the magneto-optical disk 202, an elevating mechanism (C) for elevating and lowering the disk rotation mechanism (B) in unison with the cartridge loading/unloading mechanism (A), an optical pickup device (D) provided behind the disk rotation mechanism (B) and having an objective lens 12, an external magnetic field generating apparatus (E) provided above the optical pickup device (D) and having a magnetic field applying head for the magneto-optical disk 202, a lifter mechanism (F) disposed near the external magnetic field generating apparatus (E) for holding the magnetic field applying head at the loading position and the unloading position, a drive mechanism (G) disposed on one side of the lifter mechanism (F) for applying a loading drive force to the magnetic field applying head, and a transmission mechanism (H) disposed behind the cartridge loading/unloading mechanism (A) for transmitting a loading/unloading drive force to the lifter mechanism (F).

Figure 5:
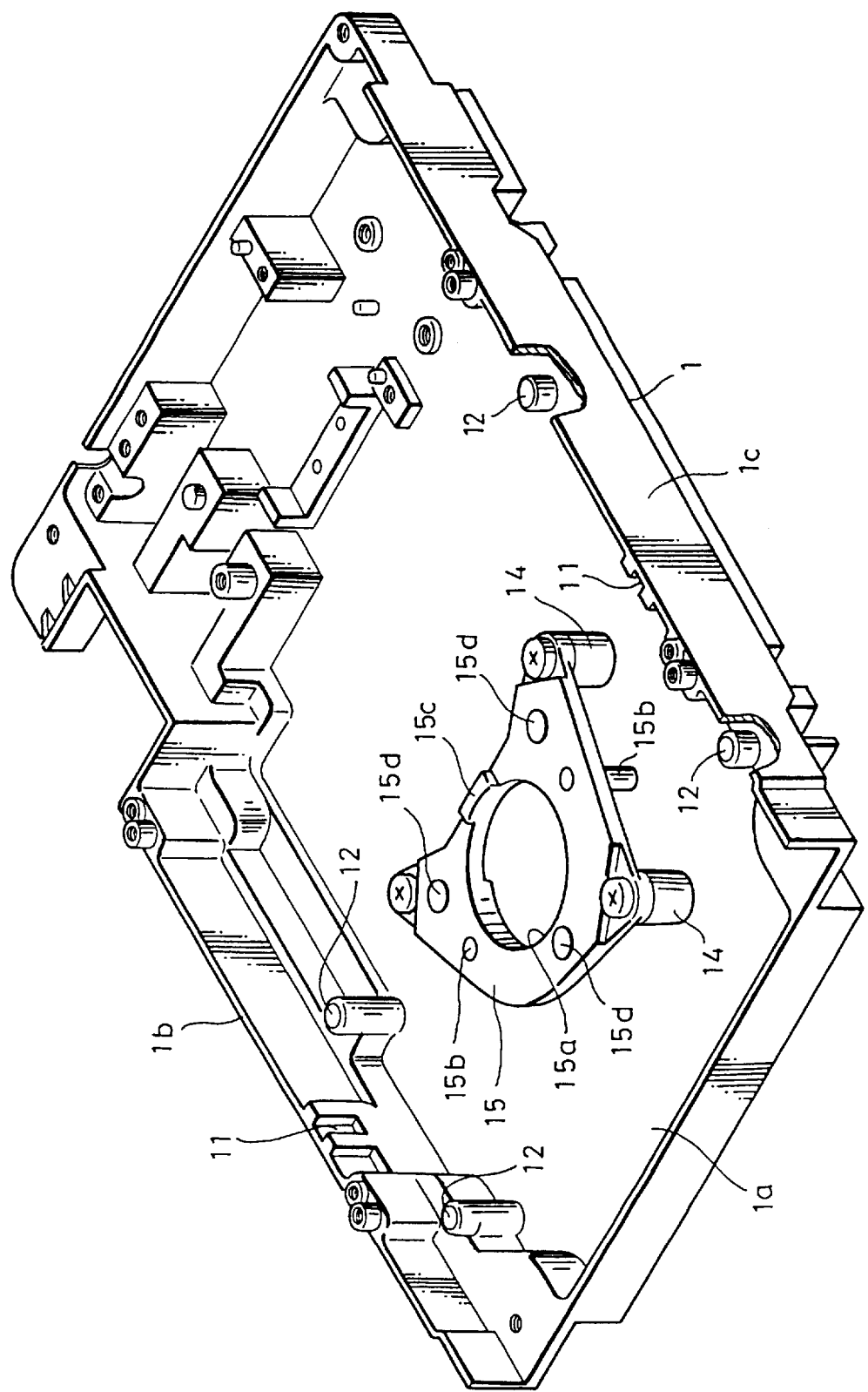
FIG. 5 is a perspective view illustrating a chassis of the recording and reproducing apparatus according to the embodiment of the present invention.

A chassis, generally depicted at reference numeral 1 in FIG. 5, includes guide groove portions 11 formed on the inner surfaces of side wall portions 1b, 1c near the front side from the center in the vertical direction of a chassis bottom surface 1a in order to position the front and back direction of the cartridge holder 9 and to guide the elevating and lowering of the cartridge holder. The chassis 1 has standard supporting portions 12 of the disk cartridge 201 provided at the front and back positions across the two guide groove portions 11. A plurality of bosses 14 each being protruded with a predetermined spacing in the circumferential direction are located at the central portion of the first half portion of the chassis bottom surface 1a. A spindle motor positioning member 15 having an opening portion 15a into which the spindle motor 10 is inserted and a pair of spindle elevating and lowering guide pins 15b downwardly protruded in an opposing relation to the diametrical direction of the opening portion 15a is attached to these bosses 14. On the upper surface of the positioning member 15 are formed a plurality of support protruded surfaces 15c, 15d which support the circumferential surface of the center circular opening portion 206b of the disk cartridge 201. The support protruded surface 15c corresponding to a coupling surface 205a between the circular opening portion 206b and the rectangular opening portion 206a is formed higher than other support protruded surface 15d. The other support protruded surface 15d may be formed continuously.

Embodiments of various mechanisms (A) to (H) for recording and reproducing the magneto-optical disk 20 will be described with reference to FIG. 1 and FIGS. 3 through 19.

(A) Cartridge Loading/unloading Mechanism

The cartridge loading/unloading mechanism (A) includes the cartridge holder 9 comprising a shutter opening apparatus (A-a) for automatically opening the shutter member 211 of the disk cartridge 201 and a disk cartridge lock mechanism (A-b) for holding the disk cartridge 201.

Figure 6:
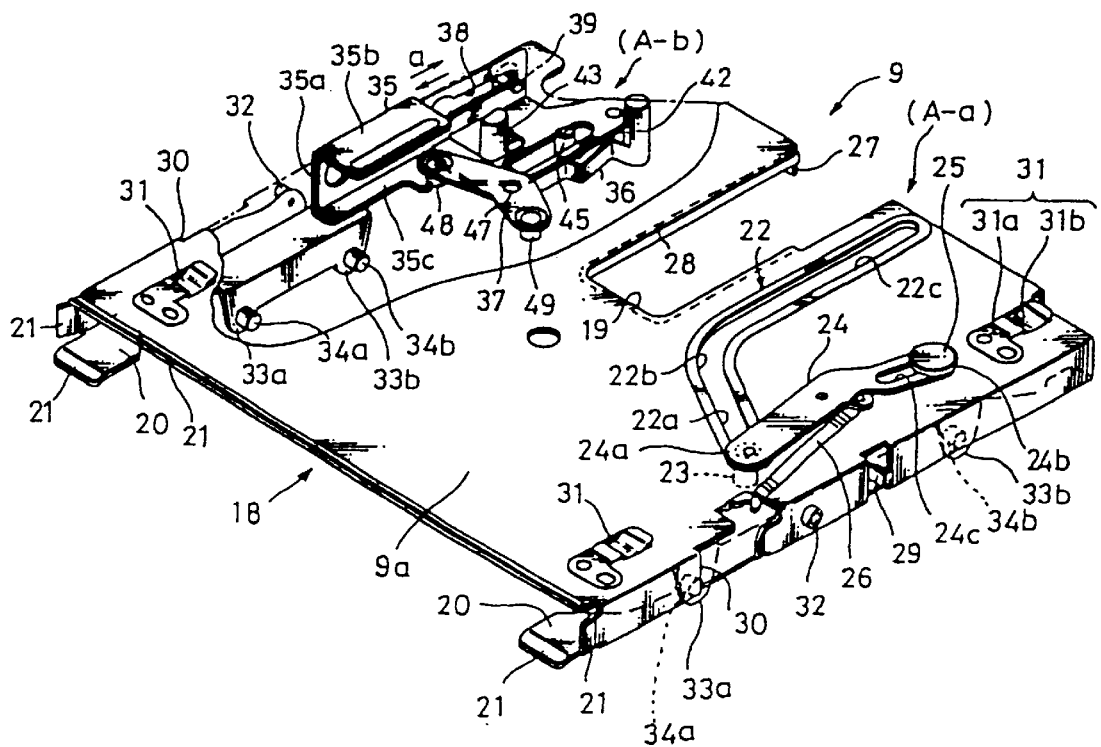
FIG. 6 is a perspective view illustrating a cartridge lock apparatus.

As shown in FIG. 6, the cartridge holder 9 is flat and comprises a rectangular cartridge insertion and extraction mouth 18 opened in the front and back direction, a top plate 9a and a concave opening portion 19 defined in the central portion of the latter half portion of the top plate. An external magnetic field generating apparatus can be inserted into and extracted from the concave opening portion 19. The cartridge holder 9 has on its both sides guide supporting portions 20 extended backwardly from the cartridge insertion and extraction mouth 18 for guiding the disk cartridge 201 when the cartridge 201 is inserted into and extracted from the cartridge holder 9. The guide supporting portions 20 have a plurality of insertion guide tabs 21 formed on the front ends thereof. The shutter opening apparatus (A-a) is provided on the top plate 9a of the cartridge holder 9.

The shutter opening apparatus (A-a) comprises a cam groove 22 having a trajectory for opening the shutter member 211 in unison with the insertion operation of the disk cartridge 201 and a shutter opening pin supporting member 24 having a shutter opening pin 23 movable within the cam groove 22.

The cam groove 22 is a cam groove comprising an inclined portion 22a inclined with an inclination to the insertion direction of the disk cartridge 201, an arcuate portion 22b elongated to the inclined portion 22a and a straight-line portion 22c substantially in parallel to the insertion direction of the disk cartridge 201.

On the other hand, the shutter opening pin supporting member 24 is formed as substantially V-shape comprising a front end portion 24a and a rear end portion 24b each of which is substantially semi-circular shape as seen from the top. The shutter opening pin supporting member further includes a guide groove 24c of oblong opening extended from the rear end portion 24b in the longitudinal direction and with which a guide pin 25 with a flange erected at the rear portion of the top plate 9a of the cartridge holder 9 is engaged. The chassis opening pin supporting member 24 is constantly spring-biased by a tension coil spring 26 in the direction in which the shutter opening pin 23 is positioned at the starting end portion of the cam groove 22.

A cartridge insertion position restricting tab 27 for restricting the insertion direction position of the disk cartridge 201 is downwardly bent on the rear end of the top plate 9a of the cartridge holder 9 so as to be protruded in the inside of the cartridge holder 9. A protruded edge portion 28 opposing the opening portion 216 of the upper half 204 side of the cartridge 203 from the rear edge inner surface to both side edge inner surface is inwardly protruded in the peripheral edge of the concave opening portion 19. In this protruded edge portion 28, a front edge portion 28a located at substantially the central portion of the top plate 9a is served as a mis-insertion preventing means for floppy disk or the like. Both side edge portions 28b, 28c are served as guides for guiding the disk cartridge 201 when the disk cartridge is inserted, i.e., both side edge portions of the second opening portion 216 in the opened state are slidably opposed to the respective side edge portions 28b, 28c. Moreover, one side edge portion 28b is served as a preventing means for preventing the opened shutter member 211 from being closed unintentionally.

Further, engagement pawl members 29, 29 for preventing mis-insertion of the cartridge are inwardly bent at the lower half portion of the cartridge holder 9 at its rear central portions of both side surfaces. A spacing between the upper end edge of the engagement pawl members 29, 29 and the inner surface of the top plate 9a is equal to or slightly larger than the thickness of the side surface portion of the upper half 204 opposing the mis-insertion preventing grooves 207a, 208a of the disk cartridge 201. An apparent spacing between the upper end edge of the engagement pawl member 29 and the lower end edge of the protruded edge portion 28 is smaller than the thickness of the shell of the floppy disk as seen from the front direction.

Recesses 30 opened in and out the holder are formed between the front ends and the engagement pawl members 29 in both side surfaces of the cartridge holder 9 thereby to escape the protruded portions of the inner surface sides of both side wall portions 1b, 1c of the chassis 1. A cartridge pressing spring member 31 for urging the disk cartridge 201 against the guide supporting portion 20 from the cartridge height direction is attached to the top plate 9a of the cartridge holder 9 so as to oppose the inside of the holder.

The cartridge pressing spring member 31 comprises a supporting portion 31a fixed to the top plate 9a of the cartridge holder 9 and a cartridge pressing portion 31b which opposes the inside of the holder to contact with the upper surface of the disk cartridge 201.

The cartridge holder 9 has at its substantially centers of both side surfaces, more specifically, between the engagement pawl members 29 and the recesses 30 placed guide pins 32 which are engaged with the guide grooves 11 of the chassis 1. The two guide supporting portions 20 have on its inner edge sides first and second leg members 33a, 33b downwardly bent in the front and rear direction. First and second pins 33a, 33b which are engaged with an elevation cam groove formed in the slider apparatus, which will be described later on, are inwardly protruded to the first and second leg members 33a, 33b.

The disk cartridge lock apparatus (A-b) of the cartridge holder 9 will be described with reference to FIGS. 6 and 7.

The disk cartridge lock apparatus (A-b) comprises a slide base 35 movable in the insert and eject direction of the disk cartridge 201, a lock arm 36 pivotally supported to the slide base 35 and which is engaged with the disk cartridge 201 in accordance with the insertion of the disk cartridge and an interlocking arm 37 pivotally supported to the cartridge holder 9 and which is rotated in unison with the sliding operation of the slide base 35.

As shown in FIG. 6, the slide base 35 is provided on the rear portion of one side portion of the cartridge holder 9 so as to become slidable in the front and back direction. As shown in FIG. 7, the slide base 35 is of substantially U-shape in cross-section. Two guide grooves 38 of oblong holes in the front and back direction are formed on a side surface portion 35a and engaged with guide pins 39 protruded from the side surface of the cartridge holder 9. An upper surface portion 35b is in slidable contact with the top plate 9a of the cartridge holder 9 and a lower surface portion 35c can be moved in the directions shown by arrows a in FIG. 6 under the condition that it is opposed to the lower surface side of the guide supporting portion 20 with a predetermined spacing.

A recess-shaped engagement groove 40 with which a first engagement pin, which will be described later on, of the interlocking arm 37 is provided on the front side portion of the lower surface portion 35c of the slide base 35. A lock arm 36 is pivotally supported by a shaft pin 41 to the rear end portion of the lower surface portion 35c of the slide base 35.

Figure 7:
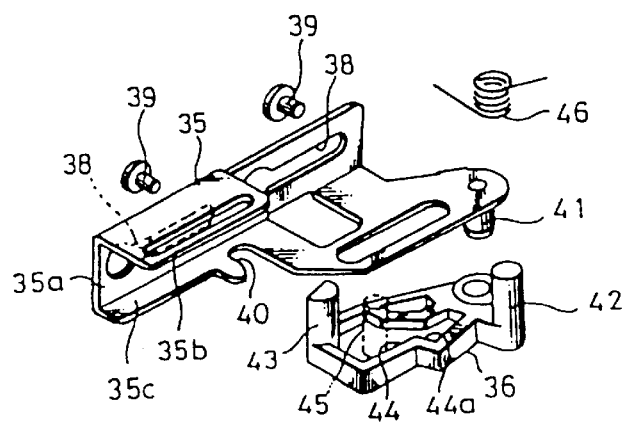
FIG. 7 is an exploded perspective view of a disk cartridge lock apparatus.

As shown in FIG. 7, the lock arm 36 has at its position near the pivot portion erected a trigger pin 42 which comes in contact with the front surface side of the disk cartridge 201. The lock arm 36 has at its front end portion erected a cartridge hold pin 43 which is fitted into a pin fitting hole 228 defined on one side portion of the disk cartridge 201. A cam groove 44 is formed on the surface between the two pins 42 and 43 and engaged with an engagement pin 45 protruded on the lower surface of the rear end of the guide supporting portion 20 of the cartridge holder 9. The lock arm 36 is rotated such that the cartridge hold pin 43 is located in the outside under spring force of the torsion spring 46.

The interlocking arm 37 is formed as substantially V-shape as seen from the top, and pivotally supported at its central portion by a shaft pin 47 between the rear lower surface of the guide supporting shaft portion 20 of the cartridge holder 9 and the lower surface portion 35c of the slide base 35. A first engagement pin 48 which is engaged with the engagement groove 40 defined in the slide base 35 is downwardly protruded from the outer end side of the interlocking arm 37. A second engagement pin 49 which is engaged with the slider apparatus, which will be described later on, is downwardly protruded from the inner end side of the interlocking arm.

The thus arranged cartridge holder 9 is lowered by the slider apparatus (A-c) when the cartridge is loaded and elevated when the cartridge is unloaded.

Figure 8:
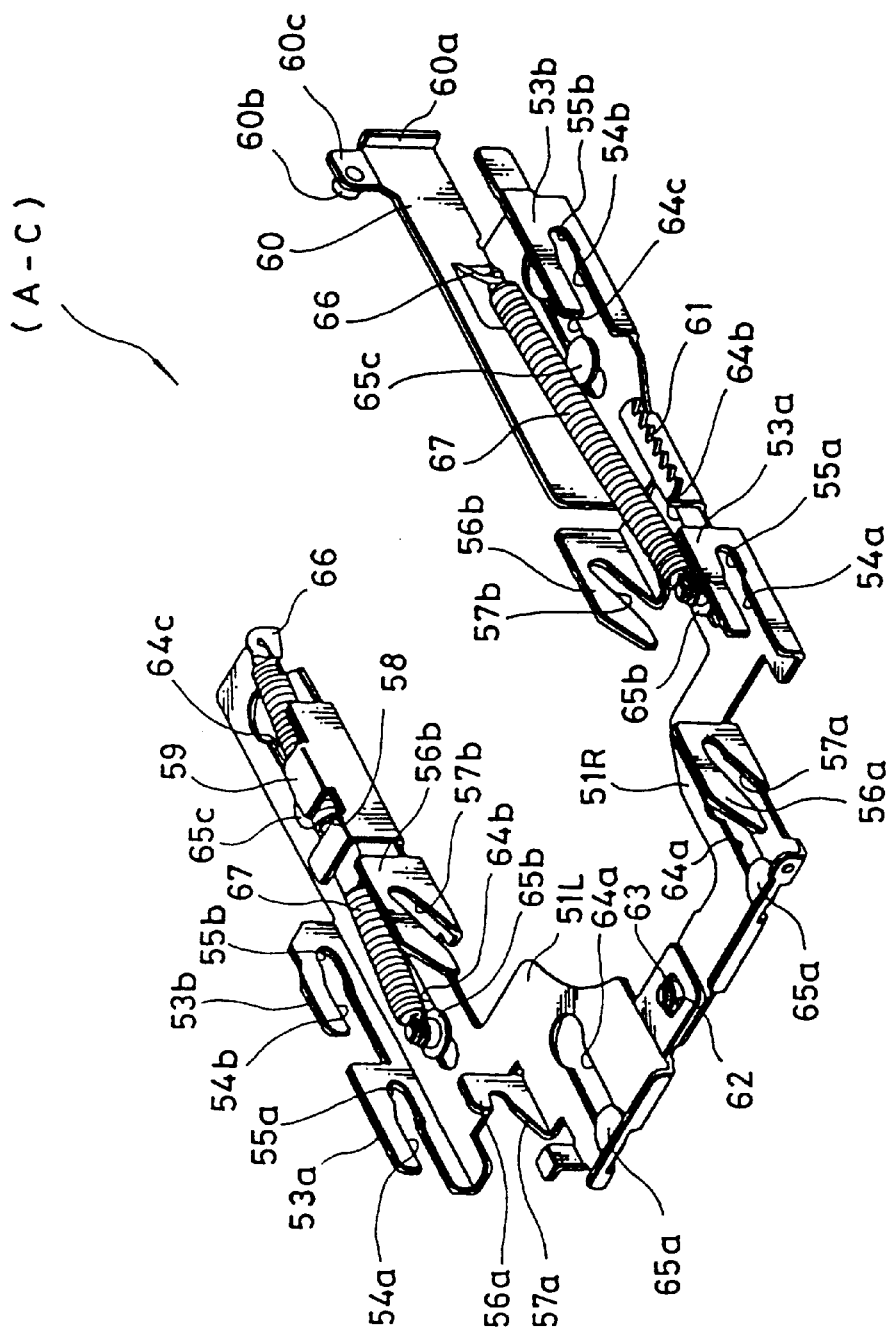
FIG. 8 is a perspective view illustrating a slider apparatus according to the embodiment of the present invention.

As shown in FIG. 8, the slider apparatus (A-c) is formed by coupling a left slider 51L and a right slider 51R, each being formed as substantially L-shaped in a plan view, substantially symmetrically with a small clearance at the horizontal sides. Then, as shown in FIGS. 1 and 3, the slider apparatus is placed on the bottom surface 1a of the chassis 1 by the spindle motor positioning member 15 from the front side to both sides such that the slider apparatus can be slid in the front and back direction.

First and second cam members 53a and 53b are vertically erected on the front and rear portions of the outer side edge of the longitudinal side portions of the left and right sliders 51L and 51R in accordance with the first and second pins 34a, 34b of the cartridge holder 9. First-half parallel cam grooves 54a, 54b of high position whose front end sides are opened and second-half parallel cam grooves 55a, 55b of low position whose rear ends are closed are continuously formed on the cam members 53a, 53b and slidably engaged with the first and second pins 34a, 34b of the cartridge holder 9. Third and fourth cam members 56a and 56b for elevating and lowering an elevating mechanism of the disk rotation mechanism, which will be described later on, are vertically erected on the front and rear portions on the inner side edge. The cam members 56a, 56b have formed inclined cam grooves 57a, 57b each having a descending slope.

On the rear portion of the inner side edge of the left slider 51L is formed an engagement member 59 in which an engagement groove 58 engaged with the second engagement pin 49 of the interlocking arm 37 of the aforesaid disk cartridge lock apparatus (A-b) is formed in the direction perpendicular to the sliding direction (front and back direction) of the slider in parallel to the surface of the slider. On the other hand, a slide operation portion 60 is elongated backward from the inner side edge of the right slider 51R and a toothed portion 61 which is meshed with a rotary damper member is provided at substantially the center of the outer edge. On the rear end portion of the slide operation portion 60 of the right slider 51R are formed an engagement portion 60a which is engaged with the drive mechanism (G) and an operation pin 60b and an operation member 60c for operating the transmission mechanism (H) side.

The left slider 51L and the right slider 51R are coupled together with a small clearance in the inner end surface of the horizontal side portion. Specifically, an engagement hole 62 is defined on the inner end surface of the left slider 51L and an engagement protrusion 63 which is smaller in diameter than the engagement hole 62 is formed on the inner end of the left slider 51R, whereby the engagement hole 62 and the engagement protrusion 63 are engaged with each other with a predetermined clearance. Front and back oblong apertures 64a, 64b, 64c are defined on the horizontal and vertical side portions of the two sliders 51L, 51R and slidably engaged with guide shafts 65a, 65b, 65c erected on the bottom surface 1a of the chassis 1 in the front and back direction under the condition that they can be prevented from being floated. A tension coil spring 67 is extended between the intermediate portions, i.e., the guide shaft 65b engaged with the front oblong aperture 64b on the longitudinal side portion and a spring engagement member 66 at the rear end portion, whereby the two sliders 51L, 51R are constantly spring-biased in the forward direction under spring force of the tension coil spring. FIG. 8 shows the manner in which the two sliders 51L, 51R are slid in the rearward.

The cartridge loading/unloading mechanism A is constructed by assembling the cartridge holder 9 with the thus arranged slider apparatus (A-c).

Specifically, the cartridge holder 9 is fitted into the chassis 1 by engaging the guide pins 32 of the respective sides into the guide grooves 1 of both sides from the upper surface side. The front and back first pin 34a and the second pin 34b of both sides are engaged with the first-half parallel cam grooves 54a, 54b of the first cam member 53a and the second cam member 53b of the left and right sliders 51L, 51R. Furthermore, the second engagement pin 49 of the interlocking arm 37 of the disk cartridge apparatus (A-b) is opposed so as to be engaged with the engagement groove 58 defined in the engagement member 59 of the left slider 51L, thereby the cartridge loading/unloading mechanism A being constructed (see FIG. 9).

In the assembly of the cartridge holder 9 and the slider apparatus (A-c), the left slider 51L and the right slider 51R are separated and coupled with a small clearance so that they become movable individually by a small amount. Therefore, even when a positional relationship between the first and second pins of the cartridge holder 9 is slightly displaced, they can be engaged with the cam grooves of the left and right sliders 51L, 51R, respectively.

(B) Disk Rotation Mechanism

The disk rotation mechanism (B) includes a spindle motor 10 which can be moved by an elevating mechanism (C) in the direction in which it comes close to or away from the disk cartridge 201.

The spindle motor 10 is disposed within a spindle holding body 68 comprising a rotary portion 68a having a concave portion which is opened in the upper direction (disk loading side) and a motor attachment portion 68b opposing the lower peripheral edge of the opening portion 15a of the spindle motor positioning member 15.

Within the concave portion of the rotary portion 68a of the holding body 68 is housed a magnet 69 which attracts the chucking hub 202a of the magneto-optical disk 202. The magnet 69 has at its central portion defined an insertion aperture 69a into which is provided the spindle shaft 10a of the spindle motor 10. A flat disk resting surface (disk table surface) $68a_1$ on which the magneto-optical disk 202 rests is formed on the opening peripheral edge of the concave portion of the rotary portion 68a. The height direction position of the disk resting surface $68a_1$ is set to be a little lower than the tip end of the spindle shaft 10a.

A pair of spindle elevating guide apertures $68b_1$ into which a pair of spindle elevating guide pins 15b are provided on the motor attachment portion 68b of the spindle holding body 60 in an opposing relation with respect to the diametrical direction.

(C) Elevating Mechanism

Figure 10:
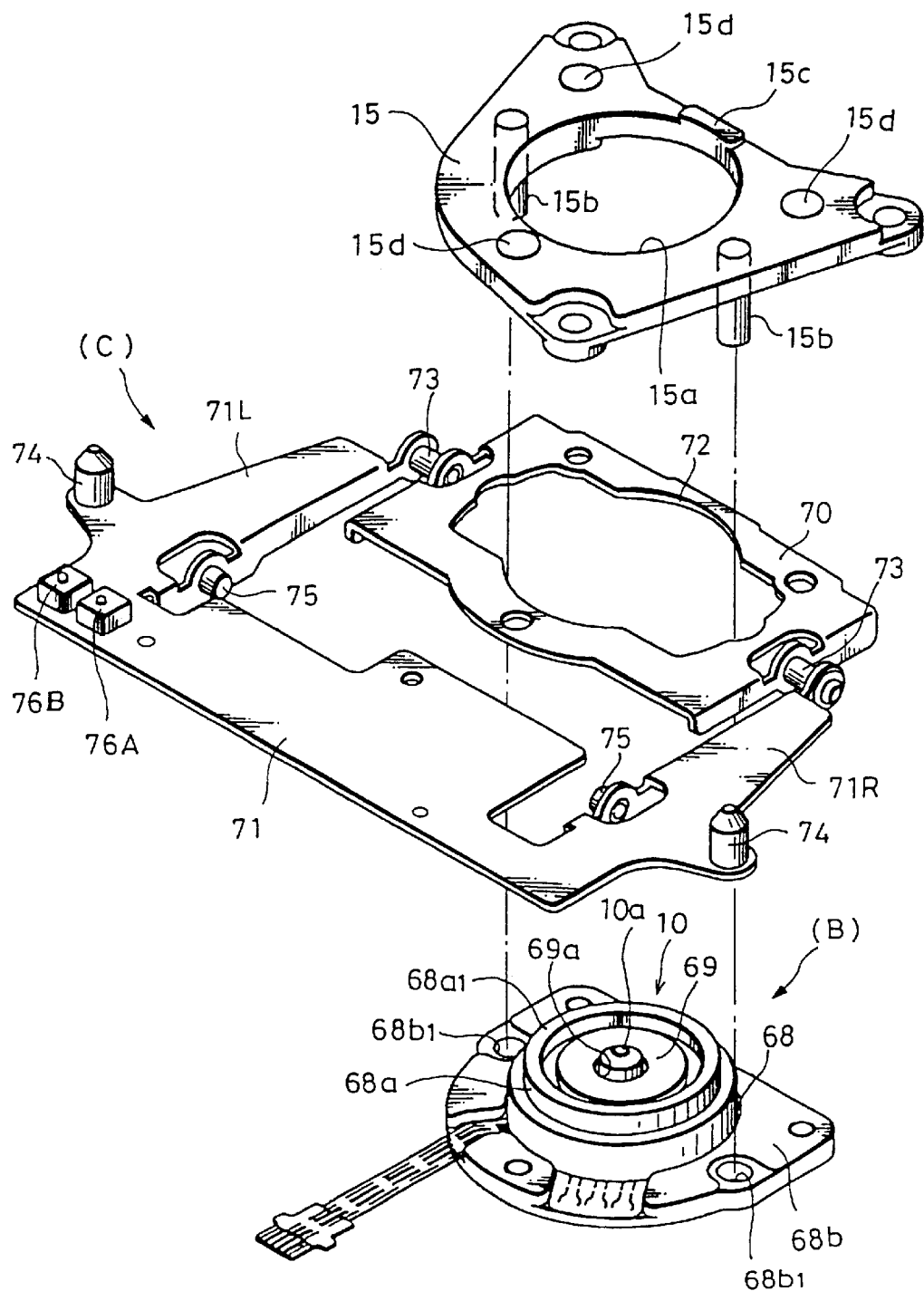
FIG. 10 is an exploded perspective view illustrative of a manner in which a spindle motor is attached to an elevating mechanism according to the embodiment of the present invention.

The elevating mechanism (C) comprises, as shown in FIG. 10, a first elevating plate 70 of substantially rectangular shape in a plan view disposed between the bottom surface 1a of the chassis 1 and the spindle motor positioning member 15 for holding the disk rotating mechanism (B) and a second elevating plate 71 of substantially U-shape in a plan view for rotatably supporting the first elevating plate 70 in the front and back direction and elevated and lowered in accordance with the loading/unloading operation of the disk cartridge 201, i.e., the front and back direction sliding of the aforementioned slider mechanism (A-c).

The rotary portion 68a of the spindle holding body 68 is fitted into the first elevating plate 70 of the elevating mechanism (C). The first elevating plate has defined an opening portion 72 to which the portion with the two spindle elevating guide apertures $68b_1$ of the motor attachment portion 68 formed therein is opposed, and has at its center of both side surfaces protruded shaft pins 73 in the lateral direction.

The spindle holding body 68 of the spindle motor 10 is opposed to the first elevating plate 70 from the lower surface and the rotary portion 68a is fitted into the opening 72. Also, under the condition that the circumferential surface portion of the two spindle elevating guide apertures $68b_1$ of the motor attachment portion 68b are opposed to the first elevating plate, the spindle holding body is fixed at its other portion surface in which the motor attachment portion 68b is not exposed to the first elevating plate by setscrews.

On the other hand, cartridge positioning pins 74 for positioning the disk cartridge 201 are implanted on the upper surfaces of the respective sides near the front edge of the second elevating plate 71. Cam pins 75 are laterally protruded on the inside of both side portions 71L, 71R in substantially opposing to the positioning pins 74, and shaft pins 73 of the first elevating plate 70 are pivotally supported to the rear end portion of the two side portions 71L, 71R in parallel to the cam pin 75, whereby the first and second elevating plates 70 and 71 are coupled so as to become rotatable with each other.

The cam pins 75 of the second elevating plate 71 and the shaft pins 73 of the first elevating plate 70 are respectively engaged with the inclined cam grooves 57a and 57b of the third cam member 56a and the fourth cam member 56b of the sliders 51L, 51R of the slider apparatus (A-c). This engagement is made with a small clearance. With this engagement, the first and second elevating plates 70, 71 are disposed on the bottom surface 1a of the chassis 1 so as to be coupled to the sliders 51L, 51R. When the sliders 51L, 51R are slid in the front and rear direction, the first and second elevating plates are elevated and lowered along the inclined cam grooves 57a of the third and fourth cam members 56a, 56b. As a result, in the spindle motor 10 fixed to the first elevating plate 70, the rotary portion 68a of the spindle holding body 68 can be inserted into and extracted from the opening portion 15a of the spindle motor positioning member 15.

Detection switches 76A, 76B such as write-protect switch or disk type detection switch are mounted on one side portion (left side portion) of the front end surface of the second elevating plate 71.

(D) Optical Pickup Device

Figure 11:
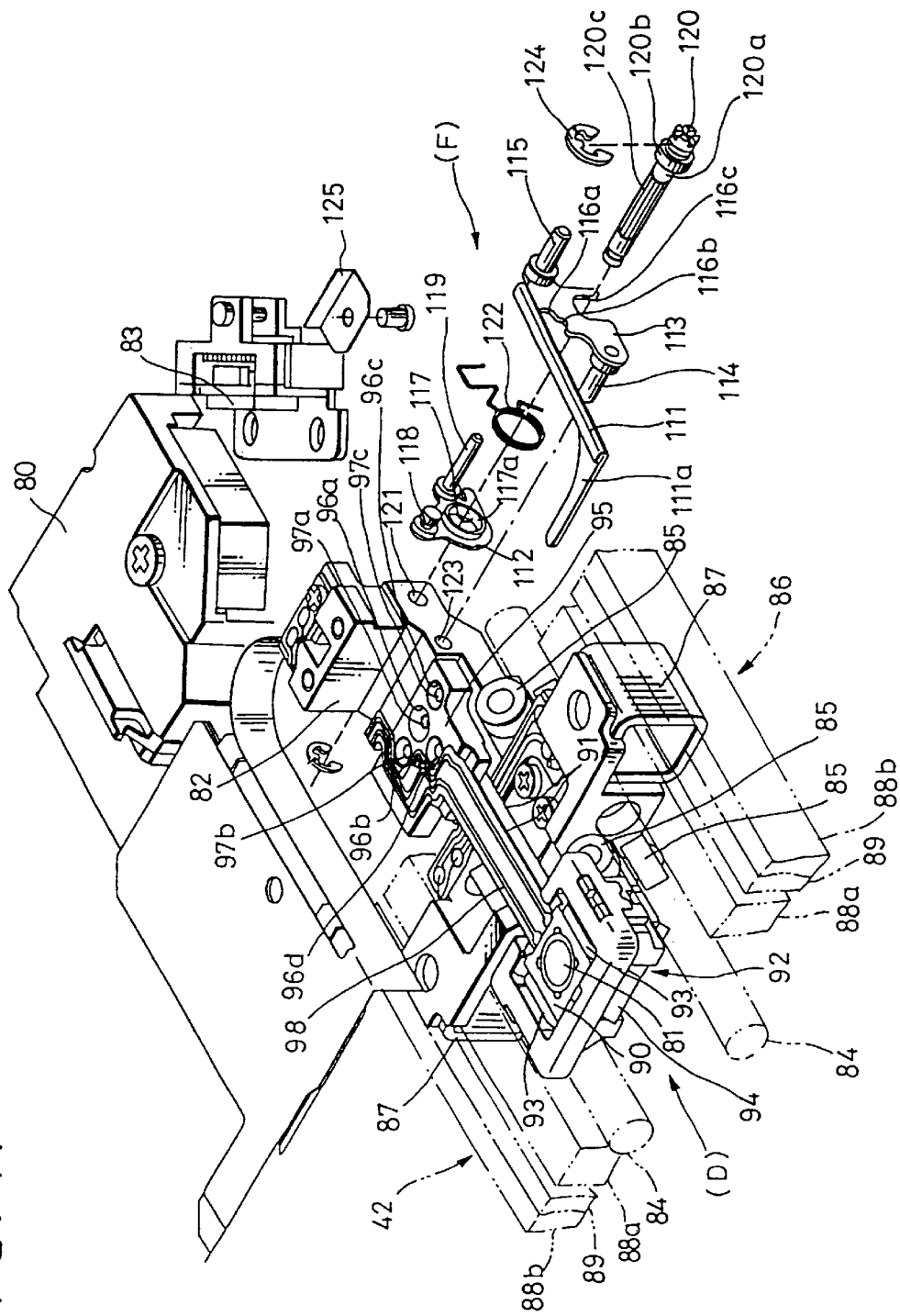
FIG. 11 is a perspective view illustrative of an optical pickup device according to the embodiment of the present invention in a partly-exploded fashion.

The optical pickup device (D) is able to irradiate laser beams on the signal recording surface of the magneto-optical disk 202 in the disk loading portion provided within the housing 3. As shown in FIG. 11, this optical pickup device (D) has a separate optical system whose movable portion is reduced in weight in order to cope with high-speed access unlike a conventional unitary type optical system. Specifically, this optical pickup device comprises a fixed optical system 80 having a laser diode serving as a light source for recording and reproducing, a signal detector for focusing and tracking control and a signal detector for detecting a recording signal, a carriage 82 having an objective lens 81 for converging light beam from the fixed optical system 80 on the signal recording surface of the optical magnetic disk 202 and a galvano mirror 83 located behind the carriage 82 for carrying out the tracking control. The above-mentioned elements and parts are respectively provided on the chassis 1.

The separate optical system is disposed in substantially L-shape in a plan view such that the galvano mirror 83 becomes a corner portion and the carriage 82 and the fixed optical system 80 become respective end portions.

The galvano mirror 83 reflects light beam emitted from the fixed optical system 80, introduces reflected light beam into the optical system of the carriage 82 and executes a tracking control based on the change of angle of the mirror reflection surface.

The carriage 82 is held by a pair of guide shafts 84 positioned over the chassis 1 and which are parallel to each other with a predetermined spacing in the left and right direction so that it becomes freely slidable. Two pairs of bearings 85 are provided on one side surface portion of the carriage 82 such that rotation shafts of bearings of each pair are set at an angle of 90°. A pair of bearings 85 are provided on the other side surface portion such that rotation shafts of bearings of each pair are set at an angle of 90° (see FIG. 12). The carriage 82 has fixed thereto a resilient member for applying a spring force to one of the pairs of bearings 85 in the direction in which an angle between the pairs of bearing rotary shafts becomes smaller than 90°.

Carriage drive linear motors 86 are attached to the respective sides of the carriage 82. The linear motor 86 comprises a frame-shaped coil 87 projected to both sides of the carriage 82, center yokes 88a, magnets 89 and side yokes 88b each of which is opposed through a part of the coil 87.

A lens holder 90 for holding an objective lens 81 is disposed on the carriage 82 through two resilient members 91 provided in parallel in the upper and lower direction. This lens holder 90 can be displaced by a magnetic circuit 92 in the focusing direction. The magnetic circuit 92 comprises a frame-shaped coil 93 projected toward both sides of the objective lens 81, a center yoke, a magnet and side yokes which are opposed to each other through a part of the coil 93.

Figure 12:
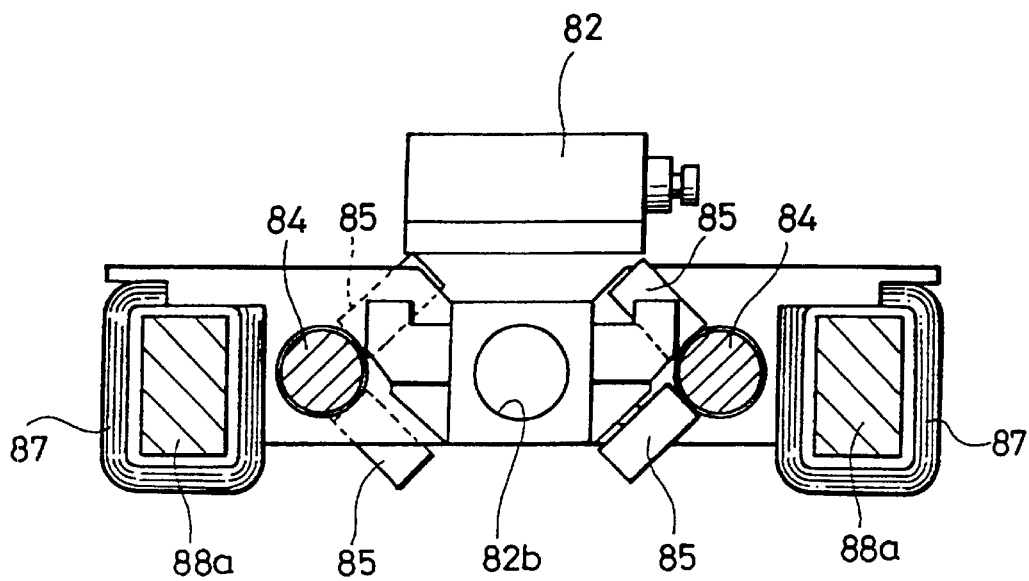
FIG. 12 is a cross-sectional view of the optical pickup device according to the embodiment of the present invention.

Further, the carriage 82 has defined therein a beam passing aperture 82b for introducing light beam from the fixed optical system 80 into the objective lens 81 (see FIG. 12). A rising mirror 94 which is located just under the objective lens 81 is fixed to the carriage.

In the thus arranged optical pickup device (D), when the objective lens 81 is attached to the carriage 82, base ends of the two resilient members 91 such as phosphor bronze provided in the upper and lower direction for supporting the lens holder 90 are fixed to a base plate 95 and this base plate 95 is fixed to the carriage 82.

Figure 13:
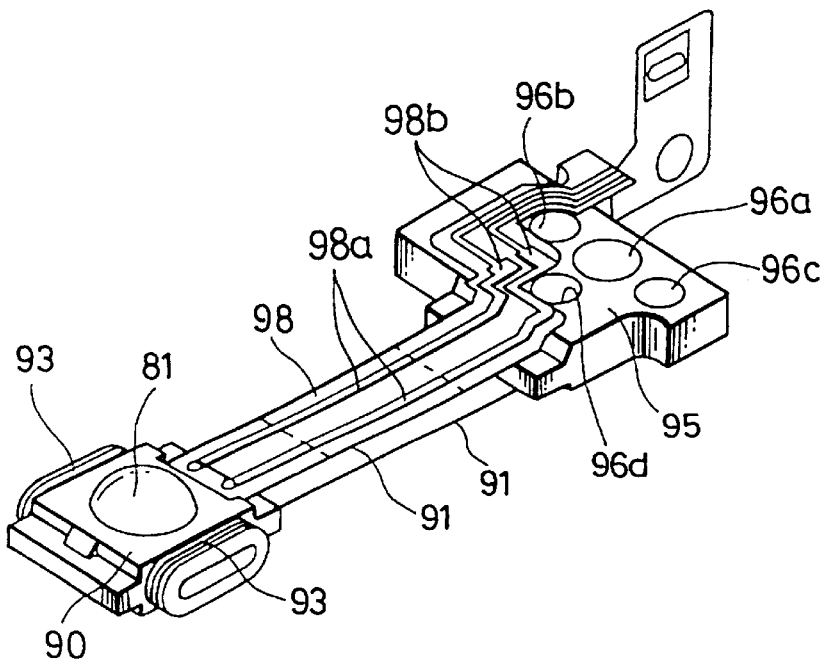
FIG. 13 is a perspective view of an objective lens supporting apparatus according to the embodiment of the present invention.

As shown in FIGS. 11, 13, the base plate 95 has a plurality of through-holes 96 (96a, 96b, 96c, 96d), i.e., three through-holes in the back and one through-hole in the front defined. On the base plate fixed surface side of the carriage 82 are implanted three pins 97 (97a, 97b, 97c) each of which has a diameter smaller than that of the through-hole 96 in response to the three through-holes 96 defined at the back of the base plate 95. Of the three pins 97, the center pin 97a is larger in diameter and shorter in length compared with the pins 97b, 97c on the respective sides.

When this base plate 95 is fixed to the carriage 82, as shown in FIG. 11, the base plate 95 is brought in contact with the base plate fixing surface by inserting the pins 97 into the through-holes 96. In this state, the base plate 95 can be moved relative to the carriage 82 in a range of a spacing between the through-holes 96 and the pins 97. Under the condition that the optical axis of the objective lens 81 is properly adjusted while moving the base plate 95, an instant adhesive is poured into the two through-holes 96b, 96c defined at the back and the central through-hole 96a defined at the front to thereby temporarily fix the base plate to the carriage. Then, an ultraviolet curing adhesive is poured into the central through-hole 96a defined at the back and cured with the irradiation of ultraviolet rays, whereby the base plate 95 is bonded to and fixed to the carriage 82. During the base plate being bonded to and fixed to the carriage, the instant adhesive is poured into the through-holes 96b, 96c, 96d and an accelerator is further poured into the above through-holes, thereby quickening the curing of the instant adhesive.

As described above, when the base plate 95 for holding the objective lens 81 is bonded to and fixed to the carriage 82, there are used two kinds of adhesives, i.e., the instant adhesive and the ultraviolet-curing adhesive. Inasmuch as the instant adhesive is high in tensile strength and the ultraviolet curing adhesive is strong against a shock, a bonding strength is increased and the base plate is strongly fixed to the carriage. Therefore, the base plate 95 is integrally formed with the carriage 82.

Figure 14:
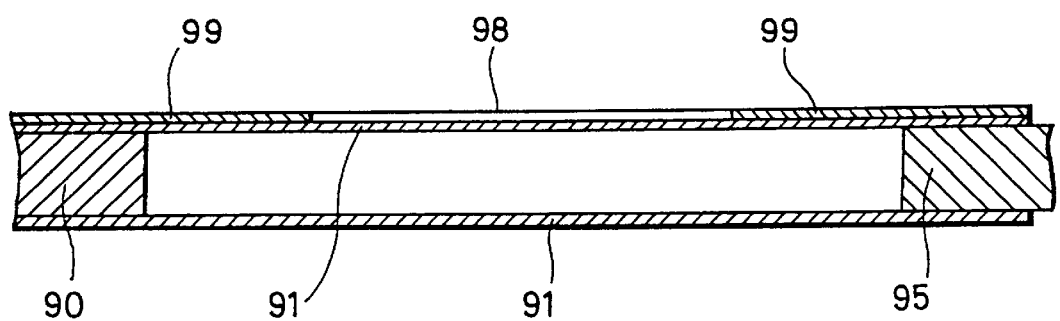
FIG. 14 is a fragmentary cross-sectional view illustrating the objective lens supporting apparatus shown in FIG. 13 in an enlarged scale.

As shown in FIGS. 13 and 14, of the two upper and lower resilient members 91 provided between the lens holder 90 for holding the objective lens 81 and the base plate 95, a flexible interconnection film 98 which is connected to the coil 93 is bonded to one resilient member 91 (upper resilient member in the illustrated example) through an adhesive layer 99. This adhesive layer 99 is formed on the resilient member 91 through an adhesive having a viscosity, e.g., acrylic adhesive. In this embodiment, the tip end of the resilient member 91, i.e., the end of the lens holder 90 and the base end has a length, i.e., length of ⅓ of the full length from the base plate 95 side end or a length shorter than ⅓ to which the flexible interconnection film 98 is bonded. The flexible interconnection film is formed of a polyimide film and polyethylene terephthlate (PET). When the flexible interconnection film 98 is bonded to the resilient member 91 through the adhesive layer 99, the adhesive layer 99 becomes a damping agent and the flexible interconnection film 98 becomes a constraint plate, thereby forming a damping material layer on the resilient member 98. A primary resonance frequency of the resilient member 91 is high and a resonance level is suppressed to be low.

Therefore, a damping effect for the objective lens 81 can be made remarkable with the result that light can be reliably converged on the signal recording surface of the magneto-optical disk 202.

A land portion 98b is formed on a conductive pattern 98a at its position of the upper surface of the base plate 95. When the focusing direction of the objective lens 81 is corrected, a test focusing current is supplied to the conductive pattern 98a by contacting a power-supply terminal to the land portion 98b.

(E) External Magnetic Field Generating Apparatus

As shown in FIG. 4, the external magnetic field generating apparatus (E) includes a slider (hereinafter referred to as "magnetic field applying head") 100 incorporating therein a magnetic field applying head for applying a predetermined external magnetic field to the signal recording surface of the magneto-optical disk 202. This magnetic field applying head 100 is held at the tip end of a head arm, which is resiliently held on the upper surface of the rear end portion 82a of the carriage 82 so as to become swingable in the upper and lower direction, in an upwardly opposing relation to the objective lens 81 of the optical pickup device (D). The magnetic field applying head 100 of the external magnetic field generating apparatus (D) is composed of a floating-type magnetic head so as to cope with a magnetic field modulation over-write. On the other hand, in order to maintain a safety level with which the head is floated, the head arm 100 is placed at the position in which the magnetic field applying head 100 is spaced apart from the signal recording surface of the magneto-optical disk 202 in the disk unloading state and at the position in which the magnetic field applying head 100 is brought in contact with the signal recording surface of the magneto-optical disk 202 by a pressing force of about several gram to 10 gram in the disk loading state.

The head arm 100 can hold the magnetic field applying head by a lifter mechanism (F) at the loading position in which the magnetic field applying head 100 can apply a magnetic field to the magneto-optical disk 202 and at the unloading position in which the magnetic field applying head 100 is spaced apart from this loading apparatus in the side opposite to the disk resting surface 60c of the disk rotating mechanism (B).

(F) Lifter Mechanism

As shown in FIGS. 4 and 11, the lifter mechanism (F) comprises a lifter arm 111 attached to the rear end portion of the carriage 82 so as to become rotatable in the upper and lower direction and a lifter plate 112 for holding the lifter arm 111 at the upper and lower positions. The lifter arm 111 is of substantially L-shape, in a plan view, comprising a horizontal side portion 111a on which the head arm 101 rests and a vertical side portion 111b pivotally supported to the carriage 82. An engagement plate 113 is integrally pivoted to the rear end portion of the vertical side portion 111b in response to the side surface of the rear end portion of the carriage 82. A shaft pin 114 which is pivotally supported to the carriage 82 is inwardly and horizontally implanted on the front lower portion of the engagement plate 113. An operation pin 115 is outwardly and horizontally implanted on the rear upper portion of the engagement plate. An upper-stage concave portion 116a of large diameter and a lower-stage concave portion 116b are formed on the front edge portion and a concave portion 116c which is opened in the lower direction is formed on the lower portion.

The lifter plate 112 is interposed between the engagement plate 113 of the lifter arm 111 and the side surface of the rear end portion of the carriage 82. A shaft aperture 117 of large diameter in which a protruded edge 117a is formed on the circumferential edge by burring (drawing) is provided on the lifter plate 112. A short engagement pin 118 which is engaged with the concave portions 116a, 116b of the front edge portion of the engagement plate 113 is protruded on the outer surface side and a long operation pin 119 is protruded on the outer surface side with a distance from the engagement pin 118. The short engagement pin 118 is substantially the same in diameter as that of the lower-stage concave portion 116b.

This lifer plate 112 is pivotally supported to the rear end side surface of the carriage 82 by a camshaft 120. The camshaft 120 is formed such that an eccentric cam portion 120b of substantially the same diameter as that of the shaft aperture 117 of the lifter plate 112 and which is inserted into the above shaft aperture is formed on one end portion side of the shaft portion 120a. A coarse surface portion 120c is formed on the circumferential surface of substantially the central portion of the shaft portion 120a by narrow shaft direction grooves with a predetermined width (spline grooves), knurling or the like.

The camshaft 120 is inserted into and pivotally supported into a shaft aperture 121 defined on the rear end side surface of the carriage 82 in the direction perpendicular to the moving direction such that the eccentric cam portion 120b is protruded on the side surface. In this state, the lifter plate 112 is rotatably disposed on the rear end side surface by fitting the shaft aperture 117 into the eccentric cam portion 120b. A coil portion of the torsion coil spring 122 is inserted into an outer peripheral protruded edge 117a of the shaft aperture 117 of the lifter plate 112.

Then, the engagement plate 113 of the lifter arm 111 is pivotally supported to the rear end side surface of the carriage 82 from the outer surface side of the lifter plate 112 by inserting the shaft pin 114 into a shaft aperture 123 defined with a distance from the shaft aperture 121. The concave portion 116a or 116b of the front edge portion is engaged with the engagement pin 118 of the lifter plate 112 and the concave portion 116c of the lower portion is opposed across the outer end portion of the camshaft 120, thereby being retained and held by a retaining ring 124 fitted into the outer end of the camshaft 120. In this state, the operation pin 115 on the engagement plate 113 side and the operation pin 119 on the lifter plate 112 side are opposed in parallel with a clearance. The engagement plate 113 and the lifter plate 112 are engaged with both end portions of a torsion coil spring 122 and both plates 113 and 112 are spring-biased in the opposite directions, whereby the two operation pins 115 and 119 are constantly biased so as to become distant from each other.

When the camshaft 120 is rotated, the position of the lifter plate 112 is changed, whereby the state in which the engagement plate 113 of the lifter arm 111 is pressed by the engagement pin 118 is changed. As a result, the angle of the lifter arm 111 is changed with the result that a swing angle of the head arm 101 is adjusted, thereby adjusting the upper and lower positions of the magnetic field applying head 100 relative to the magneto-optical disk 202. In this state, an engagement member 125 is attached to the carriage 82 in response to the inserted portion of the camshaft 120 and engaged with the coarse surface portion 120c of the camshaft 120, resulting in the camshaft 120 being fixed to the carriage 82.

(G) Drive Mechanism

As shown in FIG. 4, the drive mechanism (G) comprises a drive motor 130 serving as a drive source for releasing the locked state of the lifter mechanism (F) by a transmission mechanism (H), which will be described later on, a drive source for ejecting the disk cartridge 201 to the outside of the housing 3 and a transmission gear 132 coupled to the drive motor 130 and which has on its peripheral edge of an outer side surface a columnar pin 131 protruded in the direction perpendicular to the direction in which the carriage 82 is moved. When the transmission gear 132 is rotated in the direction shown by an arrow $R_1$ in FIG. 15, the pin 131 is moved from a fixed position (reference position) a to a fixed position b, whereby the aforementioned slider apparatus (A-c) is returned from the loading position to the unloading position. When the transmission gear 132 is rotated in the direction shown by an arrow $R_2$ in the same figure, the pin 131 is moved from the fixed position a to the fixed position b so that an operation power is given to the lifter mechanism (F) through a transmission mechanism (H) which will be described later on.

Figure 15:
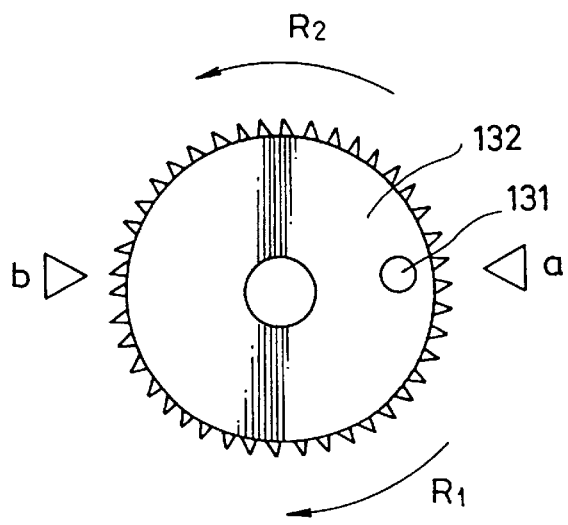
FIG. 15 is a side view illustrative of a transmission gear according to the embodiment of the present invention.
Figure 16:
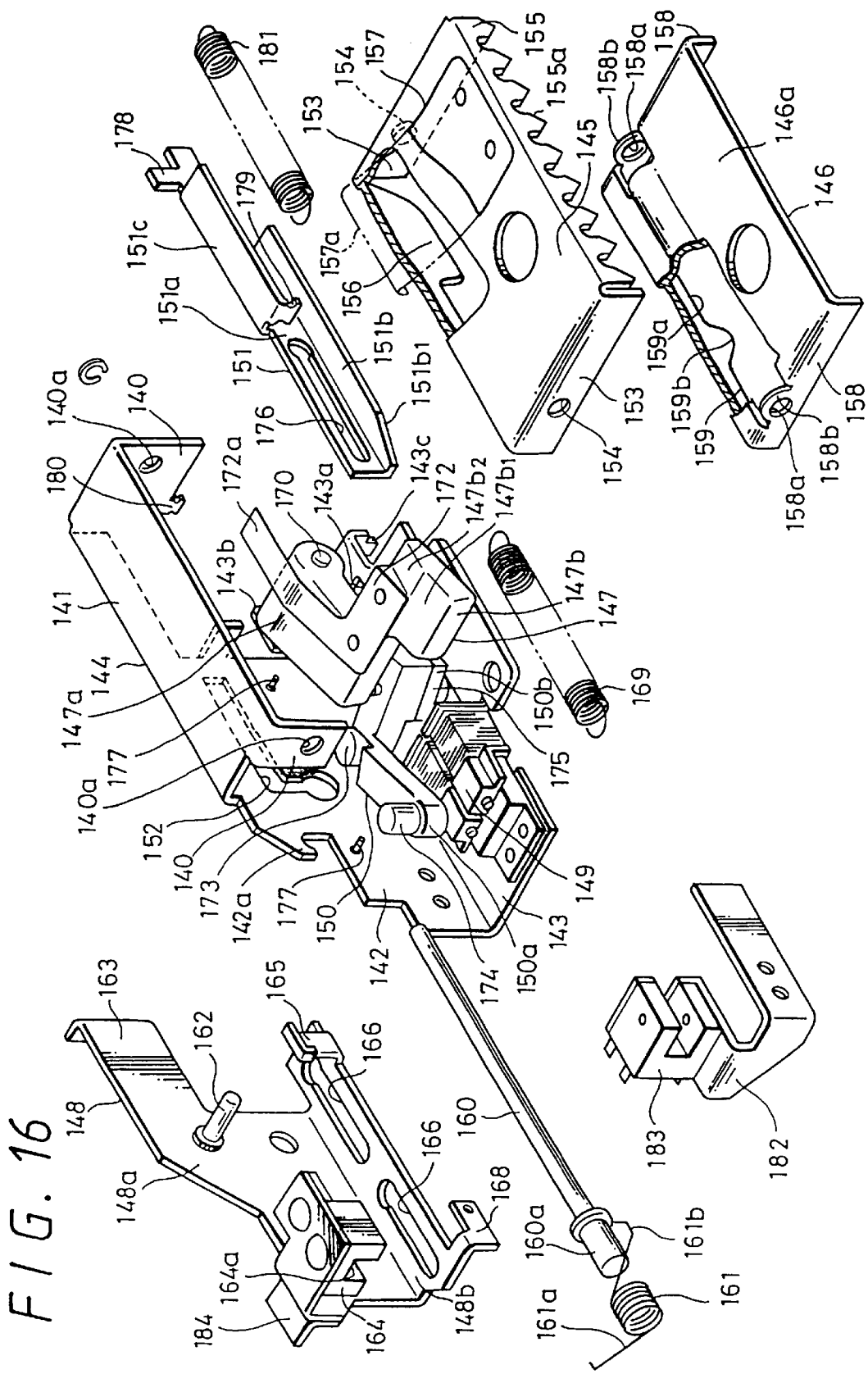
FIG. 16 is an exploded perspective view illustrative of a transmission mechanism according to the embodiment of the present invention.
Figure 17:
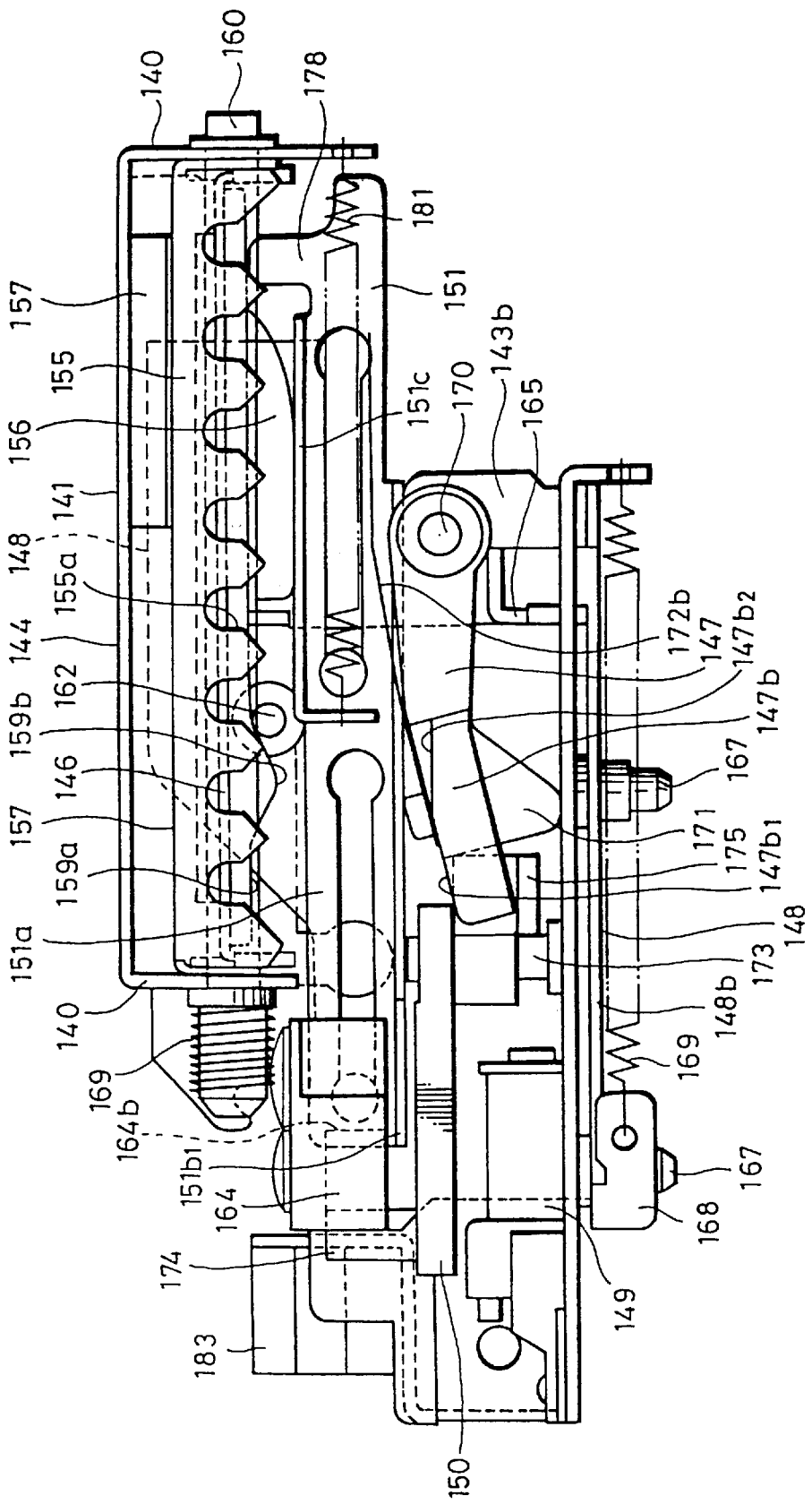
FIG. 17 is a side view illustrative of the transmission mechanism according to the embodiment of the present invention.
Figure 18:
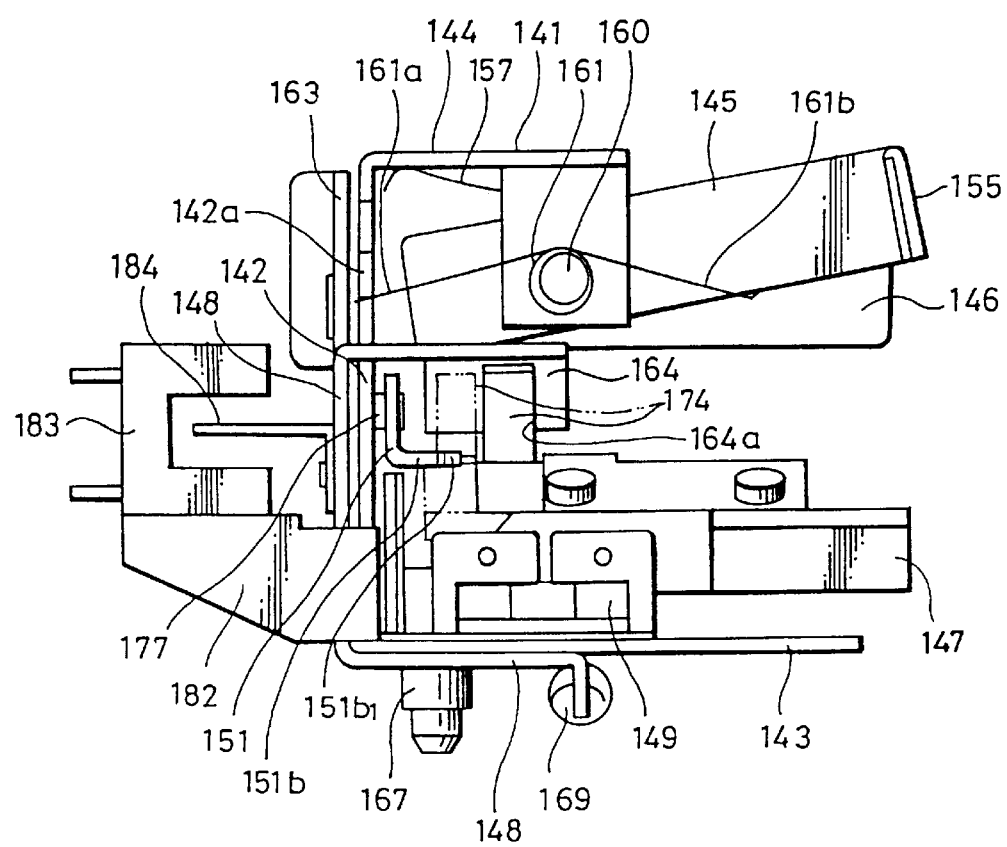
FIG. 18 is a rear view illustrating the transmission mechanism according to the embodiment of the present invention.
Figure 19:
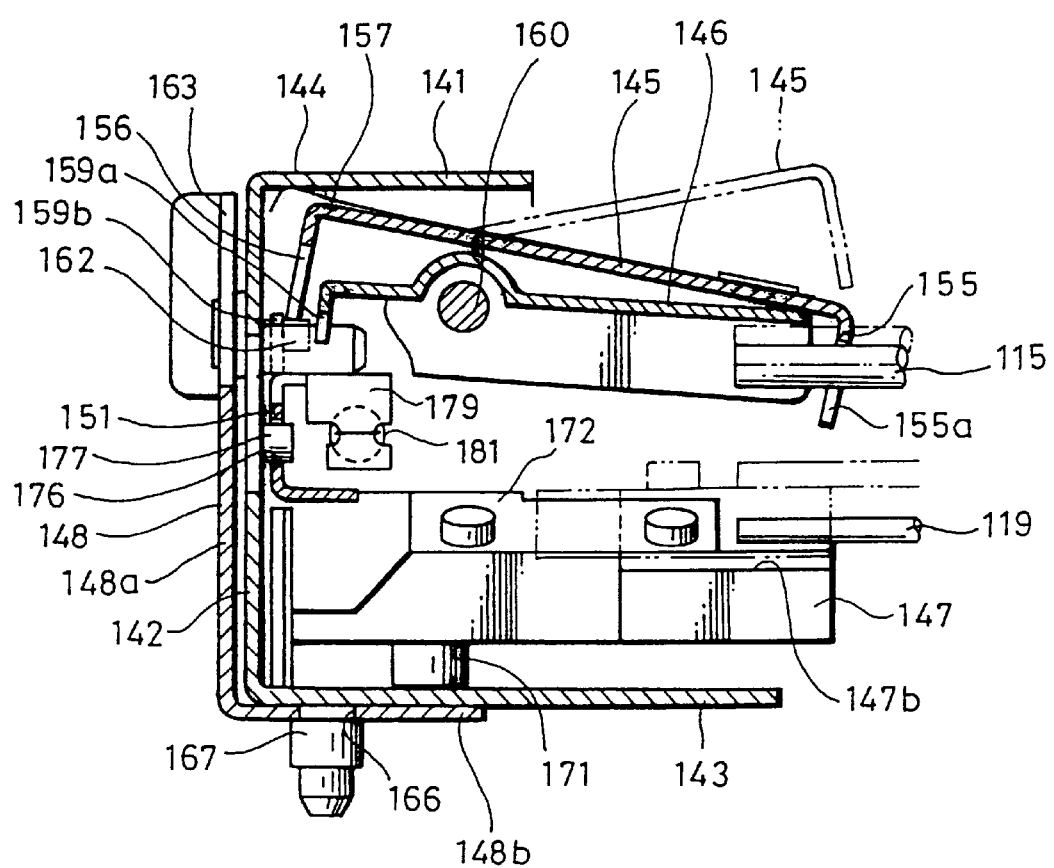
FIG. 19 is a cross-sectional view illustrating the transmission mechanism according to the embodiment of the present invention.

Thus, when the transmission gear 132 is rotated in the direction shown by the arrow $R_1$ in FIG. 15 so that the pin 131 is displaced from the fixed position a to the fixed position b, the pin 131 is engaged with the engagement portion 60a of the slide operation portion 60 of the right slider 51R of the slider apparatus (A-c) and presses the same in the backward direction, whereby the slider apparatus (A-c) is slid backwardly against the forward spring-biasing force to eject the disk cartridge 201. When the transmission gear 132 is rotated in the direction shown by the arrow $R_2$ in FIG. 15 so that the pin 131 is displaced from the fixed position a to the fixed position b, the lifter mechanism (F) is operated by driving the transmission mechanism (H). If the carriage 37 is located at the outermost peripheral position, then the magnetic field applying head 100 is loaded onto the magneto-optical disk 202.

(H) Transmission Mechanism

As shown in FIGS. 16 through 19, the transmission mechanism (H) comprises a base 144 including a top plate portion 141 with bearing members 140 opposite to each other in the front and back direction, a side wall plate portion 142 elongated from the top plate portion 141 and a bottom surface plate portion 143 elongated from the side wall plate portion 142 and which is opposed to the top plate portion 141 in the upper and lower direction, a lock plate 145 pivotally supported to the top plate portion 141 in the lateral direction, i.e., pivotally supported to the top plate portion in the upper and lower direction in an opposing relation to the side surface side of the carriage 38 for engaging the carriage 38, an operation plate 146 coaxially pivoted to the lower surface side of the lock plate 145, an operation lever 147 pivotally supported to the side-wall plate portion 142 and which is backwardly rotated relative to the bottom surface plate portion 143 in the upper and lower direction for operating the lifter mechanism (F), a slide plate 148 slidably attached to the outer surface side of the side wall plate portion 142 in the front and back direction and which is slidably operated by the drive mechanism (G) to operate the operation plate 146 and the lift lever 147, a self-maintaining type electromagnetic clutch 149 disposed at the rear portion of the bottom surface plate portion 143 for locking and holding the lift lever 147 in the operated state, a lock arm 150 operated in a self-maintaining fashion by the electromagnetic clutch 149, a lock releasing plate 151 for releasing the self-maintaining of the lock arm 150 in a manual fashion, etc.

Shaft apertures 140a are defined in both the bearing members 140 of the top plate portion 141 of the base 144 of the transmission mechanism (H) in an opposing relation to each other in the front and rear direction and a horizontal oblong aperture 152 is defined in the side wall plate portion 142.

On the lock plate 145 pivotally supported to the top plate portion 141 side of the base 144 are downwardly bent supporting surface portions 153 which are inwardly opposed to the two bearing members 140 of the top plate portion 141. On the side opposing the carriage 82 is downwardly bent an engagement surface portion 155 having at its tip end a comb-shaped tooth portion 155a which are engaged with the operation pin 115 of the lifter arm 111 of the lifter mechanism (F). A cam surface portion 156 which is downwardly protruded is provided on the side opposite to the engagement surface portion 155. A return leaf spring 157 is attached to the upper surface of the lock plate 145, and a free end 157a thereof is spring-biased in the upper direction.

On the other hand, on the operation plate 146 is downwardly formed a contact surface portion 158 which is inwardly opposed to the two supporting surface portions 153 of the lock plate 145, and a bearing portion surface 158b having a shaft aperture 158a is erected in an opposing relation to the shaft aperture 154. A slide surface portion 159 is downwardly provided on the side opposing the operation surface portion 146a which opposes and presses the operation pin 115 of the lifter arm 111 of the lifter mechanism (F) from above. A lower edge of the slide contact surface portion 159 is formed as a slide contact surface 159a, and a convex-shaped cam portion 159b which is downwardly protruded is continuously formed near the back of the slide contact surface 159a.

Under the state that the lock plate 145 and the operation plate 146 are overlapped in the vertical direction, the contact surface portion 157 is contacted with the inside of the supporting surface portion 153 and that the shaft apertures 154 and 158a are communicated with each other, the shaft apertures 154, 158a are communicated with the shaft apertures 140a between the bearing members 140 of the top plate portion 141 of the base 144, to which a supporting point shaft 160 is pivotally supported. In this state, the free end 157a of the return leaf spring 157 is urged against the lower surface of the top plate portion 141, and the lock plate 145 is spring-biased by the resilient eccentric cam of the return leaf spring 157 in such a manner that the engagement surface portion 155 side is constantly positioned around the supporting point shaft 160 in the upper direction.

A torsion coil spring 161 is fitted into an end portion 160a protruded from one bearing member 140 (rear side) of the supporting point shaft 160. One end 161a is engaged with the spring engagement member 142a protruded from the rear edge side of the side wall plate portion 142, and the other end 161b is engaged with the lower edge of one contact surface portion 158 (rear side) of the operation plate 146, whereby the operation plate 146 is spring-biased such that the operation surface portion 146a is constantly placed in the upper direction.

The slide plate 148 is of substantially L-shape comprising a vertical surface portion 148a opposing the side wall plate portion 142 of the base 144 and a horizontal surface portion 148b opposing the bottom surface plate portion 143. A guide shaft 162 is horizontally protruded on the inner surface side of the vertical surface portion 148a. This guide shaft 162 is inserted into the guide oblong aperture 152 defined in the side wall plate portion 142 and slidably contacted with the lower edge slide contact surface 159b of the slide contact surface portion 159 of the operation plate 146. The vertical surface portion 148a has on its front end elongated a pressing member portion 163 which is pressed by the drive mechanism (G). The slider lock 164 which is engaged with the lock arm 150 in the self-maintaining state is fixed to the upper side of the rear end portion. A horizontal guide groove 164a opened in the lower side and whose first half portion is inclined outwardly is formed on the slider lock 164, and the front end surface 164b of the outer side edge portion of the guide groove 164a is formed as an engagement surface portion.

On the other hand, an operation member 165 for elevating the lift lever 147 is erected on the front end inside portion of the horizontal surface portion 148b of the slide plate 148, protruded from the horizontal guide oblong aperture 143a defined on the bottom surface plate portion 143 of the base 141 and opposed to the under side of the lift lever 147. Guide apertures 166 which are long in the front and back direction are formed on the first half portion and the second half portion of the horizontal surface portion 148b and engaged with the guide pins 167 protruded on the lower surface of the bottom surface plate portion 143. Further, a spring engagement member 168 is downwardly bent at the rear end inside of the horizontal surface portion 148b and a tension coil spring 169 is extended between the spring engagement member 168 and a spring engagement member 143c bent at the front end of the bottom surface plate portion 143, whereby the slide plate 148 is constantly spring-biased so as to be slid in the forward direction relative to the base 141. In this state, the guide shaft 162 is slidably contacted with the slide contact surface 159a of the slide contact surface portion 159 of the operation plate 146 on the side ahead of the convex-shaped cam portion 159b.

The lift lever 147 is of substantially L-shape in a plan view and has an arm portion 147a which is a vertical side portion. The lift lever is pivotally supported at its tip end portion to the side wall plate portion 142 of the base 141. In particular, the bearing member portion 143b is erected on the front end outside portion of the bottom surface plate portion 143 by a shaft pin 170 in such a manner that it can be rotated in the upper and lower direction. A horizontal side portion is of substantially a quadrilateral shape in a plan view and a elevating surface portion 147b which is opposed to the operation pin 119 of the lifter plate 112 of the lifter mechanism (F) from the lower direction to elevate the operation pin. The elevating surface portion 147b is formed in such a manner that, when the lift lever 147 is rotated in the upper direction, a second half portion surface $147b_1$ becomes a horizontal plane in the upper rotation and a first half portion $147b_2$ become a horizontal plate in the lower rotation. Also, a leg member 171 is protruded on the lower surface of the rear end (free end) side of the lift lever 147. The aforementioned operation member 165 of the slide plate 147 is opposed to the leg member 171 in the front and back direction. When the slide plate 148 is slid in the backward direction, the operation member 165 is slidably contacted with the leg member, whereby the lift lever 147 is upwardly rotated about the shaft pin 170.

The return leaf spring 172 is attached to the upper surface of the lift lever 147 and the free end portion 172a thereof is elongated forwardly by the arm portion 147a and urged against other member so that the lift lever 147 is constantly spring-biased so as to rotate in the lower direction. The lock arm 150 that is self-maintained by the electromagnetic clutch 149 is of substantially L-shape in a plan view and pivotally supported at its bent portion to the bottom surface plate portion 143 of the base 141. The lock pin 174 which is engaged with the slider lock 164 is implanted on the tip end of the vertical portion 150a and a magnetic member 175 such as iron that can be attracted to the electromagnetic clutch 149 is attached to the horizontal portion 150b.

The electromagnetic clutch 149 is fixed to the rear surface of the bottom surface plate portion 143 of the base 141 and attracts the aforementioned magnetic member 175 when it is de-energized, and releases the magnetic member from being attracted when it is energized. When the electromagnetic clutch is de-energized, under the condition that the slide plate 148 is slid backwards, the electromagnetic clutch attracts the magnetic member 175 of the lock arm 150 and holds the lock arm 150 in the rotating state, whereby the lock pin 174 is engaged with the slider lock 164 of the slide plate 148, resulting in the slide plate 148 being locked and held. When the electromagnetic clutch is energized, the electromagnetic clutch releases the magnetic member 174 from being attracted and the lock arm 150 is rotated in the opposite direction by this repulsive operation, thereby releasing the slide plate 148 from being locked. As a result, the slide plate 148 is slidably returned to the forward under spring-biasing force of the tension coil spring 169.

The lock releasing plate 151 is attached to the side wall plate portion 142 of the base 141 so as to become slidable along the inner surface in the front and back direction. The lock releasing plate is inserted between the slider lock 164, which is attached to the slide plate 148 so as to oppose the upper direction of the bottom surface plate 143, and the side wall plate portion 142 by the operation member 60c of the lock arm 150 when the aforementioned slider apparatus (A-c) is slid backwardly, thereby releasing the lock arm 150 from being locked. A horizontally oblong guide aperture 176 is defined in the side wall plate portion 151a which is parallel to the side wall plate portion 142 and engaged with the guide pin 177 horizontally protruded from the side wall plate portion 142. A lower surface portion 151b is horizontally provided on the lower edge of the side surface portion 151a, and a lock releasing portion $151b_1$ is formed on the rear inside of the lower surface portion 151b. An engagement portion 178 which is engaged with the rear end operation member 60c of the slider apparatus (A-C) is formed on the front end portion of the side surface portion 151a, and an upper surface portion 151c is formed from the first half upper edge. Then, a spring engagement member 179 is downwardly bent at the rear end of the upper surface portion 151c.

A tension coil spring 181 is extended between the spring engagement member 179 of the lock releasing plate 151 and a spring engagement member 180 protruded from the lower edge of the front side bearing member 140 of the base 141 to thereby constantly spring-bias the lock releasing plate 151 in the forward direction.

A sensor 183 for detecting whether or not the slide plate 148 is slid in the backward direction is fixed to the rear end portion of the side wall plate portion 142 of the base 144 through an attachment plate 182. The sensor 183 may be a photointerrupter. A shield plate 184 is attached to the rear end of the vertical surface portion 148a of the slide plate 148 as a detection member in response to the sensor 183.

Operation of the thus arranged magneto-optical disk apparatus will be described with reference to FIGS. 22 to 31.

When the magneto-optical disk apparatus is not operated, i.e., in the state where the disk cartridge 201 is not loaded, the left and right sliders 51L, 51R of the slider apparatus (A-c) are locked by the disk cartridge lock apparatus (A-b) in the cartridge holder 9 under the condition that they are slid in the backward. Thus, the cartridge holder 9 is located at the elevated position.

Figure 9:
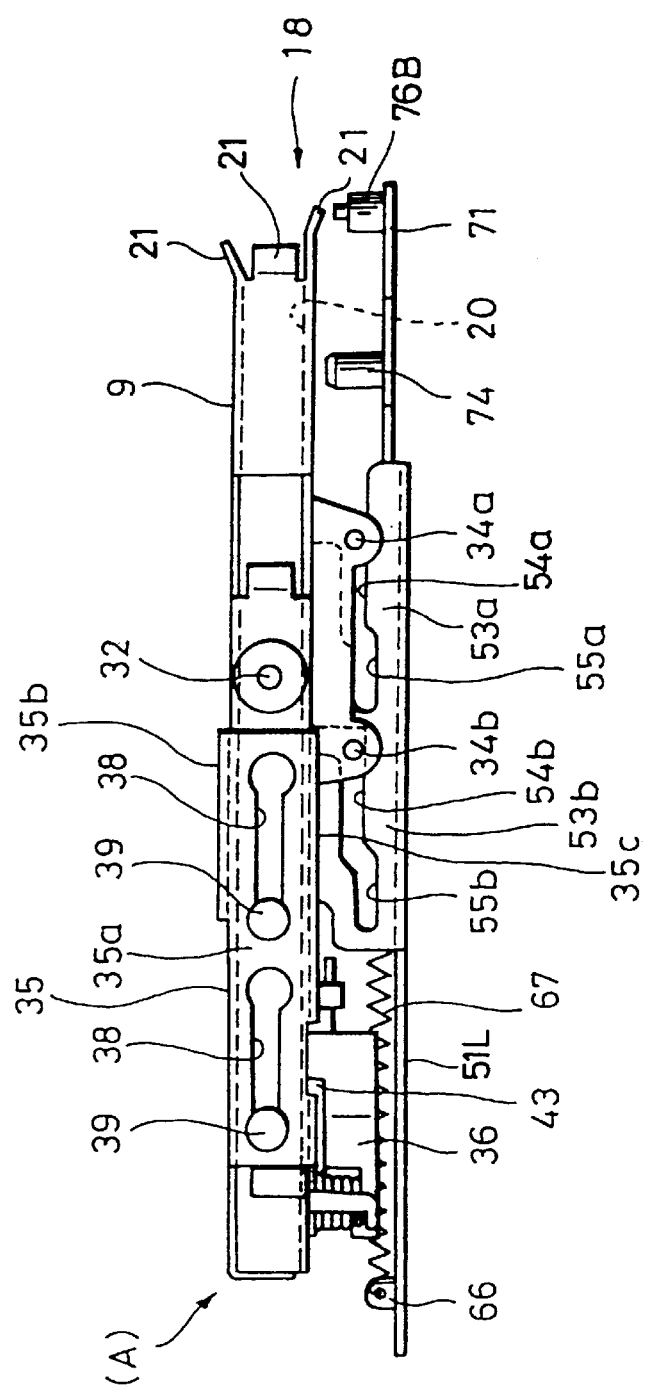
FIG. 9 is a left-hand side elevational view of a loading mechanism according to the embodiment of the present invention.

Specifically, the disk cartridge lock apparatus (A-b) is outwardly rotated under spring force of the torsion spring 46 and engaged with the engagement pin 45 protruded on the cartridge holder 9 in the engagement portion 44a of the cam groove 44 under the condition that the slide base 35 is slid in the forward direction and the lock arm 36 is faced within the rear portion of the cartridge holder 9. Under this state, the interlocking arm 37 is pivotally supported to the cartridge holder 9 and the first engagement pin 48 is engaged with the slide base 35. The second engagement pin 49 of the interlocking arm 37 is engaged with the engagement groove 58 of the left slider 51L (see FIG. 23), whereby the respective sliders 51L, 51R are locked under the condition that it is slid backwards against the spring force of the tension coil spring 67. Therefore, as shown in FIG. 9, the first and second parallel cam grooves 54a, 54b of the high position of the respective side sliders 51L, 51R are engaged with the first and second pins 34a, 34b, whereby the cartridge holder 9 is held at the elevated position.

Under this condition, the first and second elevating plates 70, 71 of the elevating mechanism (C) are lowered because the third and fourth inclined cam grooves 57a, 57b of the respective sliders 51L, 51R are abutted against the cam pin 75 and the shaft pin 73, whereby the spindle motor 10 attached to the first elevating plate 70 also is lowered and the fixed portion 68a of the spindle operation member 68 is fully inserted into the opening portion 15a of the spindle motor positioning member 15. The cartridge positioning pin 74 implanted on the second elevating plate 71 is also placed at the lower position by the cartridge holder 9 (see FIG. 9).

In this manner, the cartridge holder 8 is held under the condition that it is communicated with the cartridge insert and eject mouth 5 of the front panel 4.

On the other hand, the operation pin 6b of the slide operation portion 60 is slidably contacted with the lower edge surface of the cam surface portion 156 when the slider apparatus (A-c) is slid in the backward direction, whereby the lock plate 145 of the transmission mechanism (H) rotates the engagement surface portion 155 downwardly so that the comb-tooth 155a is downwardly engaged with the operation pin 115 of the lifter arm 111 of the lifter mechanism (F) with a pressure.

Figure 29:
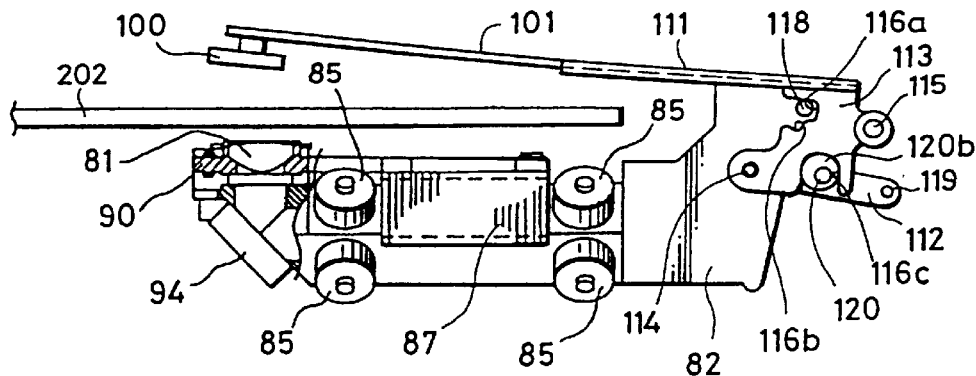
FIG. 29 is a side view illustrating a manner in which a lifter mechanism is operated in the unloading state.

Therefore, the lifter arm 111 of the lifter mechanism (F) is rotated upwardly about the shaft pin 114 of the engagement plate 113 relative to the carriage 82 of the optical pickup device (D) until the upper edge of the upper-stage concave portion 116a is engaged with the engagement pin 118 of the lifter plate 112 so that its horizontal side portion 111a raises the head arm 101 of the external magnetic field applying apparatus 100 (E) thereby to hold the magnetic field applying head 100 at the uppermost position, i.e., at the a distal position from the magneto-optical disk 202 as shown in FIG. 29. Moreover, in this state, the carriage 82 is locked through the lifter arm 111 and thereby prevented from being moved and fluctuated inadvertently.

Figure 22:
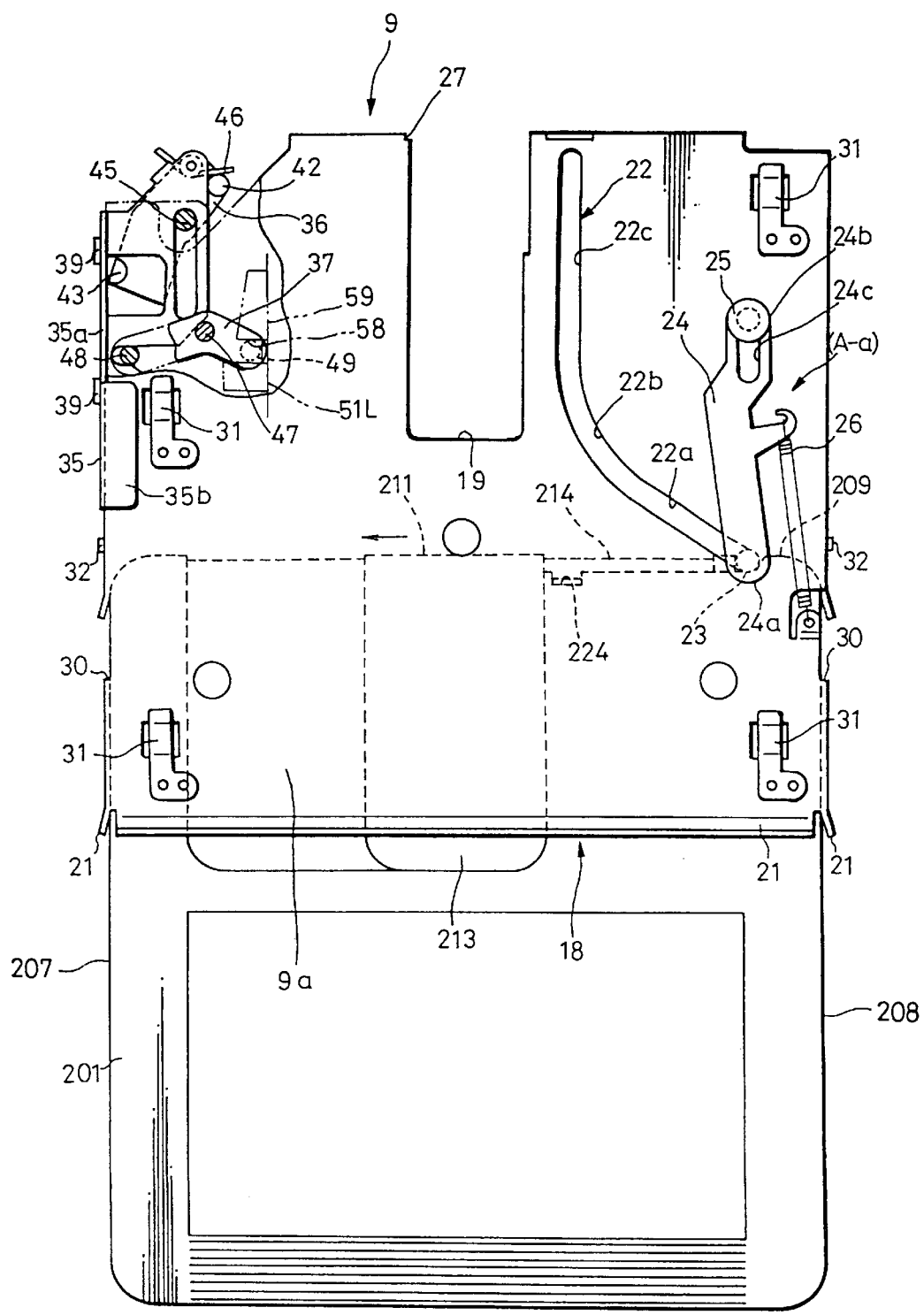
FIG. 22 is a plan view illustrating in a partly cross-sectional fashion a manner in which a shutter releasing pin is engaged with the disk cartridge during the disk cartridge is being loaded on the cartridge holder.

Accordingly, when the disk cartridge 201 is inserted into the cartridge holder 9 provided within the housing 3 from the cartridge insert and eject mouth 5 of the front panel 4, the shutter opening pin 23 of the shutter opening apparatus (A-a) of the cartridge holder 9 comes in contact with the front surface portion 209, thereby being engaged with the tip end of the slide guide member 214 of the shutter member 211 as shown in FIG. 22.

Figure 23:
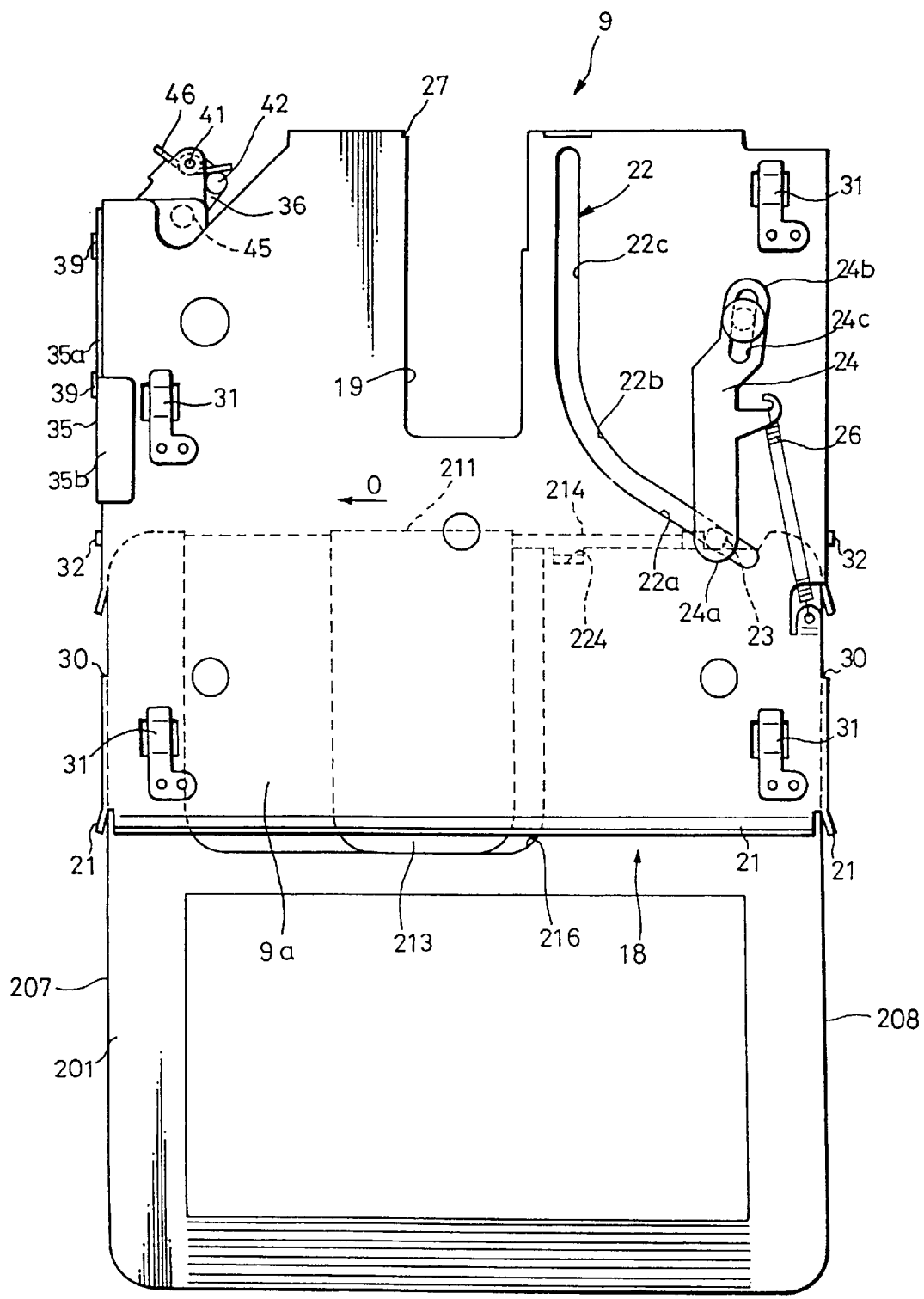
FIG. 23 is a plan view illustrating the manner in which the shutter releasing pin starts to release a shutter member during the disk cartridge loading onto the cartridge holder.

Further, when the disk cartridge 201 is inserted into the cartridge holder 9 as shown in FIG. 23, the shutter opening pin 23 is moved along the inclined portion 22a of the cam groove 22 by the pressure of the disk cartridge 201. At that time, the shutter releasing pin supporting member 24 is rotated along the inclined groove 22a of the cam groove 22 against a spring force of the tension coil spring 26 while changing the position at which the guide groove 24c is engaged with the guide pin 25 is being changed.

As a consequence, the shutter member 211 is slid against a spring-biasing force of a torsion coil spring (not shown) provided within the cartridge 203 in the direction shown by an arrow 0 in FIG. 23, i.e., in the direction in which the opening portions 206, 216 of the disk cartridge 201 are opened.

Then, if the disk cartridge 201 is further inserted into the cartridge holder 9, then the shutter opening pin 23 is moved along the arcuate portion 22b of the cam groove 22 in the direction of the straight line portion 22c, whereby the shutter member 211 is slid in the direction in which the opening portions 206, 216 of the disk cartridge 201 are opened.

Figure 24:
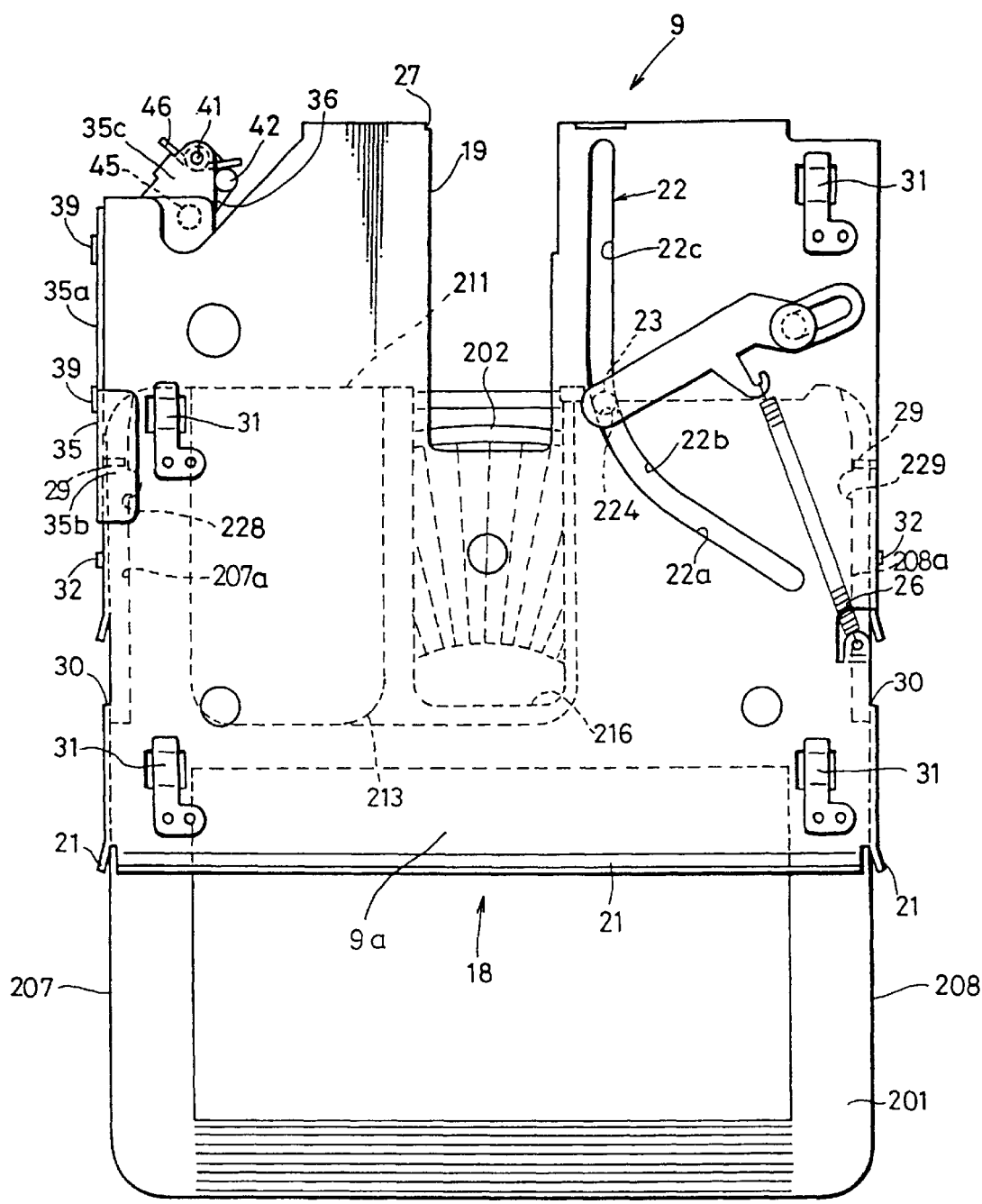
FIG. 24 is a plan view illustrating the intermediate state in which the shutter member is released by the shutter releasing pin during the disk cartridge loading onto the cartridge holder.
Figure 27:
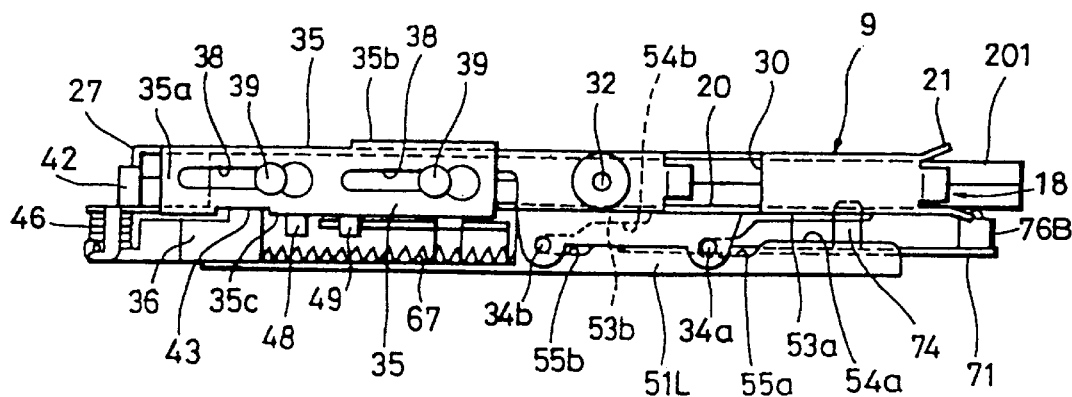
FIG. 27 is a left-hand side elevational view illustrating a manner in which the elevating mechanism is operated in the loading state.
Figure 28:
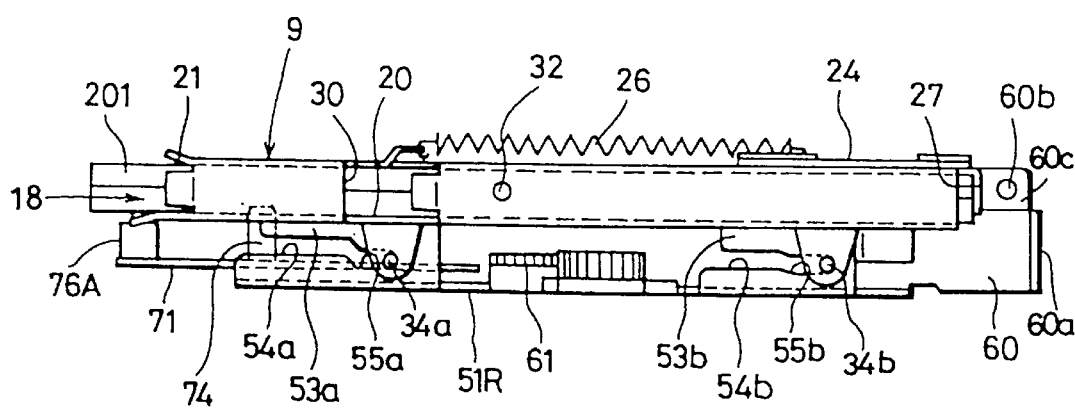
FIG. 28 is a right-hand side elevational view illustrating a manner in which the elevating mechanism is operated in the loading state.

When the disk cartridge 201 is inserted with a pressure and the shutter opening pin 23 is reached to the rear end portion of the arcuate portion 22b, as shown in FIG. 24, the shutter opening pin is entered into the shutter opening member fitting portion 224 of the cartridge 203.

On the other hand, since the disk cartridge 201 is inserted with a pressure, the mis-insertion preventing grooves 207a, 208a defined in substantially the first half portion of the lower half 205 of the cartridge 203 oppose the engagement tab members 29 inwardly bent on the second half portion near the rear of the central portions of the respective side surface portions of the cartridge holder 9 with the result that the disk cartridge 201 is continuously inserted into the cartridge holder 9 under the condition that the mis-insertion preventing grooves 207a, 208a are slidably contacted with the engagement tab members 29.

In that case, when a disk cartridge different from the disk cartridge 201 is inserted into the cartridge holder 9, such different disk cartridge is prevented from being inserted into the cartridge holder 9 more than ever by the engagement tab members 29. Specifically, the mis-insertion of a disk cartridge having a similar shape can be prevented by forming protrusions such as the engagement tab members 29 or the like on the cartridge holder 9 side.

As a consequence, when the opening portions 206, 216 of the disk cartridge 201 are fully opened and the disk cartridge 201 is further inserted into the cartridge holder 9, the lock arm 36 of the front surface portion 209 of the disk cartridge 201 is contacted with the trigger pin 42 of the lock arm 36.

When the disk cartridge 201 is further inserted into the cartridge holder 9, the shutter opening pin 23 is moved in the cartridge insertion direction along the straight line portion 22c of the cam groove 22 and the shutter opening pin supporting member 24 is rotated backwards against the spring force of the tension coil spring 26.

Then, when the disk cartridge 201 is further inserted into the cartridge holder 9, as shown in FIG. 24, the lock arm 36 is moved in the backward direction together with the slide base 35 through the trigger pin 42. If the engagement portion 44a of the cam groove 44 is detached from the engagement pin 45 protruded on the cartridge holder 9 side when the lock arm 36 is slid, then the lock arm 36 is rotated and the cartridge hold pin 43 is fitted and engaged into one side portion of the disk cartridge 201, i.e., the pin engagement aperture 228 of one mis-insertion preventing groove 207a, whereby the disk cartridge 201 is held and the shutter member 211 is finally brought in contact with the cartridge insertion position restricting member 201. Thus, the loading position of the disk cartridge 201 is determined. Under this condition, the shutter opening pin supporting member 24 is considerably rotated in the backward direction and then positioned.

Although the rotation range of the lock arm 36 in this case falls within the range in which the cartridge hold pin 43 is fitted into and extracted from the pin fitting aperture 228 of the disk cartridge 201, the pin fitting aperture 228 is defined on the side surface of the mis-insertion preventing groove 207a of the disk cartridge 201. Therefore, under the condition that the cartridge hold pin 43 is extracted, the cartridge hold pin is placed at the position in which it is not protruded from the width of the cartridge 203, thereby making it possible to reduce the width of the disk apparatus and to miniaturize the apparatus.

Concurrently with this operation, when the slide base 35 is slid, the interlocking arm 37 is rotated and the second engagement pin 49 is detached from the engagement groove 58 of the left slider 51L of the slider apparatus (A-c).

Thus, the slider apparatus (A-c) is released from being locked with the result that the respective sliders 51L, 51R are slid in the forward direction under the spring force of the tension coil spring 67. When the respective sliders 51L, 51R are slid in the forward direction, the second-half parallel cam grooves 55a, 55b of low position of the respective sliders 51L, 51R are engaged with the first and second pins 34a, 34b so that the cartridge holder 9 is held at the lowered position.

In this state, the disk cartridge 201 inserted into and held within the cartridge holder 9 is placed on the reference supporting portion 12 formed on the chassis 1 and also downwardly pressed by the press spring member 31 attached to the cartridge holder 9 and urged against the reference supporting portion 12, thereby held at a predetermined height direction.

The third and fourth inclined cam grooves 57a, 57b of the respective sliders 51L, 51R are opposed to the cam pin 75 and the shaft pin 73 of the respective sides in the high position, whereby the first and second elevating plates 70, 71 of the elevating mechanism (C) are elevated.

As a result, the cartridge positioning pins 74 implanted on the second elevating plate 71 are fitted into the cartridge positioning pin engagement apertures 225, 226 of the cartridge 203, there by the disk cartridge 201 being positioned.

Moreover, in this state, the circumferential surface of the central circular opening portion 206b of the lower half 205 of the cartridge 203 is opposed to the upper surface of the spindle motor positioning member 15, whereby the coupling surface 205a between the circular opening portion 206b and the rectangular opening portion 206a is brought in contact with the supporting protrusion surface 15c and other portion surface is brought in contact with the supporting protrusion surface 15d.

Concurrently with this operation, the spindle motor 10 attached to the first elevating plate 70 also is elevated so that the rotary portion 68a of the spindle holding member 68 is protruded from the opening portion 15a of the spindle motor positioning member 15 and held at a predetermined height position.

Therefore, the rotary portion 68a of the spindle holding member 68 is inserted into the circular opening portion 206b of the lower half 205 of the cartridge 203, whereby the disk resting surface $68a_1$ of its peripheral edge contacts with the chucking hub 202a of the magneto-optical disk 202 and the spindle shaft 10a is inserted into the central aperture, thereby the magneto-optical disk 202 being chucked to the spindle motor 10.

As described above, the magneto-optical disk 202 is loaded onto the magneto-optical disk apparatus.

Under the condition that the disk cartridge 201 is loaded and the chucking of the magneto-optical disk 202 onto the spindle motor 10 is completed, the locking of the optical pickup device (D) is released.

Specifically, when the slider apparatus (A-c) is slid in the forward direction, the operation pin 60b of the slide operation portion 60 is detached from the cam surface portion 156 of the lock plate 145 of the transmission mechanism (H), whereby the lock plate 145 is returned and rotated by the return spring 157 to move the engagement surface portion 155 side in the upper direction and the comb-shaped tooth 155a is detached from the operation pin 115 of the lifter arm 111 of the lifter mechanism (F), thus the locking of the carriage 82 being released.

Figure 30:
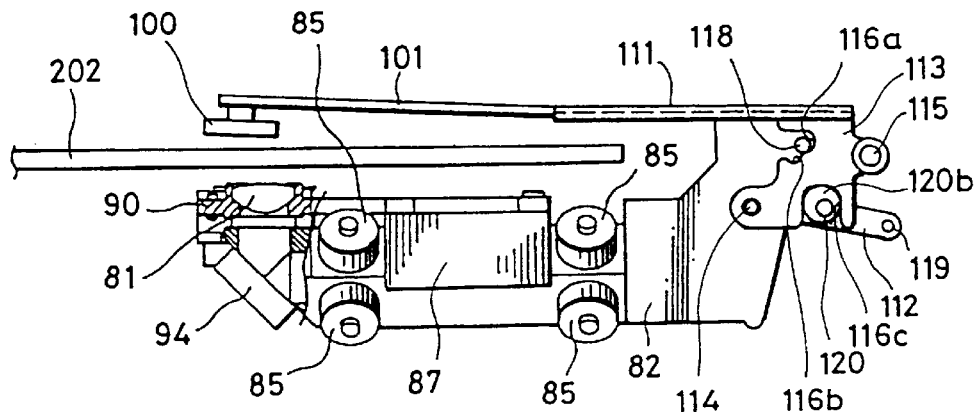
FIG. 30 is a side view illustrating a manner in which the lifter mechanism is operated in the intermediate state between the loading state and the unloading state.

In this state, as shown in FIG. 30, in the lifter mechanism (F), the lifter arm 111 is rotated until the lower edge of the upper-stage concave portion 16a of the engagement plate 113 is engaged with the engagement pin 118 of the lifter arm plate 112 under spring force of the torsion coil spring 122. As a consequence, the height of the straightened head arm 101 is lowered so that the magnetic field applying head 100 is held in such a manner that it is slightly floated from the surface of the magneto-optical disk 202.

If it is detected by the detection switch 76A or 76B that the magneto-optical disk 202 is the ROM (read-only) disk, then the recording magnetic field applying head 100 is not utilized. Therefore, under the condition that the magnetic field applying head 100 shown in FIG. 30 is floated from the surface of the magneto-optical disk 202, the optical pickup device (D) is actuated and operated. Also, after the focusing is turned on by rotating the spindle motor 10, the ordinary read sequence is carried out.

If on the other hand it is detected by the detection switch 76A or 76B that the magneto-optical disk is the RAM disk, then the magnetic field applying head 100 is loaded onto the magneto-optical disk 202 as follows.

Specifically, when the RAM disk is detected, the carriage 82 is moved to a specific position in the radius direction of the magneto-optical disk 202 by applying a drive current to the coil 87. Then, the drive motor 130 of the drive mechanism (G) is driven such that the transmission gear 132 is rotated in the direction shown by an arrow $R_2$ in FIG. 15. Thus, when the transmission gear 132 is rotated in the arrow $R_2$ direction, the pin 131 presses the press member portion 163 to slide the slide plate 148 of the transmission mechanism (H) in the backward direction.

Figure 31:
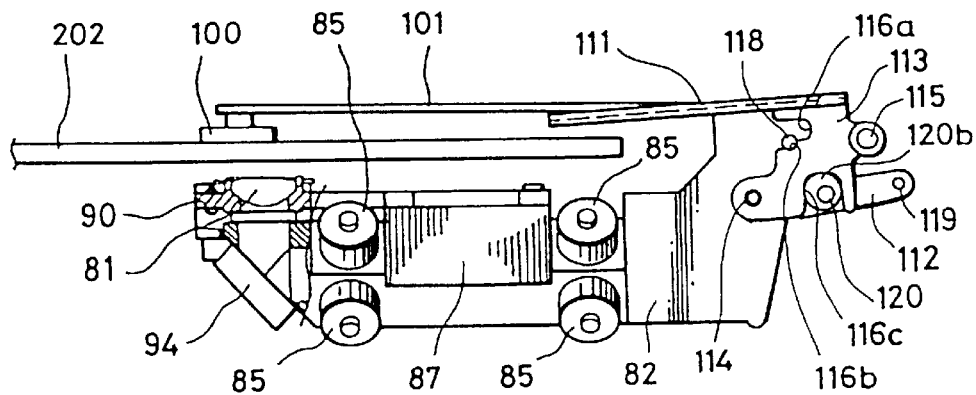
FIG. 31 is a side view illustrating a manner in which the lifter mechanism is operated in the loading state.

The slide plate 148 is slid in the backward direction, whereby the operation member 165 upwardly rotates the lift lever 147 such that the lift lever is slid over the leg portion 171 formed on the lower surface. When this soft lever 147 is rotated, the pushing surface portion 147b pushes the operation pin 119 of the lifter plate 112 of the lifter mechanism (F) to rotate the lifter plate 112 against the spring force of the torsion coil spring 122, whereby the engagement pin 118 is engaged with the lower-stage concave portion 116b of the engagement plate 113. As a result, as shown in FIG. 31, the lifter arm 111 is downwardly rotated around the shaft pin 114 of the engagement plate 113, whereby the horizontal side portion 111a of the lifter arm is detached from the lower surface side of the head arm 101. Thus, the head arm 101 is moved in the lower direction, and hence the magnetic field applying head 100 is brought in contact with the surface of the magneto-optical disk 202. Then, in the lifter arm 111, the engagement pin 118 is engaged with the lower-stage concave portion 116b, whereby the contact of the magnetic field head 100 with the disk 202 is kept.

In this operation, when the slide plate 148 is slid in the backward direction, the guide groove 164a of the slider lock 164 is fitted into the lock pin 174 of the lock arm 150 to rotate the lock arm 150. Under this state, the electromagnetic clutch 149 is energized and the lock arm is attracted by the electromagnetic clutch 149 through the magnetic member 175.

In this state, the engagement surface portion 164b of the slider lock 164 is engaged with the lock pin 174 of the lock arm 150, whereby the slide plate 148 is locked under the condition that it is slid backwards.

Consequently, the lift lever 147 is rotated upwardly and held in this state. By reversing the rotation of the drive motor 130, a rotational force in the direction shown by the arrow $R_1$ in FIG. 15 is being applied to the transmission gear 132 until the pin 131 is displaced to the fixed position a shown in FIG. 15.

In this manner, the loading operation of the magnetic field applying head 100 is executed.

Thereafter, the carriage 83 is moved in the radius direction of the magneto-optical disk 202, and after the focusing is turned on by rotating the spindle motor 10, the ordinary read/write sequence is carried out.

The unloading operation of the magnetic field applying head in the magneto-optical disk apparatus will be described next.

Initially, the spindle motor 10 is stopped in response to an eject command from a host computer or the like.

Then, a releasing pulse voltage is applied to the electromagnetic clutch 149, whereby the lock arm 150 is released from being attracted and becomes rotatable. As a result, the slide plate 148 is placed in the lock released state and returned and slid by a spring-biasing force of the tension coil spring 169.

When the slide plate 148 is returned and slid, the lift lever 147 is downwardly moved and slid to release the operation pin 119 of the lifter plate 112 from pushing. Also, the guide shaft 162 of the slide plate 148 is slidably contacted with the convex cam portion 159b, whereby the operation surface portion 146a of the operation plate 146 is lowered to rotate the operation plate, thereby downwardly pressing the operation pin 115 of the lifter arm 111. Consequently, the lifter arm 111 of the lifter mechanism (F) is upwardly rotated around the shaft pin 114 of the engagement plate 113 relative to the carriage 82 of the optical pickup device (D) until the upper edge of the upper-stage concave portion 116a is engaged with the engagement pin 118 of the lifter plate 112. Thus, the horizontal side portion 111a linearly elevates the head arm 101 of the external magnetic field generating apparatus (E) so that the magnetic field applying head 100 is held at the uppermost position, i.e., at the position largely spaced apart from the magneto-optical disk 202 as shown in FIG. 29. Moreover, in this state, the carriage 82 is locked through the lifter arm 111 and thereby prevented from being moved and fluctuated inadvertently.

Then, the drive motor 130 applies the rotational force (reverse force) in the direction shown by the arrow $R_1$ to the transmission gear 132 until the pin 131 is displaced from the fixed position a to the fixed position b as shown in FIG. 14. At that time, by the rotation of the transmission gear 132, the pin 131 is engaged with the engagement portion 60a of the slide operation portion 60 of the right slider 51R of the slider apparatus (A-c) to press the right slider in the backward direction. Thus, the sliders 51L, 51R are returned from the loading position to the unloading position against the spring-biasing force of the tension coil spring 67, whereby the operation pin 60b of the slide operation portion 60 is slidably contacted with the lower edge surface of the cam surface portion 156 of the lock plate 145, resulting in the lock plate 145 being rotated so as to lower the engagement surface portion 155 side.

As a consequence, the comb-shaped tooth 155a of the lock plate 145 engages with and presses the operation pin 115 of the lifter arm 111 in the lower direction so that the lifter arm 111 is further rotated upwardly as shown in FIG. 29. Thus, the magnetic field applying head 100 is detached from the magneto-optical disk 202 and the carriage 82 is locked.

As described above, the sliders 51R, 51L of the slider apparatus (A-c) are returned to the unloading position, whereby the cartridge holder 9 is elevated by the operation opposite to the unloading operation and the first and second elevating plates 70, 71 are lowered. As a result, the spindle motor 10 is detached from the chucking hub 202a of the magneto-optical disk 202 and lowered and fully inserted into the spindle motor positioning member 15. In that case, the circumferential surface of the central circular opening portion 206b of the lower half 205 of the disk cartridge 201 is brought in contact with the supporting protrusion surfaces 15c, 15d of the upper surface of the spindle motor positioning member 15 and thereby held down. In particular, since the coupling surface 205a which is the thin portion is held down by the wide supporting protrusion surface 15c, the cartridge 203 can be prevented from being deformed and damaged.

Moreover, the disk cartridge 201 is released from being held down on the reference supporting portion 12 and the cartridge positioning pins 74 are extracted from the cartridge positioning pin engagement apertures 225, 226.

Then, since the slider apparatus (A-c) is slidably returned, the second engagement pin 49 is engaged with the engagement groove 58 of the left slider 51L so that the interlocking arm 37 pivotally supported to the cartridge holder 9 is rotated to slide the slide base 35 in the forward direction.

As a result, the lock arm 36 is rotated to detach the cartridge hold pin 43 from the pin fitting aperture 228 of the disk cartridge 201.

Therefore, the disk cartridge 201 becomes movable relative to the cartridge holder 9 so that the disk cartridge is pressed and moved in the cartridge eject direction through the shutter opening pin 23 under return spring force of the tension coil spring 26.

Then, when the disk cartridge 201 is further moved in the cartridge eject direction, the shutter opening pin 23 is passed through the arcuate portion 22b of the cam groove 22 and moved along the inclined groove 22a.

At that time, the shutter member 211 is moved under spring force of a torsion spring (not shown) provided within the cartridge 203 in the direction in which the opening portions 206, 216 of the disk cartridge 201 are closed.

Further, when the disk cartridge 201 is moved in the cartridge eject direction, as shown in FIG. 21, the shutter opening pin 23 is spaced apart from the front surface portion 209 of the disk cartridge 201 so that substantially the second half portion of the disk cartridge 201 is ejected to the outside of the cartridge holder 9. As described above, the disk cartridge 201 is unloaded from the magneto-optical disk apparatus.

When the operation of the magneto-disk apparatus is stopped due to the interruption of power by a power failure during the magneto-optical disk 202 is read and/written, in order to eject the disk cartridge 201 without awaiting the supply of power, the user should insert a pin-shaped operation tool from the front surface panel 4 side to press one slider of the slider apparatus (A-c), the right slider 51R in this embodiment, thereby sliding the slider apparatus (A-c) against the spring-biasing force of the tension coil spring 67 in the backward direction, i.e., unloading position direction.

Therefore, the operation member 60c of the slide operation portion 60 abuts against the engagement portion 178 of the lock releasing plate 151, thereby the lock releasing plate 151 being slid backwards.

The lock releasing plate 151 is slid backwards so that the lock releasing portion $151b_1$ at the inner rear portion of the lower surface portion 151b abuts against the vertical portion 150a on which the lock pin 174 of the lock arm 150 attracted and held by the electromagnetic clutch 149 is implanted, whereby the horizontal portion 150b to which the magnetic member 175 is attached is pressed and the lock arm 150 is rotated.

Concurrently with the rotation of the lock arm 150, the lock pin 174 is moved from the engagement surface portion 164b side of the slider lock 164 of the slide plate 148 to the guide groove 164a, whereby the locked state of the slide plate 148 is released.

As a result, the slide plate 148 is returned and slid under spring-biasing force of the tension coil spring 169 similarly to the case where the locked state of the slide plate 148 is released on application of the releasing pulse voltage to the electromagnetic clutch 149.

When the slide plate 148 is returned and slid, the lift lever 147 is lowered to release the lifter plate 112 from upwardly pushing the operation pin 119. Also, the operation plate 146 is rotated such that the guide shaft 162 of the slide plate 148 is slidably contacted with the convex cam portion 159b so as to lower the operation surface portion 146a, thus the operation plate pressing the operation pin 115 of the lifter arm 111 from the upper direction.

Consequently, the lifter arm 111 is rotated upwardly to cause the magnetic field applying head 100 to be spaced apart from the magneto-optical disk 202. In this state, when the slider apparatus (A-c) is further pressed and slid in the backward, the magnetic disk apparatus is operated similarly to the aforementioned unloading operation, whereby the disk cartridge 201 can be ejected and unloaded.

As described above, in the magnetic disk apparatus according to this embodiment, upon emergency such as occurrence of power failure or trouble, without damaging the magneto-optical disk 202 and the magnetic field applying head 201, the user can unload the disk cartridge 201 in a manual fashion.

Figure 32:
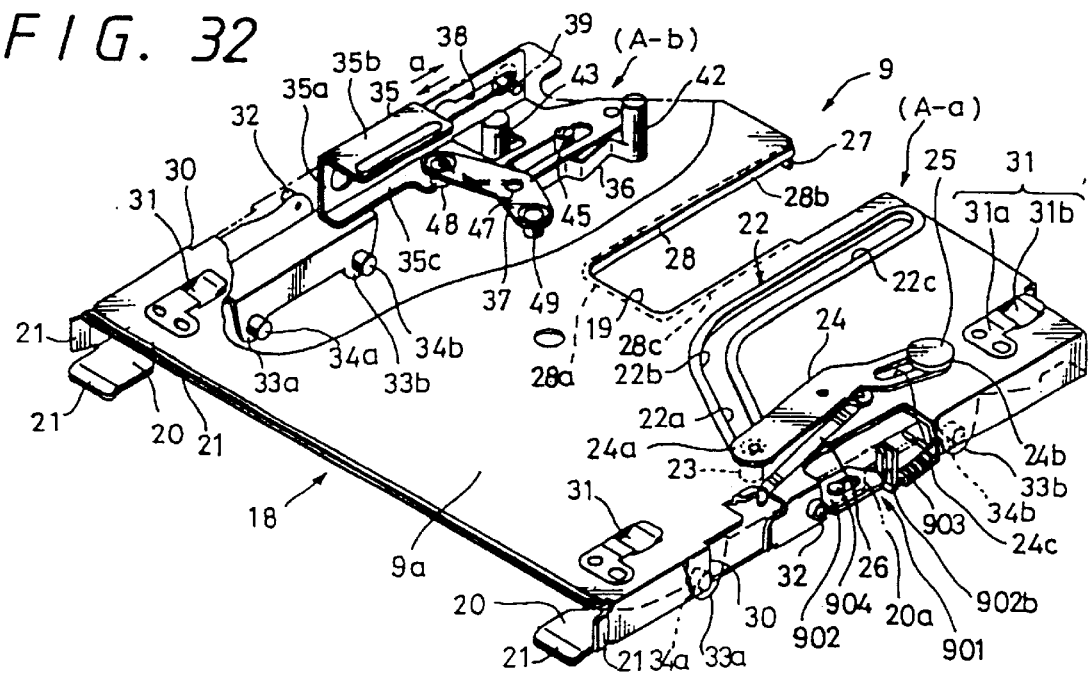
FIG. 32 is a perspective view illustrating in a partly-exploded fashion a cartridge holder according to another embodiment of the present invention.
Figure 33:
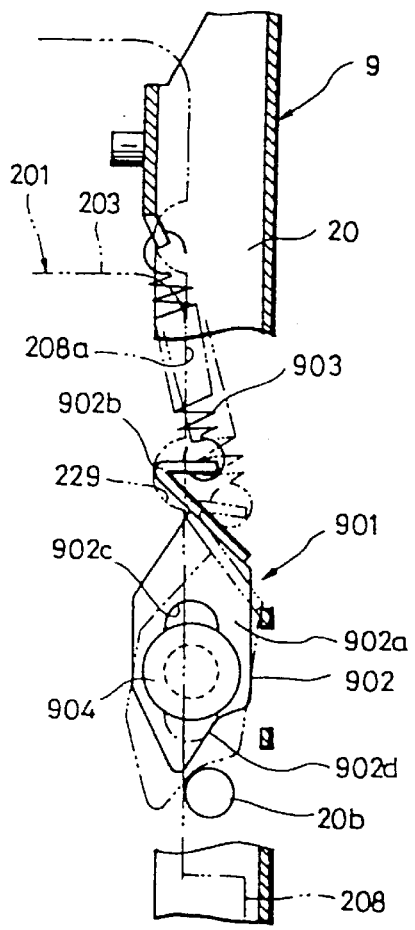
FIG. 33 is a plan view illustrating a main portion of FIG. 32.
Figure 34:
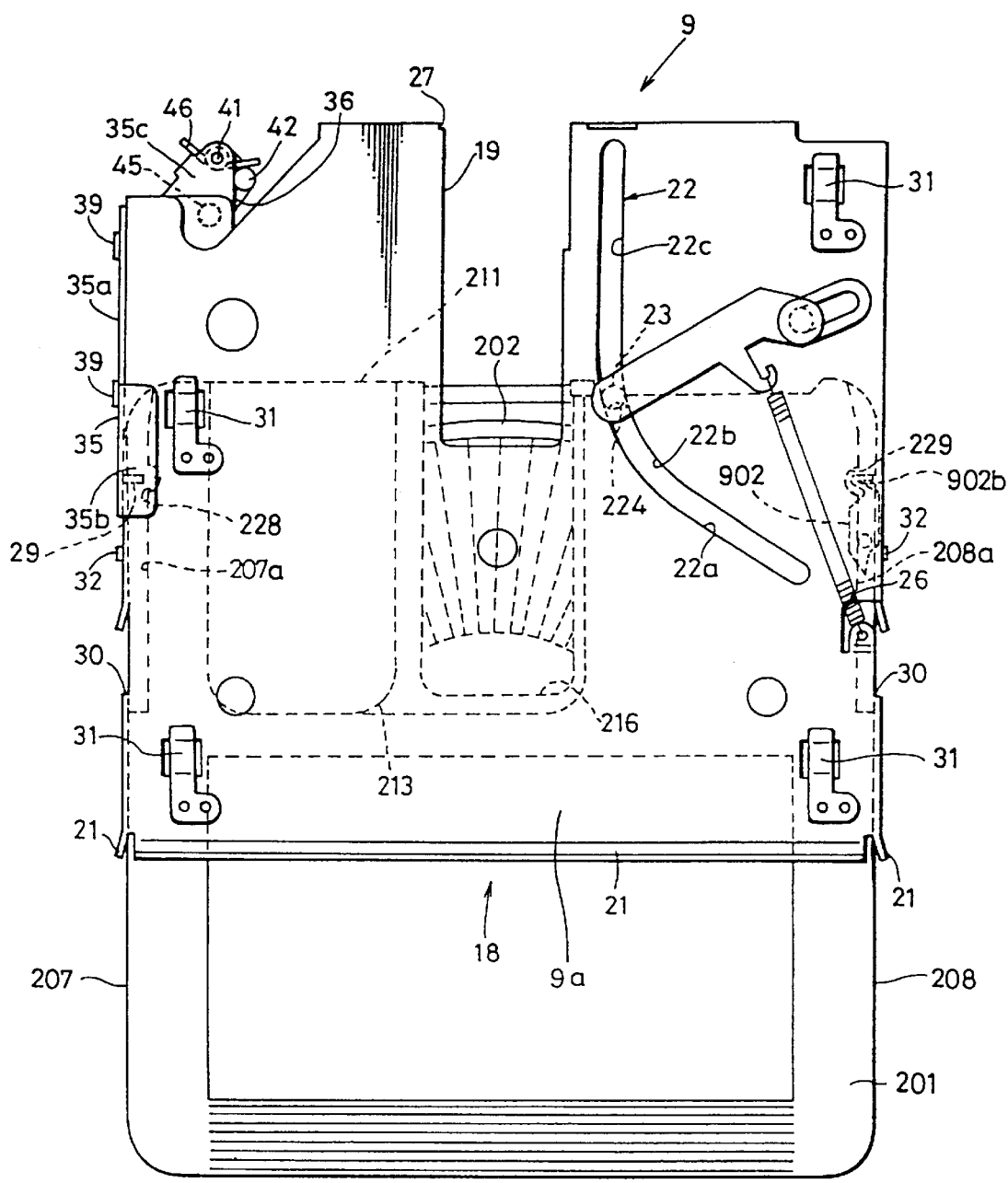
FIG. 34 is a plan view illustrating a manner in which a disk cartridge is rejected from the cartridge holder shown in FIG. 33.

Another embodiment of the cartridge holder 9 will be described with reference to FIGS. 32 to 34, wherein parts formed similarly to those of the aforesaid cartridge holder 9 are marked with the same references and need not be described.

The cartridge holder 9 according to this embodiment is provided with a mis-insertion preventing and disk cartridge mis-eject preventing mechanism 901 instead of one engagement pawl tab 29 of the engagement tabs 29, 29 serving as the cartridge mis-insertion preventing means formed on both side surfaces of the cartridge holder 9.

Specifically, the mis-insertion preventing and disk cartridge mis-unloading preventing mechanism 901 includes an engagement member 902 and a tension coil spring 903 serving as the biasing means for biasing this engagement member 902. The engagement member 902 comprises an engagement portion 902b erected at the rear end of a plate-shaped portion 902a, a vertical oblong aperture 902c defined at the central portion and a cam edge 902d formed at the front end portion.

Under the condition that the engagement portion 902b formed at the rear end is inwardly protruded from the recess portion 20a defined on the guide supporting portion 20 to the lower surface at substantially the central portion of one guide supporting portion 20 of the cartridge holder 9, this engagement member 902 can be rotated and slid in the front and back direction by a shaft pin 904 inserted into the guide aperture 902c and slidably biased in the backward direction by the tension coil spring 903. In this state, the engagement portion 902b of the engagement member 902 is opposed to the engagement pawl tab 29 inwardly bent on other side surface of the cartridge holder 9. Also, the spacing between the upper end edge and the top plate 9a in the engagement portion 902 is equal to or slightly larger than the thickness T of the side surface portion of the upper half 204 corresponding to the mis-insertion preventing grooves 207a, 208a of the disk cartridge 201.

When this engagement member 902 is slid in the forward direction against the biasing force of the tension coil spring 903, the cam edge 902d at the front end is slidably contacted with the protrusion 20b protruded at the guide supporting portion 20 and thereby outwardly rotated around the shaft pin 904 with the result that the engagement portion 902b is moved to the inner side surface of the cartridge holder 9, i.e., the engagement portion is escaped from the insertion portion of the disk cartridge 201.

Since the cartridge holder 9 is provided with the mis-insertion preventing and disk cartridge mis-eject preventing mechanism 901 as described above, when the 3.5-inch size microfloppy disk cartridge different from the aforementioned disk cartridge 201 is inserted into the disk cartridge, one corner portion of the end face of the dish shell abuts against the engagement portion 902b of the engagement member 902 and the other corner portion abuts against the engagement pawl tab 29 of the cartridge holder 9, respectively, so that the microfloppy disk cartridge can be prevented from being inserted into the cartridge holder. Even when the disk cartridge 201 is inserted into the cartridge holder in the opposite direction, i.e., from the rear surface side, one corner portion of the rear end face abuts against the engagement portion 902b of the engagement portion 902 and the other corner portion abuts against the engagement pawl tab 28, respectively, so that such disk cartridge can be prevented from being mis-inserted into the cartridge holder.

Then, when the disk cartridge 201 is correctly inserted into the cartridge holder, the disk cartridge is continuously inserted into the cartridge holder 9 under the condition that the mis-insertion preventing groove 207a on the side surface 207 side of the cartridge 207 is slidably contacted with the engagement pawl tab 29 and the mis-insertion preventing groove 208a on the side surface 208 side is slidably contacted with the engagement portion 902b of the engagement member 902. In that case, since the engagement portion 902b of the engagement portion 902 is slidably urged against the side surface of the mis-insertion preventing groove 208a defined on the side surface 208 side of the cartridge 203 of the disk cartridge 201 under biasing force of the tension coil spring 903, if the pin insertion aperture 229 elongated from the mis-insertion preventing groove 208a is opposed to the engagement portion 902b of the engagement member 902, then the engagement member 902 is inwardly rotated under biasing force of the tension coil spring 903 and the engagement portion 902b is entered into and engaged with the pin insertion aperture 229 with the result that the disk cartridge 201 is temporarily placed in the engaged state. However, the disk cartridge 201 is inserted into the pin insertion aperture with a pressure larger than the biasing force of the tension coil spring 903, whereby the engagement member 902 is rotated in the outside and released from the engaged state. Thus, the insertion of the disk cartridge is continued and the disk cartridge is inserted into and held within the cartridge holder 9 similarly as described above.

As described above, in the unloading operation for unloading the disk cartridge 201 from being locked within the cartridge holder 9, i.e., in the eject operation in which the disk cartridge 201 is resiliently ejected from the cartridge holder 9, if the side surface of the mis-insertion preventing groove 208a on the side surface 208 side of the disk cartridge 201 is slidably contacted with the engagement portion 903b of the engagement member 902 and the pin insertion aperture 229 is opposed to the engagement portion 903b, then the engagement member 902 is rotated under biasing force of the tension coil spring 903 so that the engagement portion 903b is inserted into and engaged with the pin fitting aperture 229. As a consequence, the disk cartridge 201 is engaged and held under the condition that the second half portion thereof is projected from the cartridge insert and eject mouth 18 of the cartridge holder 9 (see FIG. 34). In this state, the user removes and ejects the disk cartridge 201 from the cartridge 9 manually. When the disk cartridge 201 is ejected from the cartridge holder 9, the disk cartridge is temporarily engaged and held when it is being ejected. Therefore, the disk cartridge can be prevented from being ejected from the cartridge holder 9 inadvertently and the disk cartridge 201 can be prevented from being damaged.

While the embodiments of the present invention have been described so far, although the expression of forward and the expression of backward are used in this description, the forward means the disk cartridge insertion mouth side and the backward means the disk cartridge insertion depth direction.

Further, the present invention is not limited to the illustrated embodiments and may be variously modified without departing from the gist of the present invention. For example, shapes of respective members may be changed arbitrarily so long as they are operated similarly. The spring member serving as the spring-biasing member may use arbitrarily a coil spring, a leaf spring or the like.

While the embodiments are applied to the magneto-optical disk apparatus having the carriage for holding the objective lens and the magnetic field applying head as described above, the present invention may be applied to an optical disk apparatus which does not use the magnetic field applying head.

As described above, according to the recording and reproducing apparatus of the present invention, the loading operation and the unloading operation of the disk cartridge can be carried out stably and smoothly. Also, the disk can be chucked to the rotary drive mechanism stably and reliably.

Further, the head means can be reliably opposed to the disk and can be reliably held in the state which does not bother the loading and unloading of the disk cartridge.

The mis-insertion of the 3.5-inch size microfloppy disk can be prevented reliably and only a predetermined magneto-optical disk can be recorded and reproduced reliably.

What is claimed is:

1. A head drive apparatus including a magnetic head movable in the radial direction of a disk located at the recording position in unison with a carriage with an optical pickup attached thereto, said magnetic head for applying a magnetic field to said disk and a lifter means for elevating and lowering said magnetic head, comprising:
   locking means engaged with said lifter means for locking a movement of said magnetic head along the radial direction of said disk; and
   releasing means for releasing said magnetic head locked by said locking means as said disk is loaded at said recording position;
      wherein said lifter means is pivotally supported to said carriage by a camshaft having an eccentric cam portion on one end side and a rotational angle of said lifter means is changed by rotating said camshaft.

2. The apparatus of claim 1, in which said lifter means comprises an arm member rotatably attached to said carriage and a holding member engaged with said arm member for holding said arm member at upper and lower positions, respectively.

3. The apparatus of claim 1, further comprising a holder for holding said disk and a slider for loading and unloading said disk by elevating and lowering said holder and wherein said releasing means releases said magnetic head from being locked in unison with a movement of said slider when said holder is lowered.

4. The apparatus of claim 3, further comprising a motor for unloading said disk by moving said slider and unloading operation means operated from outside for elevating said magnetic head and locking a movement of said magnetic head by operating said lock means when said motor is de-energized.

5. The apparatus of claim 4, in which said unloading operation means is driven by moving said slider from the outside.

6. The apparatus of claim 3, further comprising a motor for unloading said disk by moving said slider and unloading operation means operated from outside for elevating said magnetic head and locking a movement of said magnetic head by operating said lock means when said motor is de-energized.

7. The apparatus claim 4, wherein said unloading operation means is driven by moving said slider from the outside.

8. A head driving apparatus, comprising:
   a magnetic head movable in a radial direction of a disk located at a recording position in unison with a carriage with an optical pickup attached thereto, said magnetic head configured to apply a magnetic field to said disk;
   a lifter configured to elevate and lower said magnetic head;
   a locking portion engaged with said lifter configured to lock a movement of said magnetic head along the radial direction of said disk; and
   a releasing portion configured to release said magnetic head locked by said locking portion when said disk is loaded at said recording position;
      wherein said lifter is pivotally supported to said carriage by a camshaft having an eccentric cam portion on one end side and a rotational angle of said lifter is changed by rotating said camshaft.

9. The apparatus of claim 8 wherein said lifter includes an arm member rotatably attached to said carriage and a holding member engaged with said arm member for holding said arm member at upper and lower positions, respectively.

10. The apparatus of claim 8 further including:
   a holder for holding said disk; and
   a slider for loading and unloading said disk by elevating and lowering said holder;
      wherein said releasing portion is configured to release said magnetic head from being locked in unison with a movement of said slider when said holder is lowered.

11. The apparatus of claim 10, further including:
   a motor for unloading said disk by moving said slider; and
   an unloading operation portion operated from outside for elevating said magnetic head and locking a movement of said magnetic head by operating said locking portion when said motor is de-energized.

12. The apparatus of claim 11 wherein said unloading operation portion is driven by moving said slider from the outside.

13. A head driving apparatus, comprising:
a magnetic head movable in a radial direction of a disk located at a recording position in unison with a carriage with an optical pickup attached thereto, said magnetic head configured to apply a magnetic field to said disk;
a lifter configured to elevate and lower said magnetic head;
a locking portion engaged with said lifter configured to lock a movement of said magnetic head along the radial direction of said disk; and
a releasing portion;
a holder for holding said disk;
a slider for loading and unloading said disk by elevating and lowering said holder;
a motor for unloading said disk by moving said slider; and
an unloading operation portion operated from outside for elevating said magnetic head and locking a movement of said magnetic head by operating said locking portion when said motor is de-energized;
wherein said releasing portion is configured to release said magnetic head from being locked in unison with a movement of said slider when said holder is lowered; and further
wherein said lifter is pivotally supported to said carriage by a camshaft having an eccentric cam portion on one end side and a rotational angle of said lifter is changed by rotating said camshaft.

14. The apparatus of claim 13 wherein said unloading operation portion is driven by moving said slider from the outside.

15. A head drive apparatus including a magnetic head movable in the radial direction of a disk located at the recording position in unison with a carriage with an optical pickup attached thereto, said magnetic head for applying a magnetic field to said disk and a lifter means for elevating and lowering said magnetic head, comprising:
locking means engaged with said lifter means for locking a movement of said magnetic head along the radial direction of said disk; and
releasing means for releasing said magnetic head locked by said locking means as said disk is loaded at said recording position;
wherein said lifter means comprises an arm member rotatably attached to said carriage and a holding member engaged with said arm member for holding said arm member at upper and lower positions, respectively; and further
wherein said holding member is pivotally supported to said carriage by a camshaft having an eccentric cam portion formed on one end side and a rotational angle of said arm member is changed by rotating said camshaft, whereby said magnetic head is elevated or lowered relative to said magnetic disk.

16. The apparatus of claim 15 wherein said arm member includes an operation member for rotating said arm member to float said magnetic head from said disk and said locking means locks a movement of said magnetic head when it is engaged with said operation member.

17. The apparatus of claim 16 further including a holder for holding said disk and a slider for loading and unloading said disk by elevating and lowering said holder and wherein said releasing means releases said magnetic head from being locked in unison with a movement of said slider when said holder is lowered.

18. The apparatus of claim 17 further comprising a motor for unloading said disk by moving said slider and unloading operation means operated from outside for elevating said magnetic head and locking a movement of said magnetic head by operating said lock means when said motor is de-energized.

19. The apparatus of claim 18 in which said unloading operation means is driven by moving said slider from the outside.

20. The apparatus of claim 15 further comprising a holder for holding said disk and a slider for loading and unloading said disk by elevating and lowering said holder and wherein said releasing means releases said magnetic head from being locked in unison with a movement of said slider when said holder is lowered.

21. The apparatus of claim 20 further comprising a motor for unloading said disk by moving said slider and unloading operation means operated from outside for elevating said magnetic head and locking a movement of said magnetic head by operating said lock means when said motor is de-energized.

22. The apparatus of claim 21 in which said unloading operation means is driven by moving said slider from the outside.

23. The apparatus of claim 15 further comprising a motor for unloading said disk by moving said slider and unloading operation means operated from outside for elevating said magnetic head and locking a movement of said magnetic head by operating said lock means when said motor is de-energized.

24. The apparatus of claim 23 in which said unloading operation means is driven by moving said slider from the outside.

25. The apparatus of claim 15 in which said unloading operation means is driven by moving said slider from the outside.

26. A head driving apparatus, comprising:
a magnetic head movable in a radial direction of a disk located at a recording position in unison with a carriage with an optical pickup attached thereto, said magnetic head configured to apply a magnetic field to said disk;
a lifter configured to elevate and lower said magnetic head;
a locking portion engaged with said lifter configured to lock a movement of said magnetic head along the radial direction of said disk; and
a releasing portion configured to release said magnetic head locked by said locking portion when said disk is loaded at said recording position;
wherein said lifter includes an arm member rotatably attached to said carriage and a holding member engaged with said arm member for holding said arm member at upper and lower positions, respectively; and further
wherein said holding member is pivotally supported to said carriage by a camshaft having an eccentric cam portion formed on one end side and a rotational angle of said arm member is changed by rotating said camshaft, whereby said magnetic head is elevated or lowered relative to said magnetic disk.

27. The apparatus of claim 26 wherein said arm member includes an operation member for rotating said arm member to float said magnetic head from said disk and said locking portion locks a movement of said magnetic head when it is engaged with said operation member.

28. The apparatus of claim 26 further including:
a holder for holding said disk; and
a slider for loading and unloading said disk by elevating and lowering said holder;

wherein said releasing portion is configured to release said magnetic head from being locked in unison with a movement of said slider when said holder is lowered.

29. The apparatus of claim 28 further including:
a motor for unloading said disk by moving said slider; and
an unloading operation portion operated from outside for elevating said magnetic head and locking a movement of said magnetic head by operating said locking portion when said motor is de-energized.

30. The apparatus of claim 29 wherein said unloading operation portion is driven by moving said slider from the outside.

31. The apparatus of claim 26 further including:
a holder for holding said disk; and
a slider for loading and unloading said disk by elevating and lowering said holder;
wherein said releasing portion is configured to release said magnetic head from being locked in unison with a movement of said slider when said holder is lowered.

32. The apparatus of claim 31 further including:
a motor for unloading said disk by moving said slider; and
an unloading operation portion operated from outside for elevating said magnetic head and locking a movement of said magnetic head by operating said locking portion when said motor is de-energized.

33. The apparatus of claim 32 wherein said unloading operation portion is driven by moving said slider from the outside.

34. The apparatus of claim 26 further including:
a motor for unloading said disk by moving said slider; and
an unloading operation portion operated from outside for elevating said magnetic head and locking a movement of said magnetic head by operating said locking portion when said motor is de-energized.

35. The apparatus of claim 34 wherein said unloading operation portion is driven by moving said slider from the outside.

36. The apparatus of claim 26 wherein said unloading operation portion is driven by moving said slider from the outside.

37. A head driving apparatus, comprising:
a magnetic head movable in a radial direction of a disk located at a recording position in unison with a carriage with an optical pickup attached thereto, said magnetic head configured to apply a magnetic field to said disk;
a lifter configured to elevate and lower said magnetic head;
a locking portion engaged with said lifter configured to lock a movement of said magnetic head along the radial direction of said disk; and
a releasing portion;
a holder for holding said disk;
a slider for loading and unloading said disk by elevating and lowering said holder;
a motor for unloading said disk by moving said slider; and
an unloading operation portion operated from outside for elevating said magnetic head and locking a movement of said magnetic head by operating said locking portion when said motor is de-energized;
wherein said releasing portion is configured to release said magnetic head from being locked in unison with a movement of said slider when said holder is lowered;
wherein said unloading operation portion is driven by moving said slider from the outside; and further
wherein said lifter includes an arm member rotatably attached to said carriage and a holding member engaged with said arm member for holding said arm member at upper and lower positions, respectively, and further,
wherein said holding member is pivotally supported to said carriage by a camshaft having an eccentric cam portion formed on one end side and a rotational angle of said arm member is changed by rotating said camshaft, whereby said magnetic head is elevated or lowered relative to said magnetic disk.

38. A head driving method including a magnetic head movable in the radial direction of a disk located at the recording position in unison with a carriage with an optical pickup attached thereto, said magnetic head for applying a magnetic field to said disk and a lifter means for elevating and lowering said magnetic head, comprising the steps of:
engaging with said lifter means for locking a movement of said magnetic head along the radial direction of said disk; and
releasing said magnetic head locked by said locking means as said disk is loaded at said recording position;
wherein said engaging step includes the steps of rotatably attaching an arm member to said carriage and engaging a holding member with said arm member for holding said arm member at upper and lower positions, respectively; and further
wherein said step of engaging said holding member includes the step of pivotally supporting said holding member to said carriage by a camshaft having an eccentric cam portion formed on one end side and a rotational angle of said arm member is changed by rotating said camshaft, whereby said magnetic head is elevated or lowered relative to said magnetic disk.

39. The method of claim 38 wherein step of rotatably engaging said arm member includes the step of rotating said arm member to float said magnetic head from said disk and further, wherein said engaging step includes the step of locking a movement of said magnetic head when it is engaged with said operation member.

40. The method of claim 39 further including the steps of:
holding said disk; and
loading and unloading said disk by elevating and lowering said holder;
wherein said releasing step releases said magnetic head from being locked in unison with a movement of said slider when said holder is lowered.

41. The method of claim 40 wherein the step of loading and unloading said disk includes the step of moving a slider, the method further including the step of elevating said magnetic head from outside and locking a movement of said magnetic head when said motor is de-energized.

42. The method of claim 41 wherein said step of elevating said magnetic head includes the step of moving said slider from the outside.

43. The method of claim 38 further including the steps of:
holding said disk; and
loading and unloading said disk by elevating and lowering said holder;
wherein said releasing step releases said magnetic head from being locked in unison with a movement of said slider when said holder is lowered.

44. The method of claim 43 wherein the step of loading and unloading said disk includes the step of moving a slider, the method further including the step of elevating said magnetic head from outside and locking a movement of said magnetic head when said motor is de-energized.

45. The method of claim 44 wherein said step of elevating said magnetic head includes the step of moving said slider from the outside.

46. The method of claim 38 wherein the step of loading and unloading said disk includes the step of moving a slider, the method further including the step of elevating said magnetic head from outside and locking a movement of said magnetic head when said motor is de-energized.

47. The method of claim 46 wherein said step of elevating said magnetic head includes the step of moving said slider from the outside.

48. A head driving method, comprising the steps of:
providing a magnetic head movable in a radial direction of a disk located at a recording position in unison with a carriage with an optical pickup attached thereto, said magnetic head configured to apply a magnetic field to said disk;
providing a lifter to elevate and lower said magnetic head;
engaging a locking portion with said lifter configured to lock a movement of said magnetic head along the radial direction of said disk; and
providing a releasing portion to release said magnetic head locked by said locking portion when said disk is loaded at said recording position;
wherein said step of configuring said lifter includes the steps of rotatably attaching an arm member to said carriage and engaging a holding member with said arm member for holding said arm member at upper and lower positions, respectively; and further
wherein said step of engaging said holding member includes the step of pivotally supporting said holding member to said carriage by a camshaft having an eccentric cam portion formed on one end side and a rotational angle of said arm member is changed by rotating said camshaft, whereby said magnetic head is elevated or lowered relative to said magnetic disk.

49. The method of claim 48 wherein said step of rotatably attaching said arm member includes the step of providing an operation member for rotating said arm member to float said magnetic head from said disk and said engaging step locks a movement of said magnetic head when it is engaged with said operation member.

50. The method of claim 48 further including the steps of:
holding said disk; and
providing a slider for loading and unloading said disk by elevating and lowering said holder;
wherein said step of providing said releasing portion includes the step of releasing said magnetic head from being locked in unison with a movement of said slider when said holder is lowered.

51. The method of claim 50 further including the steps of:
providing a motor for unloading said disk by moving said slider; and
operating an unloading operation portion from outside for elevating said magnetic head and locking a movement of said magnetic head by operating said locking portion when said motor is de-energized.

52. The method of claim 51 wherein said step of operating said unloading operation portion further includes the step of driving said unloading operation portion by moving said slider from the outside.

53. The method of claim 48 further including the steps of:
holding said disk; and
providing a slider for loading and unloading said disk by elevating and lowering said holder;
wherein said step of providing said releasing portion includes the step of releasing said magnetic head from being locked in unison with a movement of said slider when said holder is lowered.

54. The method of claim 53 further including the steps of:
providing a motor for unloading said disk by moving said slider; and
operating an unloading operation portion from outside for elevating said magnetic head and locking a movement of said magnetic head by operating said locking portion when said motor is de-energized.

55. The method of claim 54 wherein said step of operating said unloading operation portion further includes the step of driving said unloading operation portion by moving said slider from the outside.

56. A head driving method, comprising the steps of:
providing a magnetic head movable in a radial direction of a disk located at a recording position in unison with a carriage with an optical pickup attached thereto, said magnetic head configured to apply a magnetic field to said disk;
providing a lifter configured to elevate and lower said magnetic head;
engaging a locking portion with said lifter configured to lock a movement of said magnetic head along the radial direction of said disk; and
providing a releasing portion;
providing a holder for holding said disk;
providing a slider for loading and unloading said disk by elevating and lowering said holder;
a motor for unloading said disk by moving said slider; and
providing an unloading operation portion operated from outside for elevating said magnetic head and locking a movement of said magnetic head by operating said locking portion when said motor is de-energized;
wherein said step of providing said releasing portion includes the step of releasing said magnetic head from being locked in unison with a movement of said slider when said holder is lowered;
wherein said step of providing said unloading operation portion includes the step of driving the unloading operation portion by moving said slider from the outside; and further
wherein step of providing said lifter includes the steps of rotatably attaching an arm member to said carriage and engaging a holding member with said arm member for holding said arm member at upper and lower positions, respectively, said holding member pivotally supported to said carriage by a camshaft having an eccentric cam portion formed on one end side and a rotational angle of said arm member is changed by rotating said camshaft, whereby said magnetic head is elevated or lowered relative to said magnetic disk.

* * * * *

UNITED STATES PATENT AND TRADEMARK OFFICE
CERTIFICATE OF CORRECTION

PATENT NO. : 6,272,092 B1
DATED : August 7, 2001
INVENTOR(S) : Arai et al.

It is certified that error appears in the above-identified patent and that said Letters Patent is hereby corrected as shown below:

<u>Title page,</u>
Item [73], the Assignee's information should read:
-- [73]  Assignee:  Sony Corporation; Tokyo (JP) --

Signed and Sealed this

Twenty-third Day of April, 2002

Attest:

JAMES E. ROGAN
*Director of the United States Patent and Trademark Office*

*Attesting Officer*